(12) United States Patent
Dassonville et al.

(10) Patent No.: US 12,458,446 B2
(45) Date of Patent: Nov. 4, 2025

(54) BONE WALL TRACKING AND GUIDANCE FOR ORTHOPEDIC IMPLANT PLACEMENT

(71) Applicant: Howmedica Osteonics Corp., Mahwah, NJ (US)

(72) Inventors: Benjamin Dassonville, Saint Hilaire du Touvet (FR); Vincent Gaborit, Saint Martin d'Hères (FR)

(73) Assignee: Howmedica Osteonics Corp., Mahwah, NJ (US)

( * ) Notice: Subject to any disclaimer, the term of this patent is extended or adjusted under 35 U.S.C. 154(b) by 772 days.

(21) Appl. No.: 17/608,951

(22) PCT Filed: May 1, 2020

(86) PCT No.: PCT/US2020/031097
§ 371 (c)(1),
(2) Date: Nov. 4, 2021

(87) PCT Pub. No.: WO2020/231654
PCT Pub. Date: Nov. 19, 2020

(65) Prior Publication Data
US 2022/0211443 A1    Jul. 7, 2022

Related U.S. Application Data

(60) Provisional application No. 62/847,746, filed on May 14, 2019, provisional application No. 62/847,740, filed on May 14, 2019.

(51) Int. Cl.
A61B 34/20    (2016.01)
A61B 17/00    (2006.01)
(Continued)

(52) U.S. Cl.
CPC .............. *A61B 34/20* (2016.02); *A61B 17/15* (2013.01); *A61B 17/1684* (2013.01);
(Continued)

(58) Field of Classification Search
CPC ......... A61B 34/20; A61B 34/10; A61B 90/37; A61B 17/1778; A61B 17/15;
(Continued)

(56) References Cited

U.S. PATENT DOCUMENTS 7,715,602 B2    5/2010   Richard
7,857,821 B2    12/2010  Couture et al.
(Continued)

FOREIGN PATENT DOCUMENTS

CA    3203261 A1      7/2022
EP    3245974 A1 *   11/2017    ............. A61B 10/04
(Continued)

OTHER PUBLICATIONS

Response to Communication Pursuant to Rules 161(1) and 162 EPC dated Dec. 21, 2021, from counterpart European Application No. 20727102.4, filed May 18, 2022, 13 pp.
(Continued)

*Primary Examiner* — Kevin T Truong
*Assistant Examiner* — Diana Jones
(74) *Attorney, Agent, or Firm* — Shumaker & Sieffert, P.A.

(57) ABSTRACT

An example device includes a first sensor to sense a first value representative of distance to a bone wall inside a patient; a second sensor configured to sense a second value representative of a distance to an implant component inside the patient; processing circuitry configured to process the first value and the second value; and transmitter circuitry configured to generate an output based on the first value and the second value.

6 Claims, 37 Drawing Sheets

(51) Int. Cl.
*A61B 17/15* (2006.01)
*A61B 17/16* (2006.01)
*A61B 17/17* (2006.01)
*A61B 34/00* (2016.01)
*A61B 34/10* (2016.01)
*A61B 90/00* (2016.01)
*A61B 90/50* (2016.01)
*A61F 2/40* (2006.01)
*A61F 2/46* (2006.01)
*G16H 20/40* (2018.01)
*G16H 40/63* (2018.01)

(52) U.S. Cl.
CPC .......... *A61B 17/1778* (2016.11); *A61B 34/10* (2016.02); *A61B 90/37* (2016.02); *A61F 2/4059* (2013.01); *A61F 2/4612* (2013.01); *G16H 20/40* (2018.01); *G16H 40/63* (2018.01); *A61B 2017/00026* (2013.01); *A61B 2017/00039* (2013.01); *A61B 2017/00106* (2013.01); *A61B 2017/00119* (2013.01); *A61B 2017/00203* (2013.01); *A61B 2017/00207* (2013.01); *A61B 2017/00216* (2013.01); *A61B 2017/00221* (2013.01); *A61B 2034/102* (2016.02); *A61B 2034/105* (2016.02); *A61B 2034/107* (2016.02); *A61B 2034/108* (2016.02); *A61B 2034/2048* (2016.02); *A61B 2034/2051* (2016.02); *A61B 2034/2055* (2016.02); *A61B 2034/2065* (2016.02); *A61B 34/25* (2016.02); *A61B 2090/061* (2016.02); *A61B 2090/0801* (2016.02); *A61B 90/361* (2016.02); *A61B 2090/365* (2016.02); *A61B 2090/371* (2016.02); *A61B 2090/372* (2016.02); *A61B 2090/3937* (2016.02); *A61B 2090/3983* (2016.02); *A61B 2090/502* (2016.02)

(58) Field of Classification Search
CPC ... A61B 17/1684; G16H 20/40; A61F 2/4059; A61F 2/4612
See application file for complete search history.

(56) References Cited

U.S. PATENT DOCUMENTS

| | | | |
|---|---|---|---|
| 8,147,496 B2 | 4/2012 | Couture et al. | |
| 8,482,859 B2 | 7/2013 | Border et al. | |
| 8,506,645 B2 | 8/2013 | Blaylock et al. | |
| 8,512,346 B2 | 8/2013 | Couture | |
| 8,617,170 B2 | 12/2013 | Ashby et al. | |
| 8,617,270 B2 | 12/2013 | Ashby et al. | |
| 8,819,591 B2 | 8/2014 | Wang et al. | |
| 8,894,654 B2 | 11/2014 | Anderson | |
| 8,951,256 B2* | 2/2015 | Burroughs .............. | A61B 34/20 606/86 R |
| 9,123,155 B2 | 9/2015 | Cunningham et al. | |
| 9,498,132 B2 | 11/2016 | Maier-Hein et al. | |
| 9,681,925 B2 | 6/2017 | Azar et al. | |
| 9,839,486 B2 | 12/2017 | Hughes et al. | |
| 9,861,446 B2 | 1/2018 | Lang | |
| 9,980,780 B2 | 5/2018 | Lang | |
| 10,010,379 B1 | 7/2018 | Gibby et al. | |
| 10,013,808 B2 | 7/2018 | Jones et al. | |
| 10,016,243 B2 | 7/2018 | Esterberg | |
| 10,052,170 B2 | 8/2018 | Saget et al. | |
| 10,159,530 B2 | 12/2018 | Lang | |
| 10,194,990 B2 | 2/2019 | Amanatullah et al. | |
| 10,258,427 B2 | 4/2019 | Saget et al. | |
| 10,278,777 B1 | 5/2019 | Lang | |
| 10,292,768 B2 | 5/2019 | Lang | |
| 10,368,947 B2 | 8/2019 | Lang | |
| 10,398,514 B2 | 9/2019 | Ryan et al. | |
| 10,405,927 B1 | 9/2019 | Lang | |
| 10,426,549 B2 | 10/2019 | Kehres et al. | |
| 10,467,752 B2 | 11/2019 | Tanji | |
| 10,499,996 B2 | 12/2019 | de Almeida Barreto | |
| 10,546,423 B2 | 1/2020 | Jones et al. | |
| 10,548,667 B2 | 2/2020 | Flett et al. | |
| 10,580,217 B2 | 3/2020 | Jones et al. | |
| 10,603,113 B2 | 3/2020 | Lang | |
| 10,646,283 B2 | 5/2020 | Johnson et al. | |
| 10,646,285 B2 | 5/2020 | Siemionow et al. | |
| 10,650,594 B2 | 5/2020 | Jones et al. | |
| 10,687,901 B2 | 6/2020 | Thomas | |
| 10,743,939 B1 | 8/2020 | Lang | |
| 10,799,296 B2 | 10/2020 | Lang | |
| 10,806,518 B2 | 10/2020 | Amanatullah | |
| 10,813,700 B2 | 10/2020 | Amanatullah | |
| 10,818,199 B2 | 10/2020 | Buras et al. | |
| 10,825,563 B2 | 11/2020 | Gibby et al. | |
| 10,846,851 B2 | 11/2020 | Boettger et al. | |
| 10,849,693 B2 | 12/2020 | Lang | |
| 10,861,236 B2 | 12/2020 | Geri et al. | |
| 10,881,462 B2 | 1/2021 | Heavener et al. | |
| 10,987,176 B2 | 4/2021 | Poltaretskyi et al. | |
| 10,987,190 B2 | 4/2021 | Flossmann et al. | |
| 11,013,560 B2 | 5/2021 | Lang | |
| 11,062,522 B2 | 7/2021 | Jones et al. | |
| 11,071,590 B2 | 7/2021 | Moctezuma De la Barrera | |
| 11,080,934 B2 | 8/2021 | Tseng et al. | |
| 11,103,311 B2 | 8/2021 | May et al. | |
| 11,135,016 B2 | 10/2021 | Frielinghaus et al. | |
| 11,153,555 B1 | 10/2021 | Healy et al. | |
| 11,172,990 B2 | 11/2021 | Lang | |
| 11,172,996 B1 | 11/2021 | Qian et al. | |
| 11,176,750 B2 | 11/2021 | Jones et al. | |
| 11,202,675 B2 | 12/2021 | Uhde et al. | |
| 11,207,150 B2 | 12/2021 | Healy et al. | |
| 11,217,028 B2 | 1/2022 | Jones et al. | |
| 11,237,627 B2 | 2/2022 | Gibby et al. | |
| 11,253,321 B2 | 2/2022 | Amanatullah | |
| 11,287,874 B2 | 3/2022 | Gibby et al. | |
| 11,302,005 B2 | 4/2022 | Tanji | |
| 11,311,341 B2 | 4/2022 | Lang | |
| 11,357,576 B2 | 6/2022 | Jo et al. | |
| 11,382,699 B2 | 7/2022 | Wassall et al. | |
| 11,382,713 B2 | 7/2022 | Healy et al. | |
| 11,413,094 B2 | 8/2022 | Qiu et al. | |
| 11,439,469 B2 | 9/2022 | Poltaretskyi et al. | |
| 11,452,568 B2 | 9/2022 | Lang | |
| 11,457,982 B2 | 10/2022 | Marti et al. | |
| 11,461,983 B2 | 10/2022 | Jones et al. | |
| 11,510,750 B2 | 11/2022 | Dulin et al. | |
| 11,532,135 B2 | 12/2022 | Geri et al. | |
| 11,571,263 B2 | 2/2023 | Moore et al. | |
| 11,589,923 B2 | 2/2023 | Running et al. | |
| 11,589,927 B2 | 2/2023 | Oezbek et al. | |
| 11,602,395 B2 | 3/2023 | Lang | |
| 11,607,277 B2 | 3/2023 | Calloway et al. | |
| 11,622,818 B2 | 4/2023 | Siemionow et al. | |
| 11,638,613 B2 | 5/2023 | Murphy | |
| 11,645,531 B2 | 5/2023 | Moore et al. | |
| 11,690,697 B2 | 7/2023 | Healy et al. | |
| 11,730,544 B2 | 8/2023 | Moctezuma De la Barrera | |
| 11,734,901 B2 | 8/2023 | Jones et al. | |
| 11,751,944 B2 | 9/2023 | Lang | |
| 11,763,531 B2 | 9/2023 | Iones et al. | |
| 11,766,296 B2 | 9/2023 | Wolf et al. | |
| 11,839,433 B2 | 12/2023 | Schaewe et al. | |
| 11,850,003 B2 | 12/2023 | Lang | |
| 2006/0184454 A1 | 8/2006 | Ananda | |
| 2008/0114270 A1 | 5/2008 | DiSilvestro et al. | |
| 2008/0319448 A1 | 12/2008 | Lavallee et al. | |
| 2009/0012532 A1* | 1/2009 | Quaid ................ | A61B 17/1764 128/898 |
| 2011/0257653 A1 | 10/2011 | Hughes et al. | |
| 2012/0106819 A1 | 5/2012 | Fernandez Oca | |
| 2015/0313684 A1* | 11/2015 | Fanson ..................... | A61F 2/32 600/424 |

(56) References Cited

U.S. PATENT DOCUMENTS

| | | | |
|---|---|---|---|
| 2016/0113683 A1* | 4/2016 | Cheng | A61B 17/8004 606/258 |
| 2017/0027651 A1 | 2/2017 | Esterberg | |
| 2017/0071691 A1 | 3/2017 | Crawford et al. | |
| 2017/0172665 A1 | 6/2017 | Otto et al. | |
| 2017/0229044 A1* | 8/2017 | Benson | G09B 23/285 |
| 2017/0245830 A1 | 8/2017 | Netravali et al. | |
| 2017/0258526 A1 | 9/2017 | Lang | |
| 2017/0312032 A1 | 11/2017 | Amanatullah et al. | |
| 2018/0049622 A1 | 2/2018 | Ryan et al. | |
| 2018/0140362 A1 | 5/2018 | Cali et al. | |
| 2018/0242880 A1* | 8/2018 | Bhushan | G01R 33/0023 |
| 2018/0271381 A1* | 9/2018 | Scharf | A61B 8/4483 |
| 2019/0053851 A1 | 2/2019 | Siemionow et al. | |
| 2019/0113683 A1* | 4/2019 | Tokutaka | G02B 6/32 |
| 2020/0038112 A1 | 2/2020 | Amanatullah et al. | |
| 2020/0229877 A1 | 7/2020 | Siemionow et al. | |
| 2020/0246074 A1 | 8/2020 | Lang | |
| 2020/0246081 A1 | 8/2020 | Johnson et al. | |
| 2020/0390503 A1 | 12/2020 | Casas et al. | |
| 2020/0405398 A1 | 12/2020 | Amanatullah | |
| 2021/0015559 A1 | 1/2021 | Mahfouz | |
| 2021/0022808 A1 | 1/2021 | Ang | |
| 2021/0090344 A1 | 3/2021 | Geri et al. | |
| 2021/0093388 A1 | 4/2021 | Poltaretskyi et al. | |
| 2021/0093389 A1 | 4/2021 | Poltaretskyi et al. | |
| 2021/0093390 A1 | 4/2021 | Poltaretskyi et al. | |
| 2021/0093392 A1 | 4/2021 | Poltaretskyi et al. | |
| 2021/0121237 A1 | 4/2021 | Fanson et al. | |
| 2021/0169578 A1 | 6/2021 | Calloway et al. | |
| 2021/0169581 A1 | 6/2021 | Calloway et al. | |
| 2021/0169605 A1 | 6/2021 | Calloway et al. | |
| 2021/0241534 A1 | 8/2021 | Avisar et al. | |
| 2021/0251717 A1 | 8/2021 | Healy et al. | |
| 2021/0267698 A1 | 9/2021 | Siemionow et al. | |
| 2021/0327304 A1 | 10/2021 | Buras et al. | |
| 2021/0338337 A1 | 11/2021 | Calloway et al. | |
| 2021/0346115 A1 | 11/2021 | Dulin et al. | |
| 2021/0361358 A1 | 11/2021 | May et al. | |
| 2021/0369353 A1 | 12/2021 | Nikou et al. | |
| 2022/0007006 A1 | 1/2022 | Healy et al. | |
| 2022/0008135 A1 | 1/2022 | Frielinghaus et al. | |
| 2022/0012949 A1 | 1/2022 | Jones et al. | |
| 2022/0020219 A1 | 1/2022 | Chav et al. | |
| 2022/0039881 A1 | 2/2022 | Avisar et al. | |
| 2022/0051483 A1 | 2/2022 | Nevins et al. | |
| 2022/0051484 A1 | 2/2022 | Jones et al. | |
| 2022/0071729 A1 | 3/2022 | Healy et al. | |
| 2022/0079675 A1 | 3/2022 | Lang | |
| 2022/0084298 A1 | 3/2022 | Jones et al. | |
| 2022/0087749 A1 | 3/2022 | Marti et al. | |
| 2022/0117669 A1 | 4/2022 | Nikou et al. | |
| 2022/0125519 A1 | 4/2022 | Slagmolen et al. | |
| 2022/0151704 A1 | 5/2022 | Nikou | |
| 2022/0151705 A1 | 5/2022 | Nikou et al. | |
| 2022/0155854 A1 | 5/2022 | Gibby et al. | |
| 2022/0160439 A1 | 5/2022 | Ryan et al. | |
| 2022/0168051 A1 | 6/2022 | Ryan et al. | |
| 2022/0202493 A1 | 6/2022 | Gibby et al. | |
| 2022/0218420 A1 | 7/2022 | Qian et al. | |
| 2022/0226045 A1 | 7/2022 | Amanatullah et al. | |
| 2022/0241018 A1 | 8/2022 | Dorman | |
| 2022/0249171 A1 | 8/2022 | Lang | |
| 2022/0265355 A1 | 8/2022 | Ferrante et al. | |
| 2022/0273450 A1 | 9/2022 | Steines et al. | |
| 2022/0280249 A1 | 9/2022 | Calloway et al. | |
| 2022/0287676 A1 | 9/2022 | Steines et al. | |
| 2022/0291741 A1 | 9/2022 | Gibby et al. | |
| 2022/0313386 A1 | 10/2022 | Healy et al. | |
| 2022/0346970 A1 | 11/2022 | Nikou | |
| 2022/0361955 A1 | 11/2022 | Signoretti et al. | |
| 2023/0000556 A1 | 1/2023 | McKinnon et al. | |
| 2023/0000570 A1 | 1/2023 | Marti et al. | |
| 2023/0018541 A1 | 1/2023 | Tanzer et al. | |
| 2023/0038678 A1 | 2/2023 | Lang | |
| 2023/0056596 A1 | 2/2023 | Farley et al. | |
| 2023/0074630 A1 | 3/2023 | Knopf | |
| 2023/0085387 A1 | 3/2023 | Jones et al. | |
| 2023/0113383 A1 | 4/2023 | Gonzalez et al. | |
| 2023/0118746 A1 | 4/2023 | Hettich et al. | |
| 2023/0131515 A1 | 4/2023 | Oezbek et al. | |
| 2023/0149099 A1 | 5/2023 | Murphy | |
| 2023/0165639 A1 | 6/2023 | Dulin et al. | |
| 2023/0165640 A1 | 6/2023 | Dulin et al. | |
| 2023/0200917 A1 | 6/2023 | Calloway et al. | |
| 2023/0233257 A1 | 7/2023 | Young et al. | |
| 2023/0233258 A1 | 7/2023 | Young et al. | |
| 2023/0233259 A1 | 7/2023 | Young et al. | |
| 2023/0274517 A1 | 8/2023 | Navab et al. | |
| 2023/0293237 A1 | 9/2023 | Samaha et al. | |
| 2023/0293238 A1 | 9/2023 | Cardinale et al. | |
| 2023/0293259 A1 | 9/2023 | Lomeli | |
| 2023/0301723 A1 | 9/2023 | Johnson et al. | |
| 2023/0355311 A1 | 11/2023 | Moctezuma De la Barrera | |
| 2023/0404678 A1 | 12/2023 | Denissen et al. | |

FOREIGN PATENT DOCUMENTS

| | | |
|---|---|---|
| EP | 3318213 A1 | 5/2018 |
| EP | 3125759 B1 | 1/2021 |
| EP | 3861956 A1 | 8/2021 |
| JP | 2007528243 A | 10/2007 |
| JP | 2012524577 A | 10/2012 |
| JP | 2013523415 A | 6/2013 |
| JP | 2017510310 A | 4/2017 |
| JP | 2018108344 A | 7/2018 |
| WO | 2005084544 A1 | 9/2005 |
| WO | 2012112694 A2 | 8/2012 |
| WO | 2017200785 A1 | 11/2017 |
| WO | 2018132804 A1 | 7/2018 |
| WO | 2019148154 A1 | 8/2019 |
| WO | 2019245849 A1 | 12/2019 |
| WO | 2021007418 A2 | 1/2021 |
| WO | 2021163039 A1 | 8/2021 |
| WO | 2022147591 A1 | 7/2022 |
| WO | 2023281477 A1 | 1/2023 |
| WO | 2023039032 A1 | 3/2023 |
| WO | 2023086592 A2 | 5/2023 |
| WO | 2023110124 A1 | 6/2023 |

OTHER PUBLICATIONS

Notice of Intent to Grant, and Translation Thereof, from Counterpart Japanese Application No. 2021-567857 dated Jun. 27, 2023, 5 pp.

Traub et al., "Advanced Display and Visualization Concepts for Image Guided Surgery," Journal of Display Technology, vol. 4, No. 4, Dec. 2008, 8 pp.

Notice of Acceptance from counterpart Australian Application No. 2020275280 dated Jun. 22, 2023, 3 pp.

Response to Office Action dated Jul. 25, 2022, from counterpart Australian Application No. 2020275280 filed Jun. 15, 2023, 270 pp.

Office Action, and translation thereof, from counterpart Japanese Application No. 2021-567857 dated Jan. 10, 2023, 6 pp.

International Preliminary Report on Patentability from International Application No. PCT/US2020/031097, dated Nov. 25, 2021, 8 pp.

Franz et al., "Electromagnetic Tracking in Medicine—A Review of Technology, Validation, and Applications," IEEE Transactions on Medical Imaging, vol. 33, No. 8, Aug. 2014, pp. 1702-1725.

Tan et al., "6D Object Pose Estimation with Depth Images: A Seamless Approach for Robotic Interaction and Augmented Reality," Sep. 5, 2017, 4 pp.

International Search Report and Written Opinion from counterpart PCT Application No. PCT/US2020/031097, mailed Aug. 17, 2020, 13 pp.

Response to Office Action dated Jan. 10, 2023, from counterpart Japanese Application No. 2021-567857 filed Apr. 5, 2023, 13 pp.

Examination Report No. 1 from counterpart Australian Application No. 2020275280 dated Jul. 25, 2022, 3 pp.

Communication pursuant to Article 94(3) EPC from counterpart European Application No. 20727102.4 dated Apr. 3, 2024, 4 pp.

(56) References Cited

OTHER PUBLICATIONS

Response to Communication pursuant to Article 94(3) EPC dated Apr. 3, 2024, from counterpart European Application No. 20727102.4 filed Aug. 1, 2024, 11 pp.

* cited by examiner

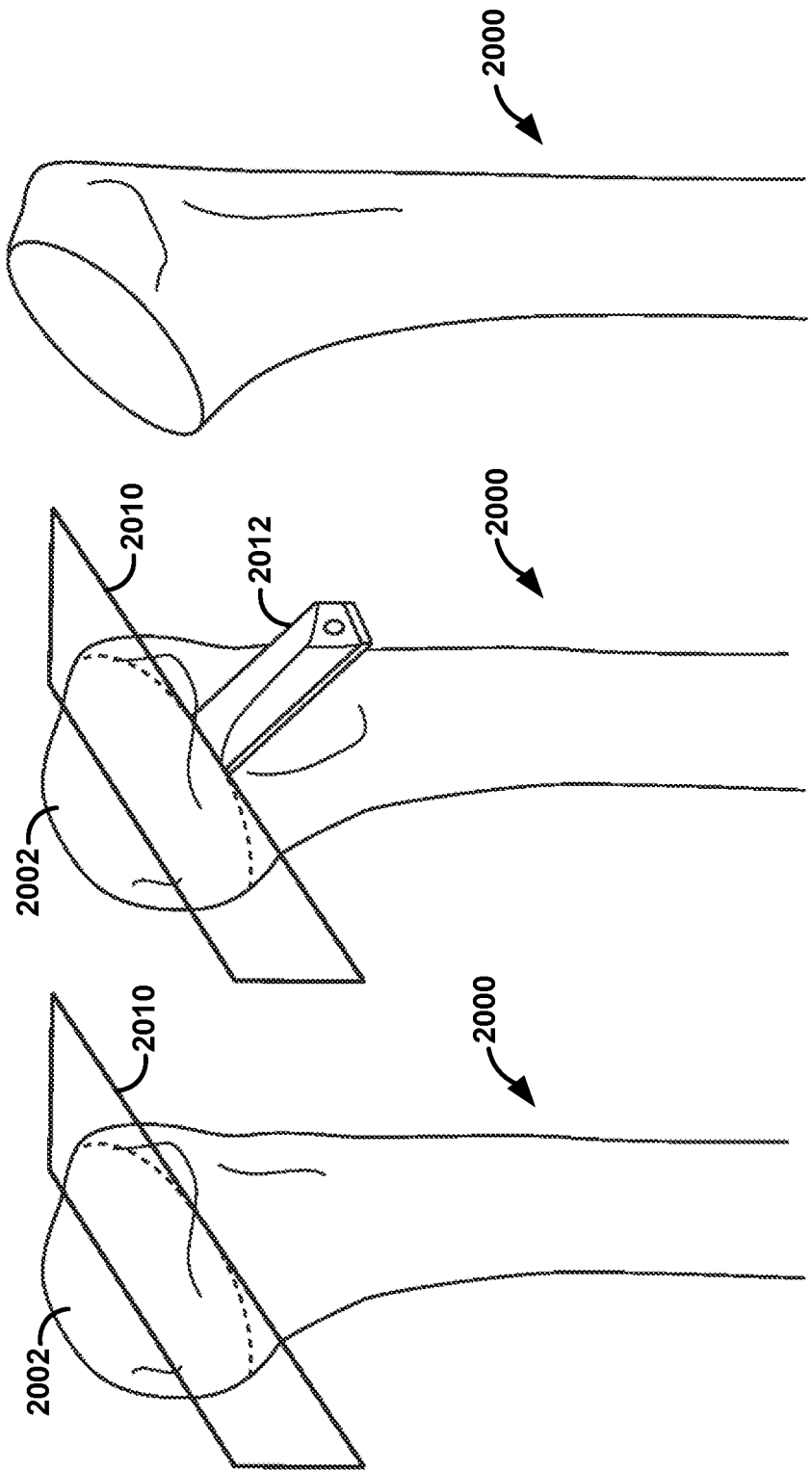

BONE WALL TRACKING AND GUIDANCE FOR ORTHOPEDIC IMPLANT PLACEMENT

This application is a national stage application under 35 U.S.C. § 371 of PCT Application No. PCT/US2020/031097, filed May 1, 2020, which claims the benefit of U.S. Provisional Application No. 62/847,746, filed May 14, 2019 and U.S. Provisional Application No. 62/847,740, filed May 14, 2019. The entire contents of each of PCT Application No. PCT/US2020/031097, U.S. Provisional Application No. 62/847,746 and U.S. Provisional Application No. 62/847, 740 are incorporated herein by reference in their entirety This patent application claims the benefit of U.S. Provisional Patent Application No. 62/847,740, filed May 14, 2019, and U.S. Provisional Patent Application No. 62/847, 746, filed May 14, 2019, the entire content of each of which is incorporated herein by reference.

TECHNICAL FIELD

This disclosure relates to bone wall tracking during orthopedic surgical procedures.

BACKGROUND

Surgical joint repair procedures involve repair and/or replacement of a damaged or diseased joint. Many times, a surgical joint repair procedure, such as joint arthroplasty as an example, involves replacing the damaged joint with a prosthetic that is implanted into the patient's bone. Proper selection of a prosthetic that is appropriately sized and shaped and proper positioning of that prosthetic to ensure an optimal surgical outcome can be challenging. To assist with positioning, the surgical procedure often involves the use of surgical instruments to control the shaping of the surface of the damaged bone and cutting or drilling of bone to accept the prosthetic.

Today, virtual visualization tools are available to surgeons that use three-dimensional modeling of bone shapes to facilitate preoperative planning for joint repairs and replacements. These tools can assist surgeons with the design and/or selection of surgical guides and implants that closely match the patient's anatomy and can improve surgical outcomes by customizing a surgical plan for each patient.

SUMMARY

Surgical joint repair procedures involve repair and/or replacement of a damaged or diseased joint. Many times, a surgical joint repair procedure, such as joint arthroplasty as an example, involves replacing the damaged joint with a prosthetic that is implanted into the patient's bone. Proper selection of a prosthetic that is appropriately sized and shaped and proper positioning of that prosthetic to ensure an optimal surgical outcome can be challenging. To assist with positioning, the surgical procedure often involves the use of surgical instruments to control the shaping of the surface of the damaged bone and cutting or drilling of bone to accept the prosthetic.

According to one example, A device includes a first sensor to sense a first value representative of distance to a bone wall inside a patient; a second sensor configured to sense a second value representative of a distance to an implant component inside the patient; processing circuitry configured to process the first value and the second value; and transmitter circuitry configured to generate an output based on the first value and the second value.

According to another example, a device includes receiver circuitry configured to receive a signal, wherein the signal comprises data indicative of one or more distances between a bone and an implant component, wherein the one or more distances between the bone and the implant component correspond to one or more locations on the bone; and processing circuitry configured to process the data to cause an output device to generate an output based on the one or more distances between the bone and the implant component.

According to another example, a method includes, based on a sensor output from a first sensor, determining a first distance corresponding to a distance between the first sensor and an outer wall of a bone; based on a sensor output from a second sensor, determining a second distance corresponding to distance between the second sensor and a prosthesis; based on the first distance and the second distance, determining a distance from the implant component to the bone; and generating an output based on the distance from the implant component to the bone.

The details of various examples of the disclosure are set forth in the accompanying drawings and the description below. Various features, objects, and advantages will be apparent from the description, drawings, and claims.

BRIEF DESCRIPTION OF THE DRAWINGS

FIGS. 23A-23C are conceptual diagrams illustrating an MR system providing virtual guidance for resection of a humeral head in a shoulder arthroplasty procedure, in accordance with one or more techniques of this disclosure.

DETAILED DESCRIPTION

Figure 1:
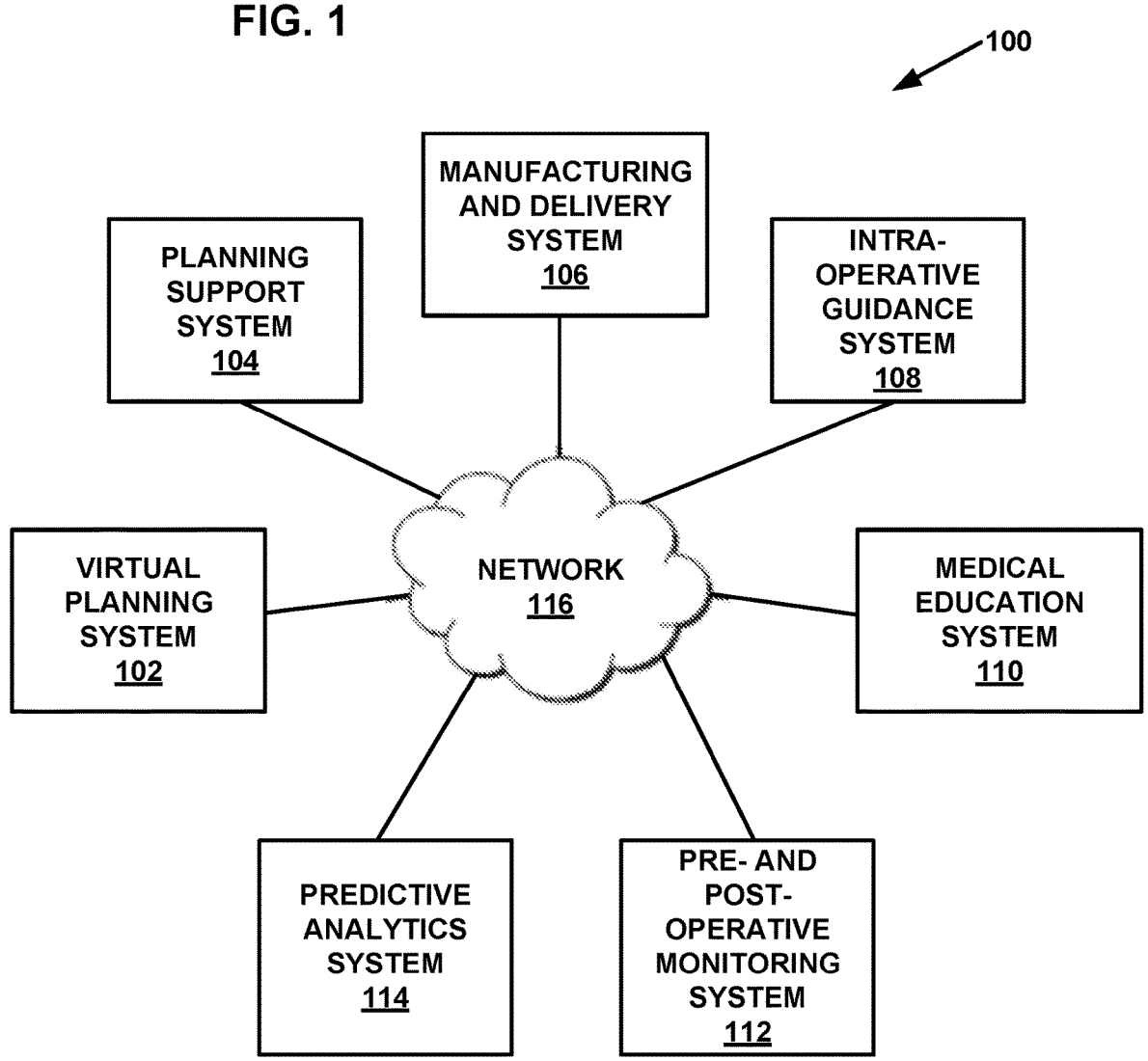
FIG. 1 is a block diagram of an orthopedic surgical system according to an example of this disclosure.

In some orthopedic surgical procedures, it may be generally desirable to avoid, reduce, or limit excursion of an implant component toward selected bone surfaces, e.g., during implantation of such a component by a surgeon, to avoid bone damage such as bone fracture. As an example, a stem of a humeral implant may be placed within a humeral canal to anchor a humeral prosthesis. In placing the stem into the humeral canal, it is generally desirable to keep the stem from getting too close to the inner wall of the cortical bone of the humerus, thereby reducing the risk of fracture. Additionally, distal contact of an implant may cause stress shielding, which can lead to bone loss over time. Low to no visibility of the bone during the surgical procedure, differences in bone quality between patients, and other issues may make it difficult to predict when an implant component will move too close to a selected bone surface, such as the inner wall of the cortical bone in the humeral canal. The techniques of this disclosure include examples for monitoring a spatial relationship between at least a portion of an implant or implant tool (generally referred to as an implant component) and a bone surface during a surgical procedure and, in some examples, providing information to a surgeon based on the monitored spatial relationship during the surgical procedure, e.g., to enable the surgeon to limit movement of the implant component toward the bone, and thereby reduce the risk of bone fractures. The information provided to the surgeon may guide the surgeon in installing the implant component or indicate to the surgeon that a different sized or shaped implant component is desirable.

As used in this disclosure, the terms implant component is intended to be a generic term that may refer to an implantable prosthesis, a portion of an implantable prosthesis, or any other component or tool associated with implantation of an implantable prosthesis. Examples of implant components include, for example, the humeral stem of a humeral implant, a glenoid implant, anchors, screws, and compacting tools.

This disclosure includes multiple different techniques for monitoring the spatial relationship between the implant or implant tool and the bone surface. These techniques may be used independently or may be combined.

According to a first technique of this disclosure, a system with at least two sensors may be used to obtain a first distance value that represents a distance between the first sensor and an implant component and obtain a second distance value that represents a distance between the second sensor and an outer wall of the bone. By subtracting the second distance value from the first distance value, the system can determine the distance between the implant component and the outer wall of the bone. Based on a determined or estimated thickness of the bone wall, the system can additionally, or alternatively, determine the distance between the implant component and the inner wall of the bone. Based on one or both of the determined distances, the system can present one or more outputs to the surgeon that can guide the surgeon's performance of the operation. The outputs may, for example, serve as an indicator that a bone being operated on is not at risk of being fractured by the implant component or serve as an indicator that the bone being operated on is at risk of imminently being fractured by the implant component. Based on a display of implant progress or based on an alert or notification generated in accordance with the techniques of this disclosure, a surgeon may, for example, stop implanting a current implant component before bone fracture occurs. In some cases, based on such an alert or notification, a surgeon may elect to implant a different implant component, such as a smaller implant component that is shorter, has a smaller circumference or diameter, has a different shape, or the like.

According to a second technique of this disclosure, a system may register virtual models of both the implant and the bone to corresponding observed portions of the implant and the bone. The virtual model of the implant may at least include a representation of an outer surface of the implant (e.g., a mesh or a point cloud), and the virtual model of the bone may at least include a representation of one or more walls (e.g., an inner and/or an outer wall) of the bone. The system may monitor the relative positions of the virtual models. As the virtual models are registered to corresponding observed structures (e.g., externally visible bone and/or markers attached to the bone), the relative positions of the virtual models may correspond to the relative positions of the corresponding observed structures. In other words, the relative positions of the outer surface of the implant and the wall(s) of the bone represented by the virtual models may correspond to the actual outer surface of the implant and the actual wall(s) of the bone. Based on the relative positions of the virtual models, the system may determine the distance between the implant and the bone (e.g., one or both of a distance between the outer surface of the implant and the inner wall of the bone, and/or a distance between the outer surface of the implant and the outer wall of the bone). Similar to the first technique, the system can present one or more outputs to the surgeon that can guide the surgeon's performance of the implant placement operation based the determined distance.

Surgical teams may rely on pre-operative imaging, such as CT scans or MRIs, to select the size (e.g., circumferences and length) of an implant component and an implant depth for the implant component. Surgical teams can also use post-operative imaging to confirm that an implant was properly installed. Such imaging, however, generally cannot be used for intraoperative decision making. The techniques of this disclosure may enable a system to provide more precise information to a surgeon regarding implant depth and distance to a cortical wall, which in turn may provide a surgeon with a better idea of when a bone is in danger of fracturing so that the surgeon can take measures, such as selecting a different size or shape of implant component, to avoid the fracture.

As will be explained in more detail below, systems of this disclosure may include either a single device or may include two or more separate devices, such as a sensor device that is wired or wirelessly connected to a display device. The system may additionally, or alternatively, include one or more image-based devices that register virtual models of both the implant component and the bone to corresponding observed portions of the implant and the bone. Many of the techniques of this disclosure will be described, for purposes of illustration, with respect to a humeral implant stem being implanted into a humeral canal or a humerus bone of a human arm as part of a shoulder arthroplasty procedure. Unless stated to the contrary, it should be assumed that the described techniques may also be applicable to surgeries performed on other joints, other bones, and other limbs. Accordingly, the techniques described in this disclosure should not be considered limited to shoulder arthroplasty procedures, but instead may be applied in other procedures and for other joints, bones or limbs.

Orthopedic surgery can involve implanting one or more prosthetic devices to repair or replace a patient's damaged or diseased joint. Today, virtual surgical planning tools are available that use image data of the diseased or damaged joint to generate an accurate three-dimensional bone model that can be viewed and manipulated preoperatively by the surgeon. These tools can enhance surgical outcomes by allowing the surgeon to simulate the surgery, select or design an implant that more closely matches the contours of the patient's actual bone, and select or design surgical instruments and guide tools that are adapted specifically for repairing the bone of a particular patient. Use of these planning tools typically results in generation of a preoperative surgical plan, complete with an implant and surgical instruments that are selected or manufactured for the individual patient. Oftentimes, once in the actual operating environment, the surgeon may desire to verify the preoperative surgical plan intraoperatively relative to the patient's actual bone.

This verification may result in a determination that an adjustment to the preoperative surgical plan is needed, such as a different implant, a different positioning or orientation of the implant, and/or a different surgical guide for carrying out the surgical plan. In addition, a surgeon may want to view details of the preoperative surgical plan relative to the patient's real bone during the actual procedure in order to more efficiently and accurately position and orient the implant components. For example, the surgeon may want to obtain intra-operative visualization that provides guidance for positioning and orientation of implant components, guidance for preparation of bone or tissue to receive the implant components, guidance for reviewing the details of a procedure or procedural step, and/or guidance for selection of tools or implants and tracking of surgical procedure workflow.

Accordingly, this disclosure describes systems and methods for using a mixed reality (MR) visualization system to assist with creation, implementation, verification, and/or modification of a surgical plan before and during a surgical procedure. Because MR, or in some instances VR, may be used to interact with the surgical plan, this disclosure may also refer to the surgical plan as a "virtual" surgical plan. Visualization tools other than or in addition to mixed reality visualization systems may be used in accordance with techniques of this disclosure. A surgical plan, e.g., as generated by the BLUEPRINT™ system, available from Wright Medical Group, N.V., or another surgical planning platform, may include information defining a variety of features of a surgical procedure, such as features of particular surgical procedure steps to be performed on a patient by a surgeon according to the surgical plan including, for example, bone or tissue preparation steps and/or steps for selection, modification and/or placement of implant components. Such information may include, in various examples, dimensions, shapes, angles, surface contours, and/or orientations of implant components to be selected or modified by surgeons, dimensions, shapes, angles, surface contours and/or orientations to be defined in bone or tissue by the surgeon in bone or tissue preparation steps, and/or positions, axes, planes, angle and/or entry points defining placement of implant components by the surgeon relative to patient bone or tissue. Information such as dimensions, shapes, angles, surface contours, and/or orientations of anatomical features of the patient may be derived from imaging (e.g., x-ray, CT, MM, ultrasound or other images), direct observation, or other techniques. In some examples, the virtual In this disclosure, the term "mixed reality" (MR) refers to the presentation of virtual objects such that a user sees images that include both real, physical objects and virtual objects. Virtual objects may include text, 2-dimensional surfaces, 3-dimensional models, or other user-perceptible elements that are not actually present in the physical, real-world environment in which they are presented as coexisting. In addition, virtual objects described in various examples of this disclosure may include graphics, images, animations or videos, e.g., presented as 3D virtual objects or 2D virtual objects. Virtual objects may also be referred to as virtual elements. Such elements may or may not be analogs of real-world objects. In some examples, in mixed reality, a camera may capture images of the real world and modify the images to present virtual objects in the context of the real world. In such examples, the modified images may be displayed on a screen, which may be head-mounted, hand-held, or otherwise viewable by a user. In some examples, in mixed reality, see-through (e.g., transparent) holographic lenses, which may be referred to as waveguides, may permit the user to view real-world objects, i.e., actual objects in a real-world environment, such as real anatomy, through the holographic lenses and also concurrently view virtual objects.

The Microsoft HOLOLENS™ headset, available from Microsoft Corporation of Redmond, Washington, is an example of a MR device that includes see-through holographic lenses, sometimes referred to as waveguides, that permit a user to view real-world objects through the lens and concurrently view projected 3D holographic objects. The Microsoft HOLOLENS™ headset, or similar waveguide-based visualization devices, are examples of an MR visualization device that may be used in accordance with some examples of this disclosure. Some holographic lenses may present holographic objects with some degree of transparency through see-through holographic lenses so that the user views real-world objects and virtual, holographic objects. In some examples, some holographic lenses may, at times, completely prevent the user from viewing real-world objects and instead may allow the user to view entirely virtual environments. The term mixed reality may also encompass scenarios where one or more users are able to perceive one or more virtual objects generated by holographic projection. In other words, "mixed reality" may encompass the case where a holographic projector generates holograms of elements that appear to a user to be present in the user's actual physical environment.

In some examples, in mixed reality, the positions of some or all presented virtual objects are related to positions of physical objects in the real world. For example, a virtual object may be tethered to a table in the real world, such that the user can see the virtual object when the user looks in the direction of the table but does not see the virtual object when the table is not in the user's field of view. In some examples, in mixed reality, the positions of some or all presented virtual objects are unrelated to positions of physical objects in the real world. For instance, a virtual item may always appear in the top right of the user's field of vision, regardless of where the user is looking. Augmented reality (AR) is similar to MR in the presentation of both real-world and virtual elements, but AR generally refers to presentations that are mostly real, with a few virtual additions to "augment" the real-world presentation. For purposes of this disclosure, MR is considered to include AR. For example, in AR, parts of the user's physical environment that are in shadow can be selectively brightened without brightening other areas of the user's physical environment. This example is also an instance of MR in that the selectively-brightened areas may be considered virtual objects superimposed on the parts of the user's physical environment that are in shadow.

Furthermore, in this disclosure, the term "virtual reality" (VR) refers to an immersive artificial environment that a user experiences through sensory stimuli (such as sights and sounds) provided by a computer. Thus, in virtual reality, the user may not see any physical objects as they exist in the real world. Video games set in imaginary worlds are a common example of VR. The term "VR" also encompasses scenarios where the user is presented with a fully artificial environment in which some virtual object's locations are based on the locations of corresponding physical objects as they relate to the user. Walk-through VR attractions are examples of this type of VR.

The term "extended reality" (XR) is a term that encompasses a spectrum of user experiences that includes virtual reality, mixed reality, augmented reality, and other user experiences that involve the presentation of at least some perceptible elements as existing in the user's environment that are not present in the user's real-world environment. Thus, the term "extended reality" may be considered a genus for MR and VR. XR visualizations may be presented in any of the techniques for presenting mixed reality discussed elsewhere in this disclosure or presented using techniques for presenting VR, such as VR goggles.

These mixed reality systems and methods can be part of an intelligent surgical planning system that includes multiple subsystems that can be used to enhance surgical outcomes. In addition to the preoperative and intraoperative applications discussed above, an intelligent surgical planning system can include postoperative tools to assist with patient recovery and which can provide information that can be used to assist with and plan future surgical revisions or surgical cases for other patients.

Accordingly, systems and methods are also described herein that can be incorporated into an intelligent surgical planning system, such as artificial intelligence systems to assist with planning, implants with embedded sensors (e.g., smart implants) to provide postoperative feedback for use by the healthcare provider and the artificial intelligence system, and mobile applications to monitor and provide information to the patient and the healthcare provider in real-time or near real-time.

Visualization tools are available that utilize patient image data to generate three-dimensional models of bone contours to facilitate preoperative planning for joint repairs and replacements. These tools allow surgeons to design and/or select surgical guides and implant components that closely match the patient's anatomy. These tools can improve surgical outcomes by customizing a surgical plan for each patient. An example of such a visualization tool for shoulder repairs is the BLUEPRINT™ system available from Wright Medical Group, N.V. The BLUEPRINT™ system provides the surgeon with two-dimensional planar views of the bone repair region as well as a three-dimensional virtual model of the repair region. The surgeon can use the BLUEPRINT™ system to select, design or modify appropriate implant components, determine how best to position and orient the implant components and how to shape the surface of the bone to receive the components, and design, select or modify surgical guide tool(s) or instruments to carry out the surgical plan. The information generated by the BLUE-PRINT™ system is compiled in a preoperative surgical plan for the patient that is stored in a database at an appropriate location (e.g., on a server in a wide area network, a local area network, or a global network) where it can be accessed by the surgeon or other care provider, including before and during the actual surgery.

FIG. 1 is a block diagram of an orthopedic surgical system 100 according to an example of this disclosure. Orthopedic surgical system 100 includes a set of subsystems. In the example of FIG. 1, the subsystems include a virtual planning system 102, a planning support system 104, a manufacturing and delivery system 106, an intraoperative guidance system 108, a medical education system 110, a monitoring system 112, a predictive analytics system 114, and a communication network 116. In other examples, orthopedic surgical system 100 may include more, fewer, or different subsystems. For example, orthopedic surgical system 100 may omit medical education system 110, monitoring system 112, predictive analytics system 114, and/or other subsystems. In some examples, orthopedic surgical system 100 may be used for surgical tracking, in which case orthopedic surgical system 100 may be referred to as a surgical tracking system. In other cases, orthopedic surgical system 100 may be generally referred to as a medical device system.

Users of orthopedic surgical system 100 may use virtual planning system 102 to plan orthopedic surgeries. Users of orthopedic surgical system 100 may use planning support system 104 to review surgical plans generated using orthopedic surgical system 100. Manufacturing and delivery system 106 may assist with the manufacture and delivery of items needed to perform orthopedic surgeries. Intraoperative guidance system 108 provides guidance to assist users of orthopedic surgical system 100 in performing orthopedic surgeries. Medical education system 110 may assist with the education of users, such as healthcare professionals, patients, and other types of individuals. Pre- and postoperative monitoring system 112 may assist with monitoring patients before and after the patients undergo surgery. Predictive analytics system 114 may assist healthcare professionals with various types of predictions. For example, predictive analytics system 114 may apply artificial intelligence techniques to determine a classification of a condition of an orthopedic joint, e.g., a diagnosis, determine which type of surgery to perform on a patient and/or which type of implant to be used in the procedure, determine types of items that may be needed during the surgery, and so on.

The subsystems of orthopedic surgical system 100 (i.e., virtual planning system 102, planning support system 104, manufacturing and delivery system 106, intraoperative guidance system 108, medical education system 110, pre- and postoperative monitoring system 112, and predictive analytics system 114) may include various systems. The systems in the subsystems of orthopedic surgical system 100 may include various types of computing systems, computing devices, including server computers, personal computers, tablet computers, smartphones, display devices, Internet of Things (IoT) devices, visualization devices (e.g., MR visualization devices, VR visualization devices, holographic projectors, or other devices for presenting XR visualizations), surgical tools, and so on. A holographic projector, in some examples, may project a hologram for general viewing by multiple users or a single user without a headset, rather than viewing only by a user wearing a headset. For example, virtual planning system 102 may include a MR visualization device and one or more server devices, planning support system 104 may include one or more personal computers and one or more server devices, and so on. A computing system is a set of one or more computing systems configured to operate as a system. In some examples, one or more devices may be shared between the two or more of the subsystems of orthopedic surgical system 100. For instance, in the previous examples, virtual planning system 102 and planning support system 104 may include the same server devices.

In the example of FIG. 1, the devices included in the subsystems of orthopedic surgical system 100 may communicate using communication network 116. Communication network 116 may include various types of communication networks including one or more wide-area networks, such as the Internet, local area networks, and so on. In some examples, communication network 116 may include wired and/or wireless communication links.

Figure 2:
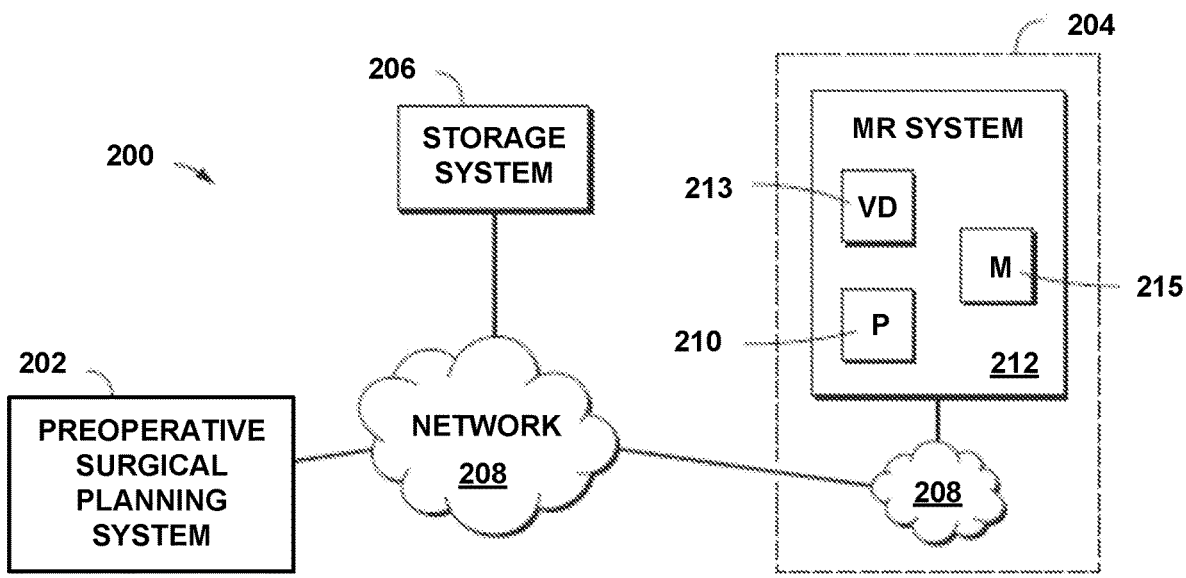
FIG. 2 is a block diagram of an orthopedic surgical system that includes a mixed reality (MR) system, according to an example of this disclosure.

Many variations of orthopedic surgical system 100 are possible in accordance with techniques of this disclosure. Such variations may include more or fewer subsystems than the version of orthopedic surgical system 100 shown in FIG. 1. For example, FIG. 2 is a block diagram of an orthopedic surgical system 200 that includes one or more MR systems, according to an example of this disclosure. Orthopedic surgical system 200 may be used for creating, verifying, updating, modifying and/or implementing a surgical plan. In some examples, the surgical plan can be created preoperatively, such as by using a virtual surgical planning system (e.g., the BLUEPRINT™ system), and then verified, modified, updated, and viewed intraoperatively, e.g., using MR visualization of the surgical plan. In other examples, orthopedic surgical system 200 can be used to create the surgical plan immediately prior to surgery or intraoperatively, as needed. In some examples, orthopedic surgical system 200 may be used for surgical tracking, in which case orthopedic surgical system 200 may be referred to as a surgical tracking system. In other cases, orthopedic surgical system 200 may be generally referred to as a medical device system.

In the example of FIG. 2, orthopedic surgical system 200 includes a preoperative surgical planning system 202, a healthcare facility 204 (e.g., a surgical center or hospital), a storage system 206 and a network 208 that allows a user at healthcare facility 204 to access stored patient information, such as medical history, image data corresponding to the damaged joint or bone and various parameters corresponding to a surgical plan that has been created preoperatively (as examples). Preoperative surgical planning system 202 may be equivalent to virtual planning system 102 of FIG. 1 and, in some examples, may generally correspond to a virtual planning system similar or identical to the BLUEPRINT™ system.

In the example of FIG. 2, healthcare facility 204 includes MR system 212. In some examples of this disclosure, MR system 212 includes one or more processing device(s) (P) 210 to provide functionalities that will be described in further detail below. Processing device(s) 210 may also be referred to as processor(s). In addition, one or more users of MR system 212 (e.g., a surgeon, nurse, or other care provider) can use processing device(s) (P) 210 to generate a request for a particular surgical plan or other patient information that is transmitted to storage system 206 via network 208. In response, storage system 206 returns the requested patient information to MR system 212. In some examples, the users can use other processing device(s) to request and receive information, such as one or more processing devices that are part of MR system 212, but not part of any visualization device, or one or more processing devices that are part of a visualization device (e.g., visualization device 213) of MR system 212, or a combination of one or more processing devices that are part of MR system 212, but not part of any visualization device, and one or more processing devices that are part of a visualization device (e.g., visualization device 213) that is part of MR system 212.

In some examples, multiple users can simultaneously use MR system 212. For example, MR system 212 can be used in a spectator mode in which multiple users each use their own visualization devices so that the users can view the same information at the same time and from the same point of view. In some examples, MR system 212 may be used in a mode in which multiple users each use their own visualization devices so that the users can view the same information from different points of view.

In some examples, processing device(s) 210 can provide a user interface to display data and receive input from users at healthcare facility 204. Processing device(s) 210 may be configured to control visualization device 213 to present a user interface. Furthermore, processing device(s) 210 may be configured to control visualization device 213 to present virtual images, such as 3D virtual models, 2D images, and so on. Processing device(s) 210 can include a variety of different processing or computing devices, such as servers, desktop computers, laptop computers, tablets, mobile phones and other electronic computing devices, or processors within such devices. In some examples, one or more of processing device(s) 210 can be located remote from healthcare facility 204. In some examples, processing device(s) 210 reside within visualization device 213. In some examples, at least one of processing device(s) 210 is external to visualization device 213. In some examples, one or more processing device(s) 210 reside within visualization device 213 and one or more of processing device(s) 210 are external to visualization device 213.

In the example of FIG. 2, MR system 212 also includes one or more memory or storage device(s) (M) 215 for storing data and instructions of software that can be executed by processing device(s) 210. The instructions of software can correspond to the functionality of MR system 212 described herein. In some examples, the functionalities of a virtual surgical planning application, such as the BLUE-PRINT™ system, can also be stored and executed by processing device(s) 210 in conjunction with memory storage device(s) (M) 215. For instance, memory or storage system 215 may be configured to store data corresponding to at least a portion of a virtual surgical plan. In some examples, storage system 206 may be configured to store data corresponding to at least a portion of a virtual surgical plan. In some examples, memory or storage device(s) (M) 215 reside within visualization device 213. In some examples, memory or storage device(s) (M) 215 are external to visualization device 213. In some examples, memory or storage device(s) (M) 215 include a combination of one or more memory or storage devices within visualization device 213 and one or more memory or storage devices external to the visualization device.

Network 208 may be equivalent to network 116. Network 208 can include one or more wide area networks, local area networks, and/or global networks (e.g., the Internet) that connect preoperative surgical planning system 202 and MR system 212 to storage system 206. Storage system 206 can include one or more databases that can contain patient information, medical information, patient image data, and parameters that define the surgical plans. For example, medical images of the patient's diseased or damaged bone typically are generated preoperatively in preparation for an orthopedic surgical procedure. The medical images can include images of the relevant bone(s) taken along the sagittal plane and the coronal plane of the patient's body. The medical images can include X-ray images, magnetic resonance imaging (Mill) images, computerized tomography (CT) images, ultrasound images, and/or any other type of 2D or 3D image that provides information about the relevant surgical area. Storage system 206 also can include data identifying the implant components selected for a particular patient (e.g., type, size, etc.), surgical guides selected for a particular patient, and details of the surgical procedure, such as entry points, cutting planes, drilling axes, reaming depths, etc. Storage system 206 can be a cloud-based storage system (as shown) or can be located at healthcare facility 204 or at the location of preoperative surgical planning system 202 or can be part of MR system 212 or visualization device (VD) 213, as examples.

MR system 212 can be used by a surgeon before (e.g., preoperatively) or during the surgical procedure (e.g., intraoperatively) to create, review, verify, update, modify and/or implement a surgical plan. In some examples, MR system 212 may also be used after the surgical procedure (e.g., postoperatively) to review the results of the surgical procedure, assess whether revisions are required, or perform other postoperative tasks. To that end, MR system 212 may include a visualization device 213 that may be worn by the surgeon and (as will be explained in further detail below) is operable to display a variety of types of information, including a 3D virtual image of the patient's diseased, damaged, or postsurgical joint and details of the surgical plan, such as a 3D virtual image of the prosthetic implant components selected for the surgical plan, 3D virtual images of entry points for positioning the prosthetic components, alignment axes and cutting planes for aligning cutting or reaming tools to shape the bone surfaces, or drilling tools to define one or more holes in the bone surfaces, in the surgical procedure to properly orient and position the prosthetic components, surgical guides and instruments and their placement on the damaged joint, and any other information that may be useful to the surgeon to implement the surgical plan. MR system 212 can generate images of this information that are perceptible to the user of the visualization device 213 before and/or during the surgical procedure.

In some examples, MR system 212 includes multiple visualization devices (e.g., multiple instances of visualization device 213) so that multiple users can simultaneously see the same images and share the same 3D scene. In some such examples, one of the visualization devices can be designated as the master device and the other visualization devices can be designated as observers or spectators. Any observer device can be re-designated as the master device at any time, as may be desired by the users of MR system 212.

In this way, FIG. 2 illustrates a surgical planning system that includes a preoperative surgical planning system 202 to generate a virtual surgical plan customized to repair an anatomy of interest of a particular patient. For example, the virtual surgical plan may include a plan for an orthopedic joint repair surgical procedure, such as one of a standard total shoulder arthroplasty or a reverse shoulder arthroplasty. In this example, details of the virtual surgical plan may include details relating to at least one of preparation of glenoid bone or preparation of humeral bone. In some examples, the orthopedic joint repair surgical procedure is one of a stemless standard total shoulder arthroplasty, a stemmed standard total shoulder arthroplasty, a stemless reverse shoulder arthroplasty, a stemmed reverse shoulder arthroplasty, an augmented glenoid standard total shoulder arthroplasty, and an augmented glenoid reverse shoulder arthroplasty.

The virtual surgical plan may include a 3D virtual model corresponding to the anatomy of interest of the particular patient, a 3D model of one or more tools, and/or a 3D model of a prosthetic component matched to the particular patient to repair the anatomy of interest or selected to repair the anatomy of interest. In some examples, the 3D model may include a point cloud or mesh (e.g., polygonal mesh, wireframe, etc.) that represents a feature of the corresponding object. As one example, a 3D model of a patient's bone may include a point cloud or mesh that represents a wall of the bone. As another example, a 3D model of a patient's bone may include a first point cloud or mesh that represents an inner wall of the bone and a second point cloud or mesh that represents an outer wall of the bone. As another example, a 3D model of a prosthetic component (e.g., an implant) may include a point cloud or mesh that represents an outer surface of at least a portion of the prosthetic component (e.g., the portion that is inserted into the bone). As another example, a 3D model of an implant tool may include a point cloud or mesh that represents an outer surface of at least a portion of the implant tool (e.g., the portion that is inserted into the bone).

Furthermore, in the example of FIG. 2, the surgical planning system includes a storage system 206 to store data corresponding to the virtual surgical plan. The surgical planning system of FIG. 2 also includes MR system 212, which may comprise visualization device 213. In some examples, visualization device 213 is wearable by a user. In some examples, visualization device 213 is held by a user, or rests on a surface in a place accessible to the user. MR system 212 may be configured to present a user interface via visualization device 213. The user interface is visually perceptible to the user using visualization device 213. For instance, in one example, a screen of visualization device 213 may display real-world images and the user interface on a screen. In some examples, visualization device 213 may project virtual, holographic images onto see-through holographic lenses and also permit a user to see real-world objects of a real-world environment through the lenses. In other words, visualization device 213 may comprise one or more see-through holographic lenses and one or more display devices that present imagery to the user via the holographic lenses to present the user interface to the user.

In some examples, visualization device 213 is configured such that the user can manipulate the user interface (which is visually perceptible to the user when the user is wearing or otherwise using visualization device 213) to request and view details of the virtual surgical plan for the particular patient, including a 3D virtual model of the anatomy of interest (e.g., a 3D virtual bone of the anatomy of interest) and a 3D model of the prosthetic component selected to repair an anatomy of interest. In some such examples, visualization device 213 is configured such that the user can manipulate the user interface so that the user can view the virtual surgical plan intraoperatively, including (at least in some examples) the 3D virtual model of the anatomy of interest (e.g., a 3D virtual bone of the anatomy of interest). In some examples, MR system 212 can be operated in an augmented surgery mode in which the user can manipulate the user interface intraoperatively so that the user can visually perceive details of the virtual surgical plan projected in a real environment, e.g., on a real anatomy of interest of the particular patient. In this disclosure, the terms real and real world may be used in a similar manner. For example, MR system 212 may present one or more virtual objects that provide guidance for preparation of a bone surface and placement of a prosthetic implant on the bone surface. Visualization device 213 may present one or more virtual objects in a manner in which the virtual objects appear to be overlaid on an actual, real anatomical object of the patient, within a real-world environment, e.g., by displaying the virtual object(s) with actual, real-world patient anatomy viewed by the user through holographic lenses. For example, the virtual objects may be 3D virtual objects that appear to reside within the real-world environment with the actual, real anatomical object.

Figure 3:
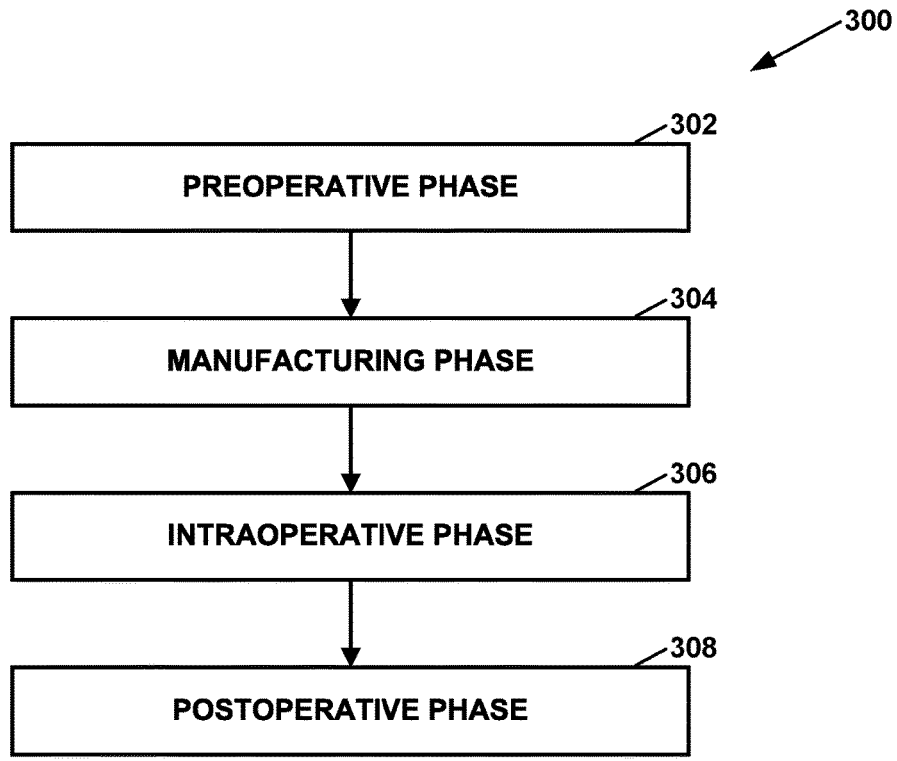
FIG. 3 is a flowchart illustrating example phases of a surgical lifecycle.

FIG. 3 is a flowchart illustrating example phases of a surgical lifecycle 300. In the example of FIG. 3, surgical lifecycle 300 begins with a preoperative phase (302). During the preoperative phase, a surgical plan is developed. The preoperative phase is followed by a manufacturing and delivery phase (304). During the manufacturing and delivery phase, patient-specific items, such as parts and equipment, needed for executing the surgical plan are manufactured and delivered to a surgical site. In some examples, it is unnecessary to manufacture patient-specific items in order to execute the surgical plan. An intraoperative phase follows the manufacturing and delivery phase (306). The surgical plan is executed during the intraoperative phase. In other words, one or more persons perform the surgery on the patient during the intraoperative phase. The intraoperative phase is followed by the postoperative phase (308). The postoperative phase includes activities occurring after the surgical plan is complete. For example, the patient may be monitored during the postoperative phase for complications.

As described in this disclosure, orthopedic surgical system 100 (FIG. 1) may be used in one or more of preoperative phase 302, the manufacturing and delivery phase 304, the intraoperative phase 306, and the postoperative phase 308. For example, virtual planning system 102 and planning support system 104 may be used in preoperative phase 302. Manufacturing and delivery system 106 may be used in the manufacturing and delivery phase 304. Intraoperative guidance system 108 may be used in intraoperative phase 306. Some of the systems of FIG. 1 may be used in multiple phases of FIG. 3. For example, medical education system 110 may be used in one or more of preoperative phase 302, intraoperative phase 306, and postoperative phase 308; pre- and postoperative monitoring system 112 may be used in preoperative phase 302 and postoperative phase 308. Predictive analytics system 114 may be used in preoperative phase 302 and postoperative phase 308.

As mentioned above, one or more of the subsystems of orthopedic surgical system 100 may include one or more MR systems, such as MR system 212 (FIG. 2). Each MR system may include a visualization device. For instance, in the example of FIG. 2, MR system 212 includes visualization device 213. In some examples, in addition to including a visualization device, an MR system may include external computing resources that support the operations of the visualization device. For instance, the visualization device of an MR system may be communicatively coupled to a computing device (e.g., a personal computer, backpack computer, smartphone, etc.) that provides the external computing resources. Alternatively, adequate computing resources may be provided on or within visualization device 213 to perform necessary functions of the visualization device.

Figure 4:
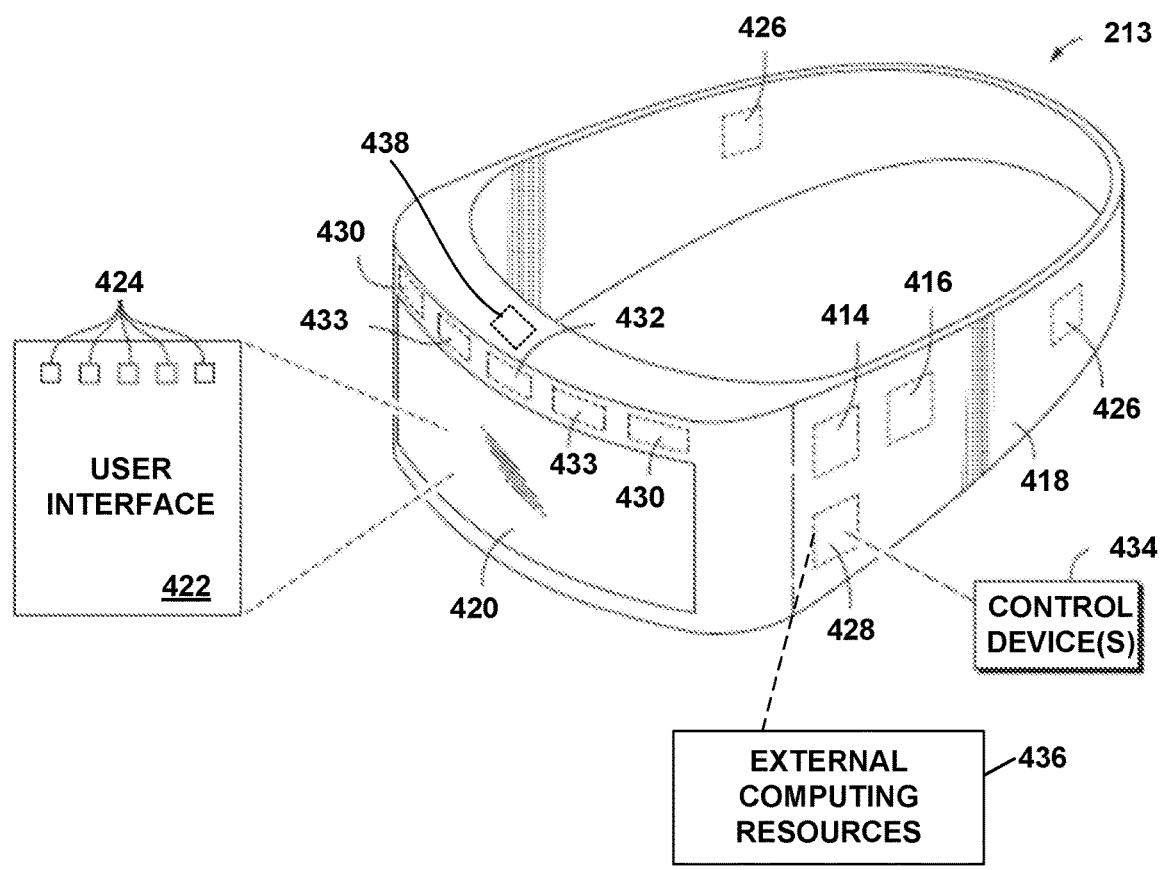
FIG. 4 is a schematic representation of a visualization device for use in a mixed reality (MR) system, according to an example of this disclosure.

FIG. 4 is a schematic representation of visualization device 213 for use in an MR system, such as MR system 212 of FIG. 2, according to an example of this disclosure. As shown in the example of FIG. 4, visualization device 213 can include a variety of electronic components found in a computing system, including one or more processor(s) 414 (e.g., microprocessors or other types of processing units) and memory 416 that may be mounted on or within a frame 418. Furthermore, in the example of FIG. 4, visualization device 213 may include a transparent screen 420 that is positioned at eye level when visualization device 213 is worn by a user. In some examples, screen 420 can include one or more liquid crystal displays (LCDs) or other types of display screens on which images are perceptible to a surgeon who is wearing or otherwise using visualization device 213 via screen 420. Other display examples include organic light emitting diode (OLED) displays. In some examples, visualization device 213 can operate to project 3D images onto the user's retinas using techniques known in the art.

In some examples, screen 420 may include see-through holographic lenses, sometimes referred to as waveguides, that permit a user to see real-world objects through (e.g., beyond) the lenses and also see holographic imagery projected into the lenses and onto the user's retinas by displays, such as liquid crystal on silicon (LCoS) display devices, which are sometimes referred to as light engines or projectors, operating as an example of a holographic projection system 438 within visualization device 213. In other words, visualization device 213 may include one or more see-through holographic lenses to present virtual images to a user. Hence, in some examples, visualization device 213 can operate to project 3D images onto the user's retinas via screen 420, e.g., formed by holographic lenses. In this manner, visualization device 213 may be configured to present a 3D virtual image to a user within a real-world view observed through screen 420, e.g., such that the virtual image appears to form part of the real-world environment. In some examples, visualization device 213 may be a Microsoft HOLOLENS™ headset, available from Microsoft Corporation, of Redmond, Washington, USA, or a similar device, such as, for example, a similar MR visualization device that includes waveguides. The HOLOLENS™ device can be used to present 3D virtual objects via holographic lenses, or waveguides, while permitting a user to view actual objects in a real-world scene, i.e., in a real-world environment, through the holographic lenses.

Although the example of FIG. 4 illustrates visualization device 213 as a head-wearable device, visualization device 213 may have other forms and form factors. For instance, in some examples, visualization device 213 may be a handheld smartphone or tablet.

Visualization device 213 can also generate a user interface (UI) 422 that is visible to the user, e.g., as holographic imagery projected into see-through holographic lenses as described above. For example, UI 422 can include a variety of selectable widgets 424 that allow the user to interact with a MR system, such as MR system 212 of FIG. 2. Imagery presented by visualization device 213 may include, for example, one or more 3D virtual objects. Details of an example of UI 422 are described elsewhere in this disclosure. Visualization device 213 also can include a speaker or other sensory devices 426 that may be positioned adjacent the user's ears. Sensory devices 426 can convey audible information or other perceptible information (e.g., vibrations) to assist the user of visualization device 213.

Visualization device 213 can also include a transceiver 428 to connect visualization device 213 to a processing device 410 and/or to network 208 and/or to a computing cloud, such as via a wired communication protocol or a wireless protocol, e.g., Wi-Fi, Bluetooth, etc. Visualization device 213 also includes a variety of sensors to collect sensor data, such as one or more optical camera(s) 430 (or other optical sensors) and one or more depth camera(s) 432 (or other depth sensors), mounted to, on or within frame 418. In some examples, the optical sensor(s) 430 are operable to scan the geometry of the physical environment in which user of MR system 212 is located (e.g., an operating room) and collect two-dimensional (2D) optical image data (either monochrome or color). Depth sensor(s) 432 are operable to provide 3D image data, such as by employing time of flight, stereo or other known or future-developed techniques for determining depth and thereby generating image data in three dimensions. Other sensors can include motion sensors 433 (e.g., Inertial Mass Unit (IMU) sensors, accelerometers, etc.) to assist with tracking movement.

MR system 212 processes the sensor data so that geometric, environmental, textural, etc. landmarks (e.g., corners, edges or other lines, walls, floors, objects) in the user's environment or "scene" can be defined and movements within the scene can be detected. As an example, the various types of sensor data can be combined or fused so that the user of visualization device 213 can perceive 3D images that can be positioned, or fixed and/or moved within the scene. When fixed in the scene, the user can walk around the 3D image, view the 3D image from different perspectives, and manipulate the 3D image within the scene using hand gestures, voice commands, gaze line (or direction) and/or other control inputs. As another example, the sensor data can be processed so that the user can position a 3D virtual object (e.g., a bone model) on an observed physical object in the scene (e.g., a surface, the patient's real bone, etc.) and/or orient the 3D virtual object with other virtual images displayed in the scene. As yet another example, the sensor data can be processed so that the user can position and fix a virtual representation of the surgical plan (or other widget, image or information) onto a surface, such as a wall of the operating room. Yet further, the sensor data can be used to recognize surgical instruments and the position and/or location of those instruments.

Visualization device 213 may include one or more processors 414 and memory 416, e.g., within frame 418 of the visualization device. In some examples, one or more external computing resources 436 process and store information, such as sensor data, instead of or in addition to in-frame processor(s) 414 and memory 416. In this way, data processing and storage may be performed by one or more processors 414 and memory 416 within visualization device 213 and/or some of the processing and storage requirements may be offloaded from visualization device 213. Hence, in some examples, one or more processors that control the operation of visualization device 213 may be within the visualization device, e.g., as processor(s) 414. Alternatively, in some examples, at least one of the processors that controls the operation of visualization device 213 may be external to the visualization device, e.g., as processor(s) 210. Likewise, operation of visualization device 213 may, in some examples, be controlled in part by a combination one or more processors 414 within the visualization device and one or more processors 210 external to the visualization device.

For instance, in some examples, when visualization device 213 is in the context of FIG. 2, processing of the sensor data can be performed by processing device(s) 210 in conjunction with memory or storage device(s) (M) 215. In some examples, processor(s) 414 and memory 416 mounted to frame 418 may provide sufficient computing resources to process the sensor data collected by cameras 430, 432 and motion sensors 433. In some examples, the sensor data can be processed using a Simultaneous Localization and Mapping (SLAM) algorithm, or other known or future-developed algorithm for processing and mapping 2D and 3D image data and tracking the position of visualization device 213 in the 3D scene. In some examples, image tracking may be performed using sensor processing and tracking functionality provided by the Microsoft HOLOLENS™ system, e.g., by one or more sensors and processors 414 within a visualization device 213 substantially conforming to the Microsoft HOLOLENS™ device or a similar MR visualization device.

In some examples, MR system 212 can also include user-operated control device(s) 434 that allow the user to operate MR system 212, use MR system 212 in spectator mode (either as master or observer), interact with UI 422 and/or otherwise provide commands or requests to processing device(s) 210 or other systems connected to network 208. As examples, the control device(s) 234 can include a microphone, a touch pad, a control panel, a motion sensor or other types of control input devices with which the user can interact.

Figure 5:
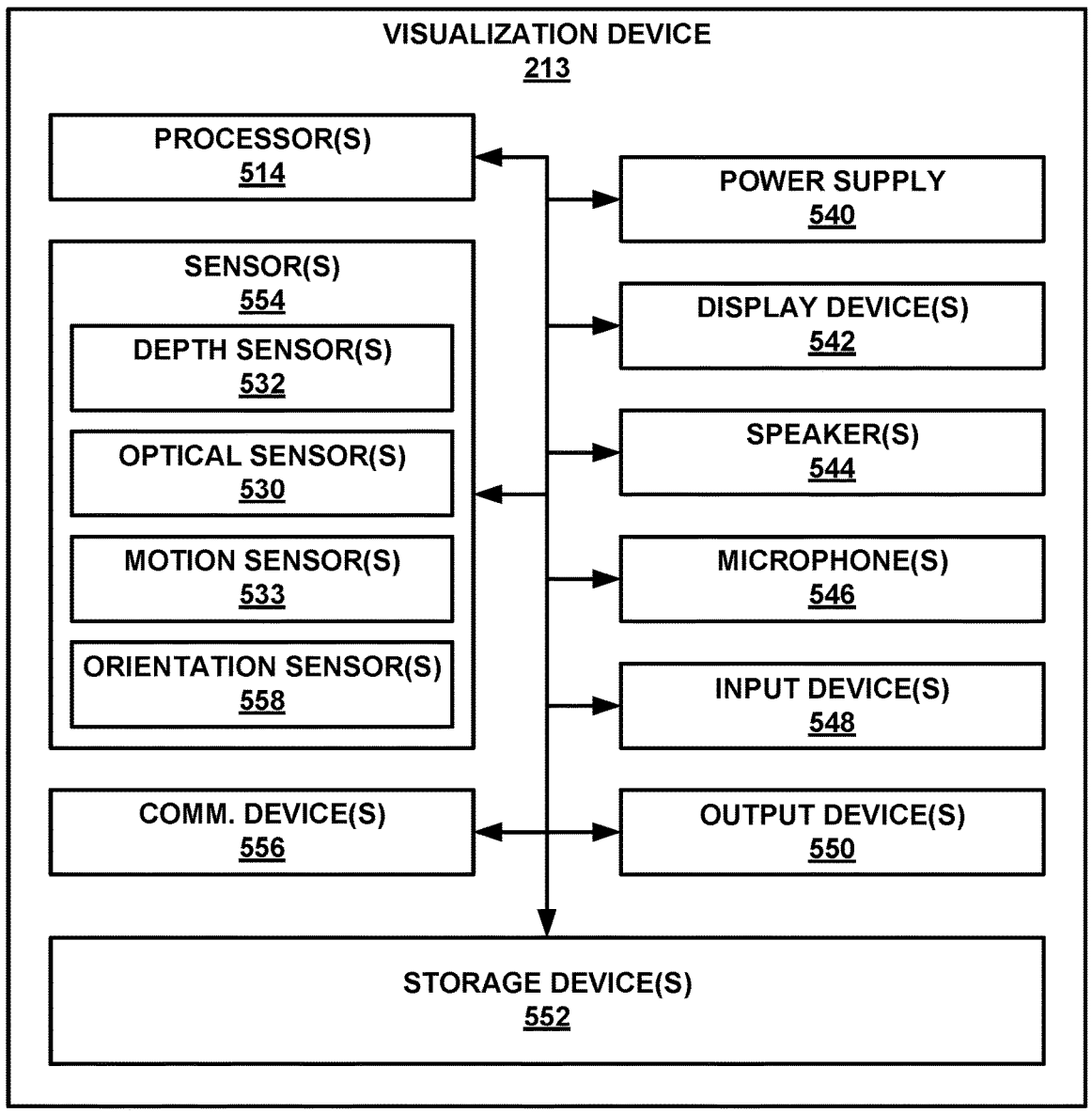
FIG. 5 is a block diagram illustrating example components of a visualization device for use in a mixed reality (MR) system, according to an example of this disclosure.

FIG. 5 is a block diagram illustrating example components of visualization device 213 for use in a MR system. In the example of FIG. 5, visualization device 213 includes processors 514, a power supply 540, display device(s) 542, speakers 544, microphone(s) 546, input device(s) 548, output device(s) 550, storage device(s) 552, sensor(s) 554, and communication devices 556. In the example of FIG. 5, sensor(s) 554 may include depth sensor(s) 532, optical sensor(s) 530, motion sensor(s) 533, and orientation sensor(s) 558. Optical sensor(s) 530 may include cameras, such as Red-Green-Blue (RGB) video cameras, infrared cameras, or other types of sensors that form images from light. Display device(s) 542 may display imagery to present a user interface to the user.

Speakers 544, in some examples, may form part of sensory devices 526 shown in FIG. 4. In some examples, display devices 542 may include screen 520 shown in FIG. 4. For example, as discussed with reference to FIG. 4, display device(s) 542 may include see-through holographic lenses, in combination with projectors, that permit a user to see real-world objects, in a real-world environment, through the lenses, and also see virtual 3D holographic imagery projected into the lenses and onto the user's retinas, e.g., by a holographic projection system. In this example, virtual 3D holographic objects may appear to be placed within the real-world environment. In some examples, display devices 542 include one or more display screens, such as LCD display screens, OLED display screens, and so on. The user interface may present virtual images of details of the virtual surgical plan for a particular patient.

In some examples, a user may interact with and control visualization device 213 in a variety of ways. For example, microphones 546, and associated speech recognition processing circuitry or software, may recognize voice commands spoken by the user and, in response, perform any of a variety of operations, such as selection, activation, or deactivation of various functions associated with surgical planning, intra-operative guidance, or the like. As another example, one or more cameras or other optical sensors 530 of sensors 554 may detect and interpret gestures to perform operations as described above. As a further example, sensors 554 may sense gaze direction and perform various operations as described elsewhere in this disclosure. In some examples, input devices 548 may receive manual input from a user, e.g., via a handheld controller including one or more buttons, a keypad, a touchscreen, joystick, trackball, and/or other manual input media, and perform, in response to the manual user input, various operations as described above.

As discussed above, surgical lifecycle 300 may include a preoperative phase 302 (FIG. 3). One or more users may use orthopedic surgical system 100 in preoperative phase 302. For instance, orthopedic surgical system 100 may include virtual planning system 102 to help the one or more users generate a virtual surgical plan that may be customized to an anatomy of interest of a particular patient. As described herein, the virtual surgical plan may include a 3-dimensional virtual model that corresponds to the anatomy of interest of the particular patient and a 3-dimensional model of one or more prosthetic components matched to the particular patient to repair the anatomy of interest or selected to repair the anatomy of interest. The virtual surgical plan also may include a 3-dimensional virtual model of guidance information to guide a surgeon in performing the surgical procedure, e.g., in preparing bone surfaces or tissue and placing implantable prosthetic hardware relative to such bone surfaces or tissue.

Figure 6:
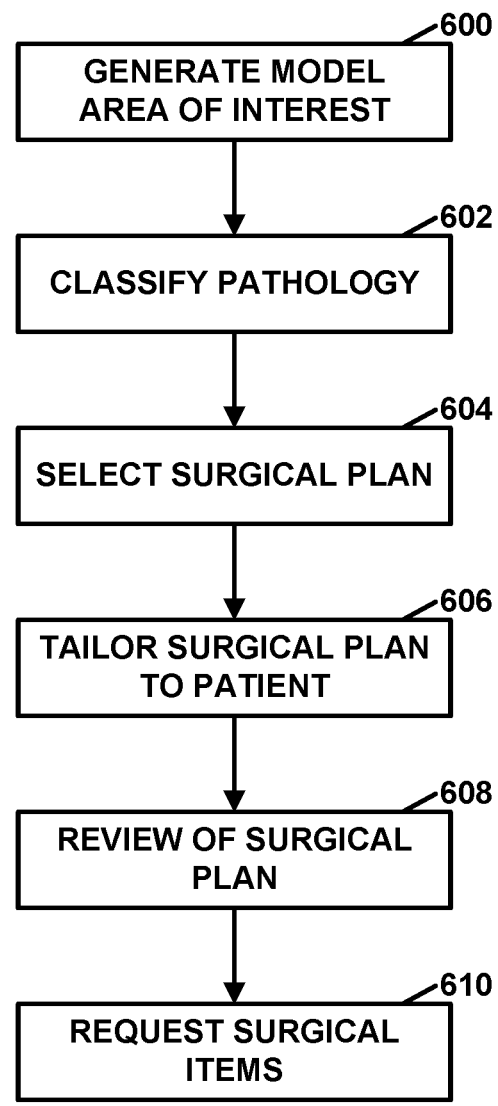
FIG. 6 is a flowchart illustrating example steps in the preoperative phase of the surgical lifecycle.

FIG. 6 is a flowchart illustrating example steps in preoperative phase 302 of surgical lifecycle 300. In other examples, preoperative phase 302 may include more, fewer, or different steps. Moreover, in other examples, one or more of the steps of FIG. 6 may be performed in different orders. In some examples, one or more of the steps may be performed automatically within a surgical planning system such as virtual planning system 102 (FIG. 1) or preoperative surgical planning system 202 (FIG. 2).

In the example of FIG. 6, a model of the area of interest is generated (600). For example, a scan (e.g., a CT scan, MRI scan, or other type of scan) of the area of interest may be performed. For example, if the area of interest is the patient's shoulder, a scan of the patient's shoulder may be performed. The virtual planning system may generate a virtual model (e.g., a three-dimensional virtual model) of the area of interest based on the scan. Furthermore, a pathology in the area of interest may be classified (602). In some examples, the pathology of the area of interest may be classified based on the scan of the area of interest. For example, if the area of interest is the user's shoulder, a surgeon may determine what is wrong with the patient's shoulder based on the scan of the patient's shoulder and provide a shoulder classification indicating the diagnosis, e.g., such as primary glenoid humeral osteoarthritis (PGHOA), rotator cuff tear arthropathy (RCTA) instability, massive rotator cuff tear (MRCT), rheumatoid arthritis, post-traumatic arthritis, and osteoarthritis.

Additionally, a surgical plan may be selected based on the pathology (604). The surgical plan is a plan to address the pathology. For instance, in the example where the area of interest is the patient's shoulder, the surgical plan may be selected from an anatomical shoulder arthroplasty, a reverse shoulder arthroplasty, a post-trauma shoulder arthroplasty, or a revision to a previous shoulder arthroplasty. The surgical plan may then be tailored to patient (606). For instance, tailoring the surgical plan may involve selecting and/or sizing surgical items needed to perform the selected surgical plan. Additionally, the surgical plan may be tailored to the patient in order to address issues specific to the patient, such as the presence of osteophytes. As described in detail elsewhere in this disclosure, one or more users may use mixed reality systems of orthopedic surgical system 100 to tailor the surgical plan to the patient.

The surgical plan may then be reviewed (608). For instance, a consulting surgeon may review the surgical plan before the surgical plan is executed. As described in detail elsewhere in this disclosure, one or more users may use MR systems of orthopedic surgical system 100 to review the surgical plan. In some examples, a surgeon may modify the surgical plan using an MR system by interacting with a UI and displayed elements, e.g., to select a different procedure, change the sizing, shape or positioning of implants, or change the angle, depth or amount of cutting or reaming of the bone surface to accommodate an implant.

Additionally, in the example of FIG. 6, surgical items needed to execute the surgical plan may be requested (610).

As described in the following sections of this disclosure, orthopedic surgical system 100 may assist various users in performing one or more of the preoperative steps of FIG. 6. In some examples, one or more users, including at least one surgeon, may use orthopedic surgical system 100 in an intraoperative setting to perform shoulder surgery.

Figure 7:
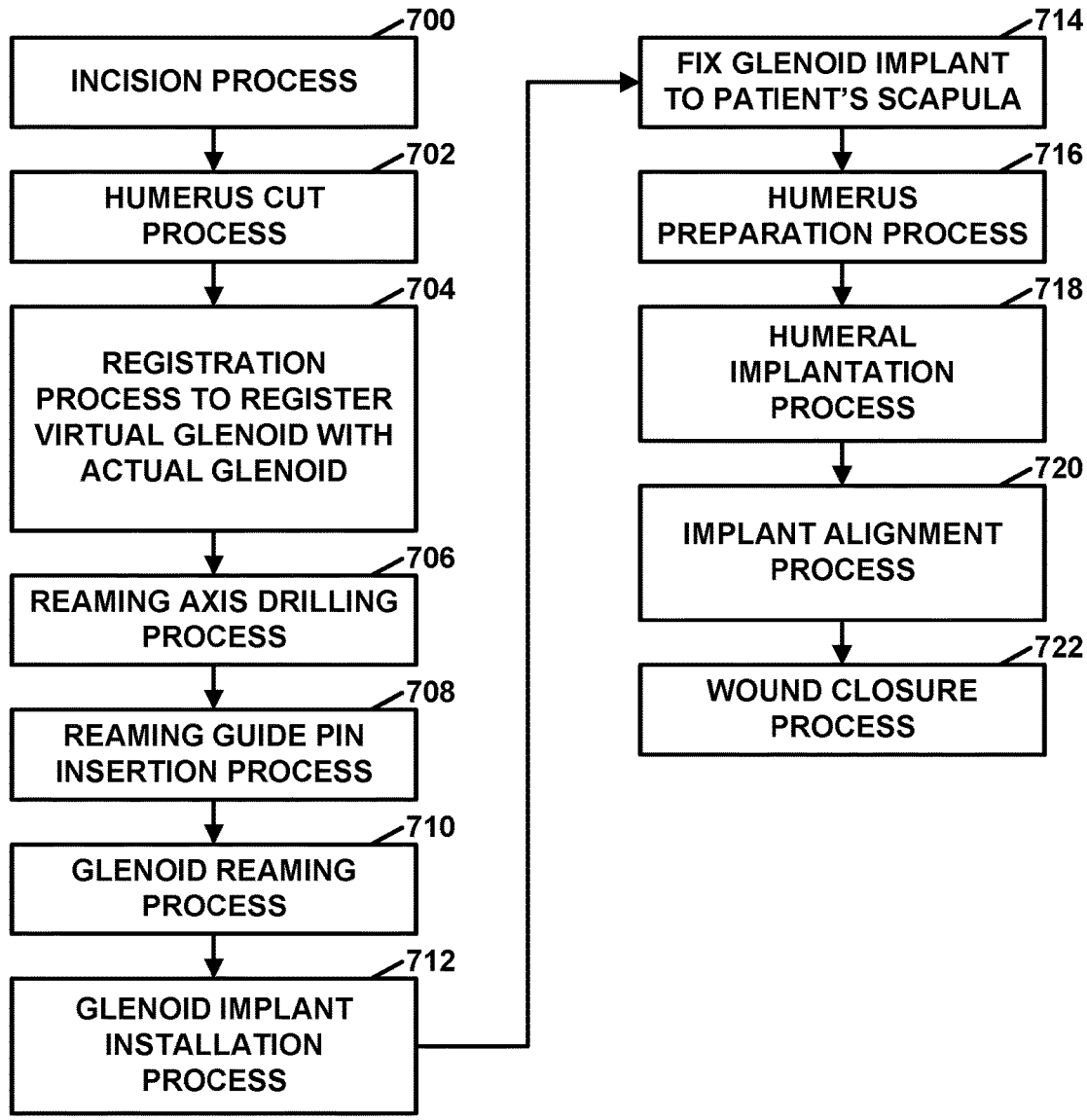
FIG. 7 is a flowchart illustrating example stages of a shoulder joint repair surgery.

FIG. 7 is a flowchart illustrating example stages of a shoulder joint repair surgery. As discussed above, FIG. 7 describes an example surgical process for a shoulder surgery. The surgeon may wear or otherwise use visualization device 213 during each step of the surgical process. In other examples, a shoulder surgery may include more, fewer, or different steps. For example, a shoulder surgery may include step for adding a bone graft, adding cement, and/or other steps. In some examples, visualization device 213 may present virtual guidance to guide the surgeon, nurse, or other users, through the steps in the surgical workflow.

In the example of FIG. 7, a surgeon performs an incision process (700). During the incision process, the surgeon makes a series of incisions to expose a patient's shoulder joint. In some examples, an MR system (e.g., MR system 212, etc.) may help the surgeon perform the incision process, e.g., by displaying virtual guidance imagery illustrating how to where to make the incision.

Furthermore, in the example of FIG. 7, the surgeon may perform a humerus cut process (702). During the humerus cut process, the surgeon may remove a portion of the humeral head of the patient's humerus. Removing the portion of the humeral head may allow the surgeon to access the patient's glenoid. Additionally, removing the portion of the humeral head may allow the surgeon to subsequently replace the portion of the humeral head with a humeral implant compatible with a glenoid implant that the surgeon plans to implant in the patient's glenoid.

As discussed above, the humerus preparation process may enable the surgeon to access the patient's glenoid. In the example of FIG. 7, after performing the humerus preparation process, the surgeon may perform a registration process that registers a virtual glenoid object with the patient's actual glenoid bone (704) in the field of view presented to the surgeon by visualization device 213.

Figure 8A:
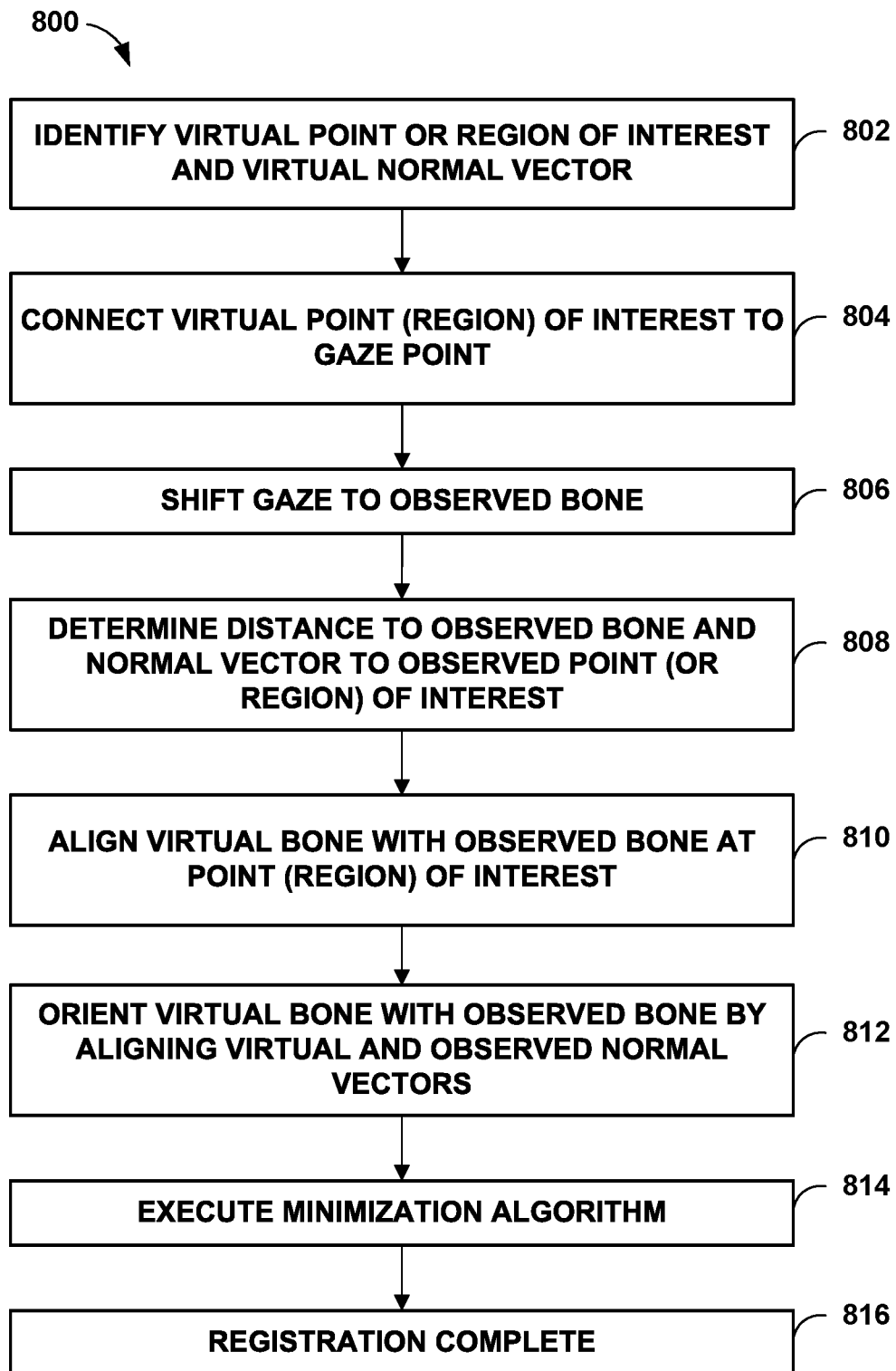
FIGS. 8A and 8B illustrate example techniques for registering a 3-dimensional virtual bone model with an observed real bone structure of a patient during joint repair surgery.
Figure 8B:
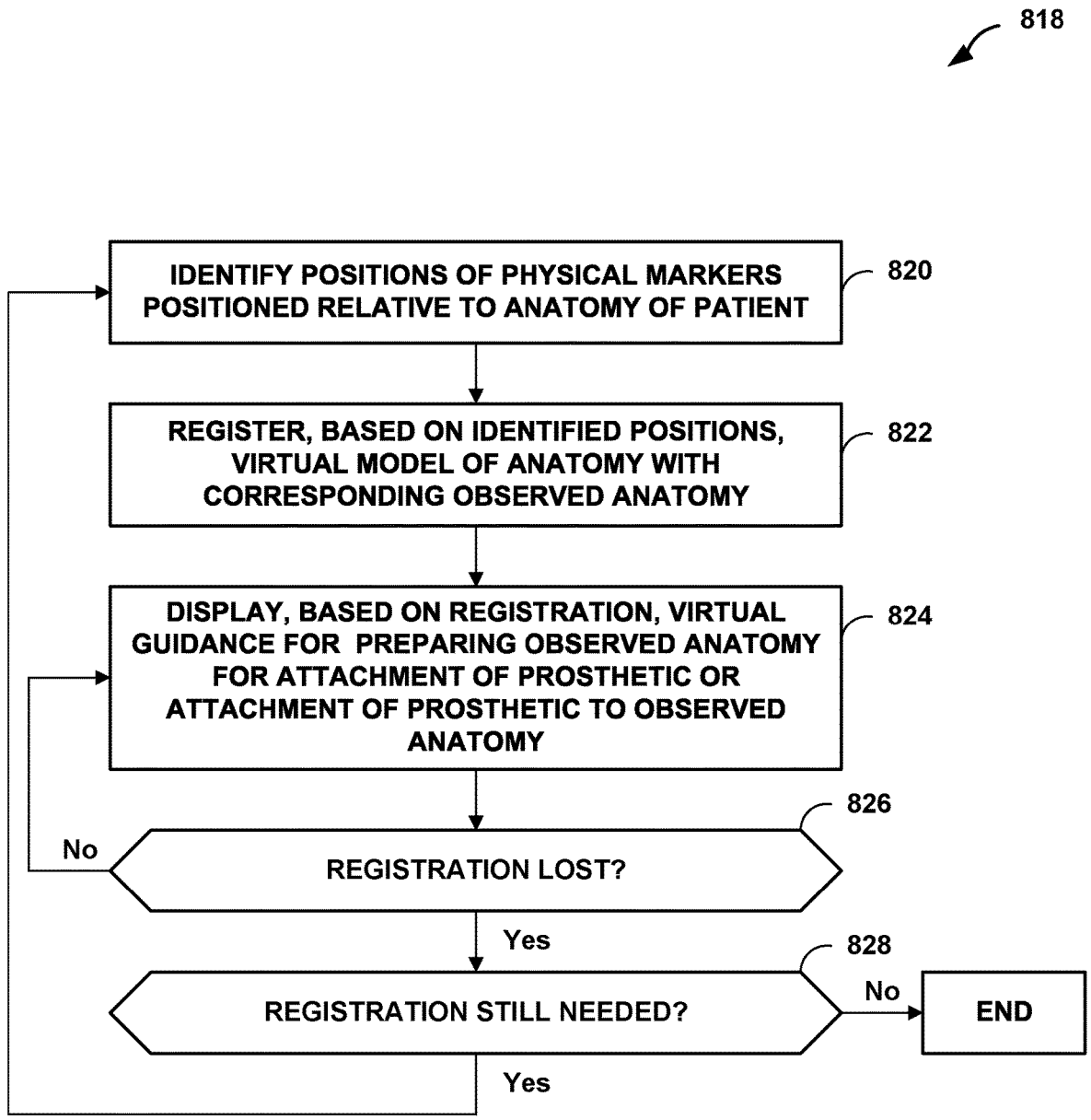

FIG. 8A illustrates an example of a technique 800 for registering a 3D virtual bone model with a real observed bone structure of a patient In other words, FIG. 8A is an example of a process flow, e.g., performed by visualization device 213, for registering a virtual bone model with an observed bone that is implemented in a mixed reality system, such as the mixed reality system 212 of FIG. 2. FIG. 8B, described below, illustrates another technique 818 for registering a 3D virtual bone model with a bone structure, using physical registration markers. The 3D virtual bone model and real observed bone structure described in FIGS. 8A and 8B may, for example correspond, respectively, to 3D virtual bone model 1008 and real observed bone structure 252 described below in conjunction with FIGS. 9-16.

With further reference to FIG. 8A, the 3D virtual bone model may be a model of all or part of one or more bones. The process flow of FIG. 8A may be performed as part of the registration process of step 704 of FIG. 7. The registration process may be carried out in two steps: initialization and optimization (e.g., minimization). During initialization, the user of MR system 212 uses the visualization device 213 in conjunction with information derived from the preoperative virtual planning system 102, the orientation of the user's head (which provides an indication of the direction of the user's eyes (referred to as "gaze" or "gaze line"), rotation of the user's head in multiple directions, sensor data collected by the sensors 530, 532 and/or 533 (or other acquisitions sensors), and/or voice commands and/or hand gestures to visually achieve an approximate alignment of the 3D virtual bone model with the observed bone structure. More particularly, at block 802, a point or region of interest on the surface of the 3D virtual bone model and a virtual normal vector to the point (or region) of interest on the surface of the region are identified during the preoperative planning using the virtual planning system 102.

At block 804, MR system 212 connects the identified point (or region) of interest to the user's gaze point (e.g., a central point in the field of view of visualization device 213). Thus, when the head of the user of visualization device 213 is then moved or rotated, the 3D virtual bone model also moves and rotates in space.

In the example of a shoulder arthroplasty procedure, the point of interest on the surface of the 3D virtual bone model can be an approximate center of the virtual glenoid that can be determined by using a virtual planning system 102, such as the BLUEPRINT™ planning system. In some examples, the approximate center of the virtual glenoid can be determined using a barycenter find algorithm, with the assistance of machine learning algorithms or artificial intelligence systems, or using another type of algorithm. For other types of bone repair/replacement procedures, other points or regions of the bone can be identified and then connected to the user's gaze line or gaze point.

The ability to move and rotate the 3D virtual bone model in space about the user's gaze point alone generally is not sufficient to orient the 3D virtual bone model with the observed bone. Thus, as part of the initialization procedure, MR system 212 also determines the distance between visualization device 213 and a point (or points) on the surface of the observed bone in the field of view of visualization device 213 and the orientation of that surface using sensor data collected from the depth, optical, and motion sensors 530, 532, 533 (block 808). For example, a glenoid is a relatively simple surface because, locally, it can be approximated by a plane. Thus, the orientation of the glenoid surface can be approximated by determining a vector that is normal (i.e., perpendicular) to a point (e.g., a central point) on the surface. This normal vector is referred to herein as the "observed normal vector." It should be understood, however, that other bones may have more complex surfaces, such as the humerus or knee. For these more complex cases, other surface descriptors may be used to determine orientation.

Regardless of the particular bone, distance information can be derived by MR system 212 from depth camera(s) 532. This distance information can be used to derive the geometric shape of the surface of an observed bone. That is, because depth camera(s) 532 provide distance data corresponding to any point in a field of view of depth camera(s) 532, the distance to the user's gaze point on the observed bone can be determined. With this information, the user can then move the 3D virtual bone model in space and approximately align it with the observed bone at a point or region of interest using the gaze point (block 810 in FIG. 8A). That is, when the user shifts gaze to the observed bone structure, the virtual bone model (which is connected to the user's gaze line) moves with the user's gaze. The user can then align the 3D virtual bone model with the observed bone structure by moving the user's head (and thus the gaze line), using hand gestures, using voice commands, and/or using a virtual interface to adjust the position of the 3D virtual bone model. For instance, once the 3D virtual bone model is approximately aligned with the observed bone structure, the user may provide a voice command (e.g., "set") that causes MR system 212 to capture the initial alignment. The orientation ("yaw" and "pitch") of the 3D model can be adjusted by rotating the user's head, using hand gestures, using voice commands, and/or using a virtual interface which rotates the 3D virtual bone model about the user's gaze line so that an initial (or approximate) alignment of the virtual and observed objects can be achieved (block 812 in FIG. 8A). In this manner, the 3D virtual bone model is oriented with the observed bone by aligning the virtual and observed normal vectors. Additional adjustments of the initial alignment can be performed as needed. For instance, after providing the voice command, the user may provide additional user input to adjust an orientation or a position of the 3D virtual bone model relative to the observed bone structure. This initial alignment process is performed intraoperatively (or in real time) so that the surgeon can approximately align the virtual and observed bones. In some examples, such as where the surgeon determines that the initial alignment is inadequate, the surgeon may provide user input (e.g., a voice command, such as "reset") that causes MR system 212 to release the initial alignment such that point 280 is again locked to the user's gaze line.

At block 814 of FIG. 8A, when the user detects (e.g., sees) that an initial alignment of the 3D virtual bone model with the observed bone structure has been achieved (at least approximately), the user can provide an audible or other perceptible indication to inform MR system 212 that a fine registration process (i.e., execution of an optimization (e.g., minimization) algorithm) can be started. For instance, the user may provide a voice command (e.g., "match") that causes MR system 212 to execute a minimization algorithm to perform the fine registration process. The optimization process can employ any suitable optimization algorithm (e.g., a minimization algorithm such as an Iterative Closest Point or genetic algorithm) to perfect an alignment of the 3D virtual bone model with the observed bone structure. At block 816 of FIG. 8A, upon completion of execution of the optimization algorithm, the registration procedure is complete.

Figure 9:
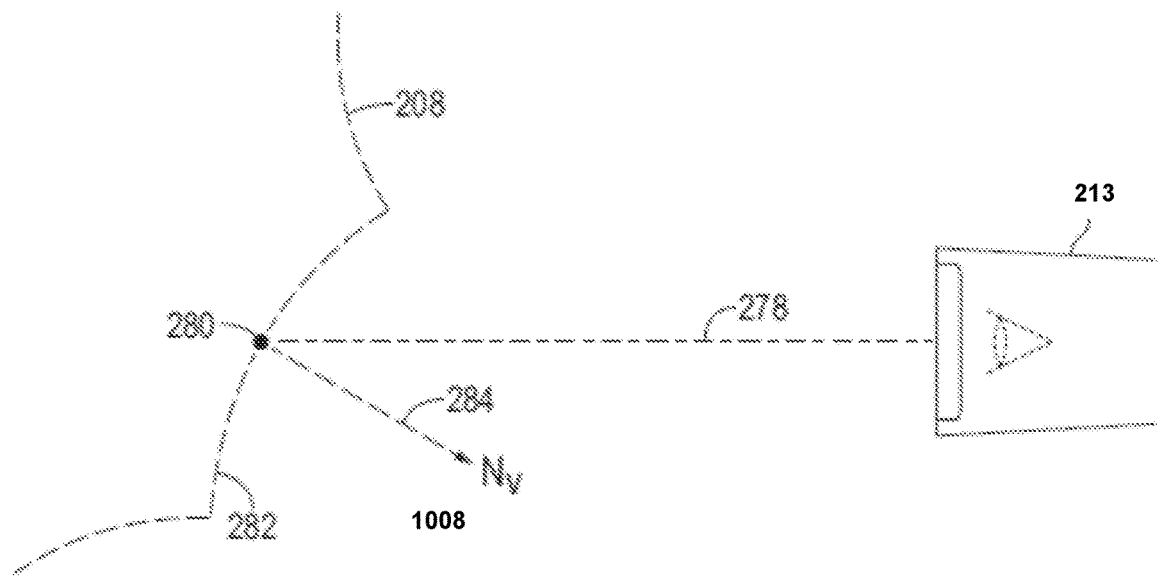
FIG. 9 is a conceptual diagram illustrating steps of an example registration process for a shoulder arthroplasty procedure.
Figure 10:
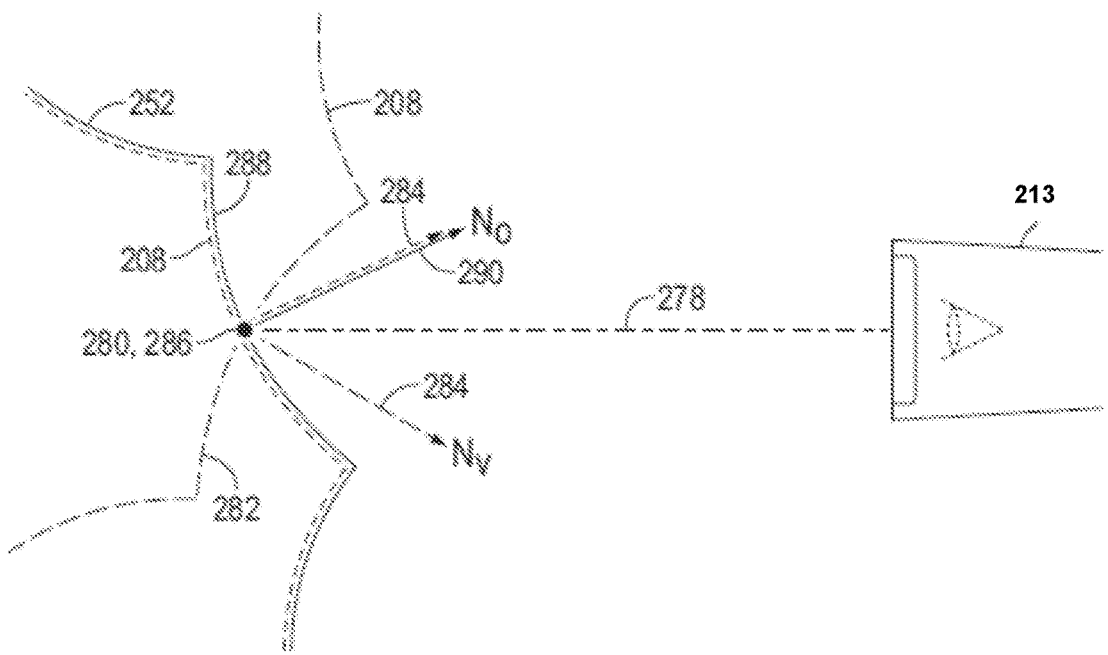
FIG. 10 is a conceptual diagram illustrating additional steps of the example registration process of the shoulder arthroplasty procedure of FIG. 9.

FIG. 9 is a conceptual diagram illustrating steps of an example registration process for a shoulder arthroplasty procedure. FIG. 10 is a conceptual diagram illustrating additional steps of the example registration process of the shoulder arthroplasty procedure of FIG. 9. In FIG. 9, a gaze line 278 of a user of visualization device 213 is connected with the previously identified point of interest (or gaze point) 280 on a surface 282 of 3D virtual bone model 1008 (a glenoid). FIG. 9 also shows a virtual normal vector (Nv) 284 to point 280 on surface 282. In FIG. 10, the user of visualization device 213 shifts gaze line 278 to a region of interest 286 on surface 288 of observed bone structure 252. Because gaze line 278 is connected to the center point 280 of virtual bone model 1008, shifting gaze line 278 aligns virtual center point 280 of virtual bone model 1008 with the observed region of interest 286. However, as shown in FIG. 10, simply shifting the gaze aligns the center points/regions 280, 286, but may not properly orient the virtual bone model 1008 (shown in dashed lines) with observed bone structure 252. Once an observed normal vector (No) 290 is determined as discussed above, visualization device 213 can adjust the orientation (pitch and yaw) of virtual bone model 1008 until the proper orientation is achieved (shown in dotted lines) and virtual normal vector (Nv) 284 is aligned with observed normal vector 290. The user may rotate virtual bone model 1008 around the aligned axes passing through the glenoid for proper alignment of virtual bone model 1008 with the corresponding real bone.

Figure 11:
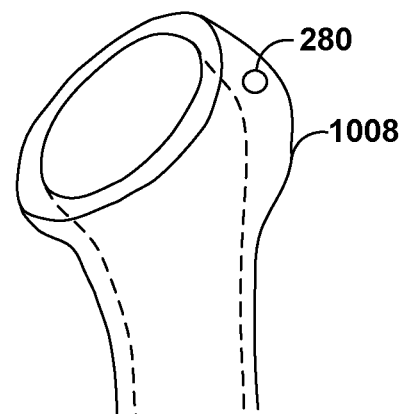
FIG. 11 and FIG. 12 are conceptual diagrams further illustrating an example registration process for a shoulder arthroplasty procedure.
Figure 12:
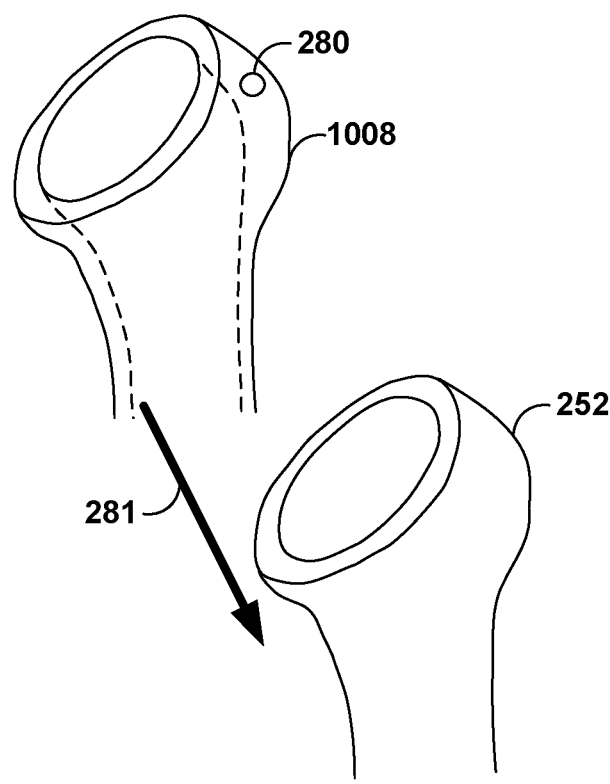

FIG. 11 and FIG. 12 are conceptual diagrams illustrating an example registration process for a shoulder arthroplasty procedure. Similar to the registration process shown in FIG. 9, FIG. 11 illustrates the viewpoint of a user of visualization device 213. As shown in FIG. 11, point of interest 280 is shown on virtual bone model 1008. As discussed above, as the gaze of the user is connected to point 280, the user may move virtual bone model 1008 by shifting their gaze, in which case visualization device 213 detects the gaze shift and moves the virtual bone model in a corresponding manner. As shown in FIG. 12, to align virtual bone model 1008 with observed bone structure 252, the user may shift their gaze in the direction indicated by arrow 281.

For some surgical bone repair procedures, such as shoulder arthroplasties, alignment and orientation of the virtual and observed bone using only the user's gaze can be challenging. These challenges arise due to many factors, including that the bone (e.g., glenoid) is located quite deep under the skin so that even after the surgical incision is made, it can be difficult to position the visualization device 213 close to the bone; shadows may obscure the bone; the entire bone surface of interest may not be visible; and it can be difficult for the user to maintain a steady and stable gaze which can result in instability in the positioning of the virtual bone. In some examples, to address these challenges, the registration procedure can be facilitated through the use of virtual landmark(s) placed at specific location(s) on the bone (e.g., the center of the glenoid for a shoulder arthroplasty procedure). In such examples, the location at which the virtual landmark is placed and the surface normal at that location can be used to automatically determine the initialization transformation (or registration transformation) for the virtual and observed bones. If desired, the alignment achieved between the virtual and observed bone using the virtual landmark can be further adjusted by the user using voice commands, hand gestures, virtual interface buttons, and/or by positioning additional virtual markers at various locations on the bone surface.

Figure 13:
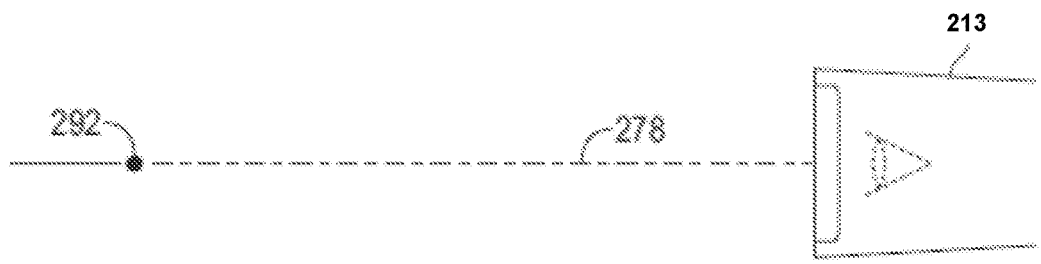
FIG. 13 is a conceptual diagram illustrating an example registration procedure using a virtual marker.
Figure 14:
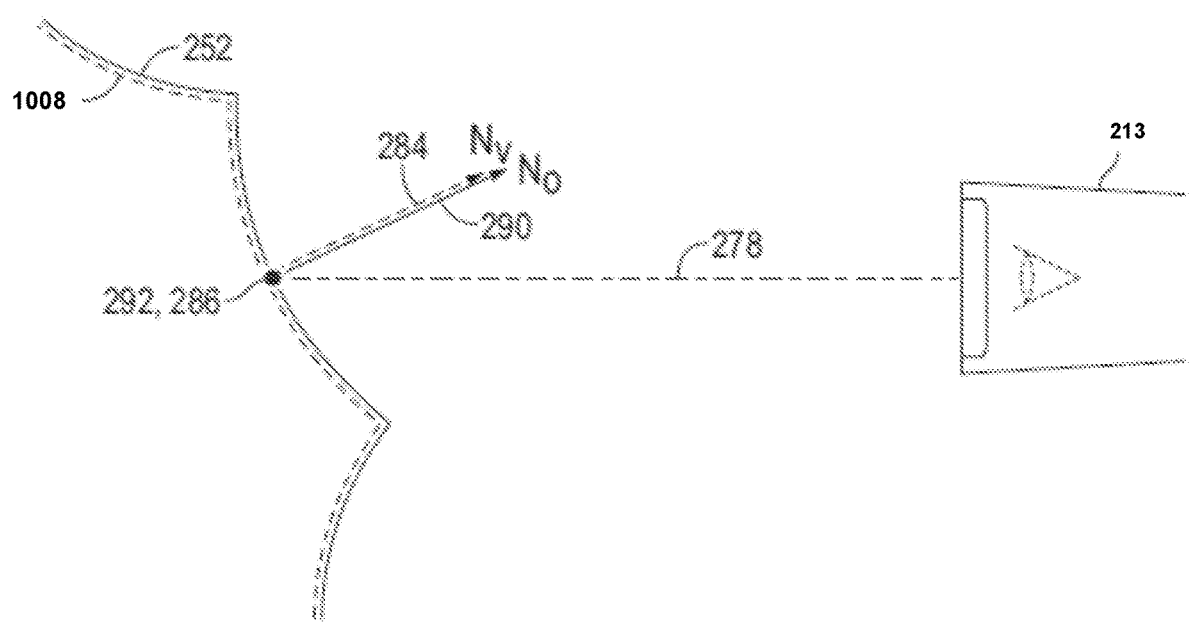
FIG. 14 is a conceptual diagram illustrating additional steps of the example registration procedure of FIG. 13 using a virtual marker.

FIG. 13 illustrates an example registration procedure using a virtual marker 292. FIG. 14 is a conceptual diagram illustrating additional steps of the example registration procedure of FIG. 8A using a virtual marker. In the example of FIG. 13 and FIG. 14, the user of visualization device 213 shifts a gaze line 278 to set virtual marker 292 at a center region 286 (e.g., center point) of observed bone structure 252. With the help of the virtually positioned marker 292, the virtual normal vector 284 and the observed normal vector 290, the initialization transformation between virtual bone model 1008 and observed bone structure 252 can be determined. Then, the optimization algorithm (or registration algorithm) is executed, as described above, in order to obtain an optimal registration between virtual bone model 1008 and observed bone structure 252.

In some examples, the initialization procedure can be implemented based on a region of interest on the bone surface instead of a point of interest. In such examples, the image data collected by the depth and/or optical camera(s) 530, 532 (FIG. 4) of visualization device 213 can be processed to detect surface descriptors that will facilitate identification of the position and orientation of the observed bone and to determine an initialization transformation between the virtual and observed bones.

As discussed above, in some examples, the initialization may be aided by the user (e.g., aided by the user shifting gaze line 278 to set virtual marker 292 at a center region 286 of observed bone structure 252). In some examples, MR system 212 may perform the entire registration process (e.g., including any initialization steps) with minimal or no aid from the user. For instance, MR system 212 may process the image data collected by the depth and/or optical camera(s) 530, 532 (FIG. 4) to automatically identify a location of the anatomy of interest (e.g., observed bone structure 252). As such, MR system 212 may register a virtual model of a portion of anatomy to a corresponding observed portion of anatomy in response to the user looking at the portion of anatomy (e.g., the surgeon, while wearing visualization device 213, may merely look at the portion of anatomy). MR system 212 may automatically identify the location using any suitable technique. For example, MR system 212 may use a machine learned model (i.e., use machine learning, such as a random forest algorithm) to process the image data and identify the location of the anatomy of interest.

In more general terms, the registration method described with reference to FIGS. 8A and 8B can be viewed as determining a first local reference coordinate system with respect to the 3D virtual model and determining a second local reference coordinate system with respect to the observed real anatomy. In some examples, MR system 212 also can use the optical image data collected from optical cameras 530 and/or depth cameras 532 and/or motion sensors 533 (or any other acquisition sensor) to determine a global reference coordinate system with respect to the environment (e.g., operating room) in which the user is located. In other examples, the global reference coordinate system can be defined in other manners. In some examples, depth cameras 532 are externally coupled to visualization device 213, which may be a mixed reality headset, such as the Microsoft HOLOLENS' headset or a similar MR visualization device. For instance, depth cameras 532 may be removable from visualization device 213. In some examples, depth cameras 532 are part of visualization device 213, which again may be a mixed reality headset. For instance, depth cameras 532 may be contained within an outer housing of visualization device 213.

The registration process results in generation of a transformation matrix that then allows for translation along the x, y, and z axes of the 3D virtual bone model and rotation about the x, y and z axes in order to achieve and maintain alignment between the virtual and observed bones.

Figure 16:
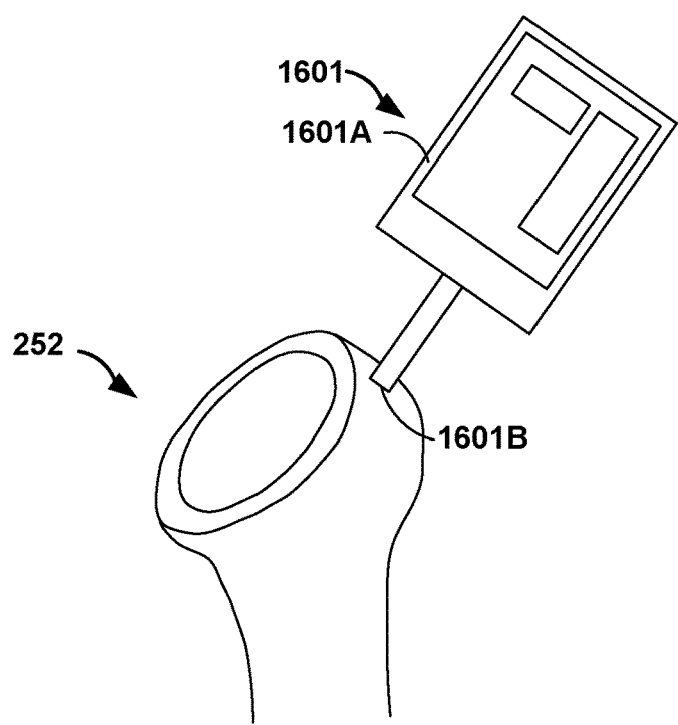
FIG. 16 illustrates an example of a tracking marker that can be employed in the mixed reality (MR) system of FIG. 1, according to an example of this disclosure.

In some examples, one or more of the virtual markers can be replaced and/or supplemented with one or more physical markers, such as optical markers or electromagnetic markers, as examples. FIG. 16 illustrates an example of a physical markers positioned around the real observed bone structure 252. In general, the one or more physical markers may be positioned at various positions on or around the object being registered (e.g., real observed bone structure 252 or a tool). As shown in the examples of FIG. 16, a fixed optical marker 1601 may be used in a shoulder arthroplasty procedure to define a particular location of on a humerus after a humeral head has been resected. In the example of FIG. 16, fixed optical marker 1601 may include a planar fiducial marker 1601A on a single face of the optical marker. As shown in FIG. 16, the fiducial marker may be positioned on a portion of the physical marker that is proximal to a tip 1601B of the marker 1601. In some examples, MR system 212 may obtain a distance between a feature of the fiducial marker (e.g., a centroid or center point) and the tip of the physical marker. As one example, the distance may be predetermined and stored in a memory of MR system 212. As another example, MR system 212 may determine the distance based on optical characteristic of the fiducial marker (i.e., the distance may be encoded in the fiducial marker). Knowledge of the particular location of the humerus (which may be set virtually) may allow MR system 212 to automatically initialize/register the virtual bone without the need for the user to employ head movements and rotations.

In general, the physical markers may be placed anywhere. For instance, the physical markers can be attached to the patient (e.g., non-sterile field), surgically exposed anatomy (sterile field), instruments, anywhere in surgical field of view, or any other suitable location.

The physical markers can be any type of marker that enables identification of a particular location relative to the real observed object (e.g., bone structure 252). Examples of physical markers include, but are not necessarily limited to, passive physical markers and active physical markers. Passive physical markers may have physical parameters that aid in their identification by MR system 212. For instance, physical markers may have a certain shape (e.g., spherical markers that may be attached to the real observed bone structure 252), and/or optical characteristics (e.g., reflective materials, colors (e.g., colors, such a green, that are more visible in a surgical environment), bar codes (including one-dimensional or two-dimensional bars, such as QR codes), or the like) that aid in their identification by MR system 212. The passive physical markers can be three-dimensional or two-dimensional. Passive physical markers may be considered passive in that their presence/position is passively detected by MR system 212. The passive physical markers may be flat or flexible two-dimensional stickers having planar fiducial markers that can be adhesively mounted to bone, tools or other structures, e.g., via an adhesive back layer exposed upon removal of a release layer. Alternatively, passive physical markers may be fixed to bone, e.g., with surgical adhesive, screws, nails, clamps and/or other fixation mechanisms.

Active physical markers may perform one or more actions that aid in their identification by MR system 212. For instance, active physical markers may output signals (e.g., electromagnetic signals) that aid in their identification by MR system 212. Examples of active physical markers include, but are not limited to, sensors or transmitters for the trakSTAR™ and/or driveBAY™ systems available from Northern Digital Inc.

Electromagnetic tracking (i.e., tracking using electromagnetic physical markers, referred to as "EM tracking") may be accomplished by positioning sensors within a magnetic field of known geometry, which may be created by a field generator (FG). The sensors may measure magnetic flux or magnetic fields. A tracking device may control the FG and receive measurements from the sensors. Based on the received measurements, the tracking device may determine the locations/positions of the sensors. A more detailed description on EM tracking may be found in Alfred M. Franz et. al, "Electromagnetic Tracking in Medicine—A Review of Technology, Validation, and Applications," IEEE TRANSACTIONS ON MEDICAL IMAGING, VOL. 33, NO. 8, Aug. 2014.

FIG. 8B illustrates an example of a technique 818 for registering a 3D virtual bone model 1008 with a real observed bone structure 252 of a patient using physical markers (e.g., any combination of passive and active physical markers). In other words, FIG. 8B is an example of a process flow, e.g., performed by visualization device 213, for registering a virtual bone model with an observed bone that is implemented in a mixed reality system, such as the mixed reality system 212 of FIG. 2. 3D virtual bone model 1008 may be a model of all or part of one or more bones. The process flow of FIG. 8B may be performed as part of the registration process of step 704 of FIG. 7. As described below, the registration process of FIG. 8B may be used in addition to, or in place of, the registration process of FIG. 8A.

In operation, the practitioner may place one or more physical markers at specific positions. In some examples, MR system 212 may output instructions as to where the practitioner should place the physical markers. The prescribed locations may correspond to specific locations on a virtual model that corresponds to the observed bone structure 252. For instance, in one example, visualization device 213 may display instructions for the practitioner to attach the physical markers (e.g., with surgical adhesive, screws, nails, clamps and/or other fixation mechanisms) at locations corresponding to positions of patient matched guide 242 (e.g., regardless of whether patient matched guide 242 is available for use). In other words, the practitioner may attach the physical makers at the locations where the patient matched guide 242 would attach, even if patient matched guide 242 is not present. In other examples, the prescribed locations may be indicated by text, graphical or audible information to cause the surgeon to select corresponding locations on the physical bone or tool(s) for attachment or other placement of the markers. For instance, MR system 212 may output graphic information to guide the surgeon in attaching tip 1601B of optical marker 1601 of FIG. 16 to the humerus.

MR system 212 may utilize data from one or more sensors (e.g., one or more of sensors 554 of visualization device 213 of FIG. 5) to identify the location of the physical markers (820). For instance, MR system 212 may use data generated by any combination of depth sensors 532 and/or optical sensors 530 to identify a specific position (e.g., coordinates) of each of the physical markers. As one specific example, MR system 212 may utilize optical data generated by optical sensors 530 to identify a centroid of optical marker 1601A of FIG. 16. MR system 212 may then utilize depth data generated by depth sensors 532 and/or optical data generated by optical sensors 530 to determine a position and/or orientation of the identified centroid. MR system 212 may determine a distance between the centroid and an attachment point of the physical marker. For instance, MR system 212 may determine a distance between a centroid of fiducial marker 1601A and tip 1601B of optical marker 1601 of FIG. 16. Based on the determined distance (i.e., between the centroid and the attachment point) and the determined position/orientation of the centroid, MR system 212 may determine a position/orientation of the attachment point.

MR system 212 may register the virtual model with the observed anatomy based on the identified positions (822) of the physical markers. For instance, where the physical markers are placed on the observed bone structure 252 at locations that correspond to specific location(s) on the virtual model that corresponds to the observed bone structure 252, MR system 212 may generate a transformation matrix between the virtual model and the observed bone structure 252. This transformation matrix may be similar to the transformation matrix discussed above in that it allows for translation along the x, y, and z axes of the virtual model and rotation about the x, y and z axes in order to achieve and maintain alignment between the virtual and observed bones. In some examples, after registration is complete, MR system 212 utilize the results of the registration to perform simultaneous localization and mapping (SLAM) to maintain alignment of the virtual model to the corresponding observed object.

As discussed in further detail below, MR system 212 may display, based on the registration, virtual guidance for preparing the observed anatomy for attachment of a prosthetic or virtual guidance for attaching the prosthetic to the observed anatomy (824). For instance, MR system 212 may provide virtual guidance as described below with reference to any combination of FIGS. 20-30.

As discussed above, the physical markers may be used in addition to, or in place of, the virtual markers (e.g., virtual marker 292). In other words, MR system 212 may perform registration of a virtual model of a bone to corresponding observed bone using any combination of physical and virtual markers. In some examples, using physical markers (either alone or with virtual markers) may enable MR system 212 to reduce the amount of time required to perform registration and/or may result in more accurate registration.

In some examples, MR system 212 may use one of virtual markers or physical markers as a primary registration marker and use the other as a secondary, or supplemental, registration marker. As one example, MR system 212 may begin a registration process by attempting to perform registration using the primary registration marker. In such examples, if MR system 212 is not able to adequately complete registration (e.g., cannot generate a mapping, such as a transformation matrix, between the virtual and observed anatomy) using only the primary registration marker, MR system 212 may attempt to perform registration using only the secondary registration marker or a combination of the primary registration marker and the secondary registration marker. In one specific example, if MR system 212 is not able to adequately complete registration using only virtual marker(s), MR system 212 may attempt to perform registration using only physical marker(s) or a combination of virtual registration marker(s) and physical registration marker(s).

In situations where MR system 212 is not able to adequately complete registration using only the primary registration marker, MR system 212 may output a request for the practitioner to perform one or more actions to enable registration using the secondary registration marker. As one example, where the secondary registration marker is a physical marker, MR system 212 may output a request for the practitioner to position a physical marker at a particular location relative to the observed anatomy. As another example, where the secondary registration marker is a virtual marker, MR system 212 may output a request and corresponding graphical user interface (e.g., 3D virtual bone model 1008) for the practitioner to perform the initial alignment procedure described above with reference to FIG. 8A.

In some examples, the practitioner may remove the physical markers (e.g., after registration is complete). For instance, after MR system 212 has completed the registration process using the physical markers, MR system 212 may output an indication that the physical markers may be removed. In example where the physical markers are removed, MR system 212 may maintain the registration of the virtual bone model to the observed bone using virtual markers or any other suitable tracking technique.

In some examples, the practitioner may not remove the physical markers until a later point in the surgery. For instance, the practitioner may not remove the physical markers until registration of the virtual model to the observed bone is no longer required (e.g., after all virtual guidance that uses the registration has been displayed and corresponding surgical steps have been completed).

In some examples, MR system 212 may be able to maintain the registration between a virtual bone model and observed bone (e.g., glenoid, humerus, or other bone structure) throughout the procedure. However, in some cases, MR system 212 may lose, or otherwise be unable to maintain, the registration between the virtual bone model and observed bone. For instance, MR system 212 may lose track of one of more of the markers (e.g., virtual, physical, or both). This loss may be the result of any number of factors including, but not limited to, body fluids (e.g., blood) occluding the markers, the markers becoming dislodged (e.g., a physical marker being knocked out of position), and the like. As such, MR system 212 may periodically determine whether registration has been lost (826).

In some examples, MR system 212 may determine that registration has been lost where a confidence distance between a virtual point and a corresponding physical point exceeds a threshold confidence distance (e.g., a clinical value). MR system 212 may periodically determine the confidence distance as a value that represents the accuracy of the current registration. For instance, MR system 212 may determine that a distance between a virtual point and a corresponding physical point is less than 3 mm.

In some examples, MR system 212 may output a representation of the confidence distance. As one example, MR system 212 may cause visualization device 213 to display a numerical value of the confidence distance. As another example, MR system 212 may cause visualization device 213 to display a graphical representation of the confidence distance relative to the threshold confidence distance (e.g., display a green circle if the confidence distance is less than half of the threshold confidence distance, display a yellow circle if the confidence distance is between half of the threshold confidence distance and the threshold confidence distance, and display a red circle if the confidence distance greater than the threshold confidence distance).

In some examples, MR system 212 may utilize the same threshold confidence distance throughout a surgical procedure. For instance, MR system 212 may utilize a particular threshold confidence distance for all humeral work steps (e.g., described below with reference to FIGS. 20-30). In some examples, MR system 212 may utilize different threshold confidence distances for various parts a surgical procedure. For instance, MR system 212 may utilize a first threshold confidence distance for a first set of work steps and use a second threshold confidence distance (that is different than the first threshold confidence distance) for a first set of work steps for a second set of work steps.

Where registration has not been lost ("No" branch of 826), MR system 212 may continue to display virtual guidance (824). However, where MR system 212 loses registration ("Yes" branch of 826), MR system 212 may perform one or more actions to re-register the virtual bone model to the observed bone. As one example, MR system 212 may automatically attempt to perform the registration process without further action from the practitioner. For instance, where physical markers have not been removed. MR system 212 may perform the registration process using the physical markers. Alternatively, where the physical markers have been removed (or were never placed), MR system 212 may output a request for the practitioner to place the physical markers. As such, MR system 212 may be considered to periodically register the virtual model with the observed bone.

In some examples, as opposed to automatically attempting re-registration where registration is lost, MR system 212 may selectively perform re-registration based on whether registration is still needed (828). In some examples, MR system 212 may determine that registration is still needed if additional virtual guidance will be displayed. Where MR system 212 determines that registration is no longer needed ("No" branch of 828), MR system 212 may end the registration procedure.

As described above, MR system 212 may utilize any combination of virtual and physical markers to enable registration of virtual models to corresponding observed structures. MR system 212 may use any of the markers to perform an initial registration and, where needed, MR system 212 may use any of the markers to perform a re-registration. The markers used for the initial registration may be the same as or may be different than the markers used for any re-registrations.

In some examples, to enhance the accuracy and quality of registration, during the initialization stage of the registration process, MR system 212 can compute and display spatial constraints for user head pose and orientation. These constraints can be computed in real time and depend on the position of the user, and/or the orientation, and/or the distance to the observed bone, and/or the depth camera characteristics. For example, MR system 212 may prompt the user to move closer to the observed bone, to adjust the head position so that the user's gaze line is perpendicular to the surface of interest of the observed bone, or to make any other adjustments that can be useful to enhance the registration process and which may depend on the particular surgical application and/or the attributes of the particular anatomy of interest and/or the characteristics of the optical and depth sensors that are employed in MR system 212.

In some examples, depth camera(s) 532 detect distance by using a structured light approach or time of flight of an optical signal having a suitable wavelength. In general, the wavelength of the optical signal is selected so that penetration of the surface of the observed anatomy by the optical signal transmitted by depth camera(s) 532 is minimized. It should be understood, however, that other known or future developed techniques for detecting distance also can be employed.

As discussed below, the registration techniques described herein may be performed for any pair of virtual model and observed object. As one example, an MR system may utilize the registration techniques to register a virtual model of a bone to an observed bone. As another example, an MR system may utilize the registration techniques to register a virtual model of an implant to an observed implant. An MR system may utilize the registration techniques to register a virtual model of a tool to an observed tool.

In some examples, an MR system may perform the registration techniques once for a particular pair of a virtual model and an observed object (e.g., within a particular surgical procedure). For instance, an MR system may register a virtual model of a glenoid with an observed glenoid and utilize the registration to provide virtual guidance for multiple steps of a surgical procedure. In some examples, an MR system may perform the registration techniques multiple times for a particular pair of a virtual model and an observed object (e.g., within a particular surgical procedure). For instance, an MR system may first register a virtual model of a glenoid with an observed glenoid and utilize the registration to provide virtual guidance for one or more steps of a surgical procedure. Then, for example, after material has been removed from the glenoid (e.g., via reaming), the MR system may register another virtual model of the glenoid (that accounts for the removed material) with an observed glenoid and use the subsequent registration to provide virtual guidance for one or more other steps of the surgical procedure.

Figure 15:
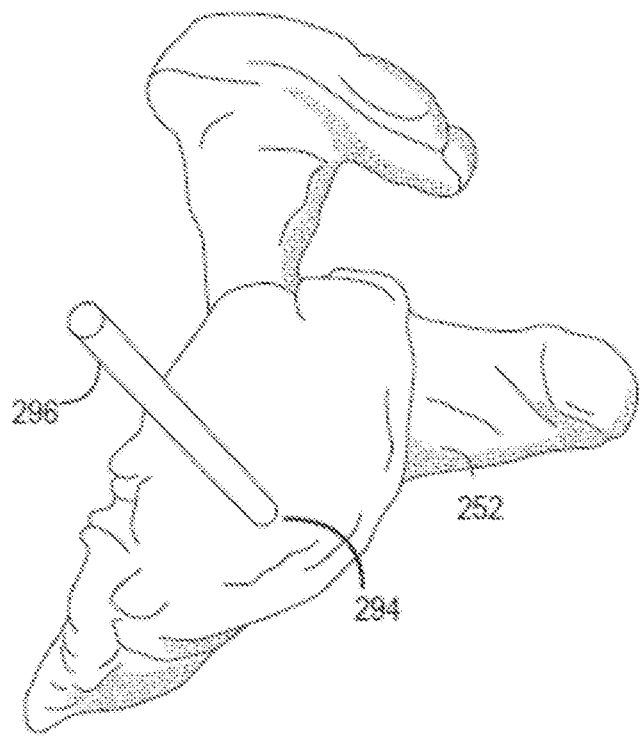
FIG. 15 illustrates an image perceptible to a user when in an augment surgery mode of a mixed reality (MR) system, according to an example of this disclosure.

Once registration is complete the surgical plan can be executed using the Augment Surgery mode of MR system 212. For example, FIG. 15 illustrates an image perceptible to a user when in the augment surgery mode of a mixed reality system, according to an example of this disclosure. As shown in the example of FIG. 15, the surgeon can visualize a virtually planned entry point 294 and drilling axis 296 on observed bone structure 252 and use those virtual images to assist with positions and alignment of surgical tools. Drilling axis 296 may also be referred to as a reaming axis, and provides a virtual guide for drilling a hole in the glenoid for placement of a guide pin that will guide a reaming process.

The registration process may be used in conjunction with the virtual planning processes and/or intra-operative guidance described elsewhere in this disclosure. Thus, in one example, a virtual surgical plan is generated or otherwise obtained to repair an anatomy of interest of a particular patient (e.g., the shoulder joint of the particular patient). In instances where the virtual surgical plan is obtained, another computing system may generate the virtual surgical plan and an MR system (e.g., MR system 212) or other computing system obtains the virtual surgical plan from a computer readable medium, such as a communication medium or a non-transitory storage medium. In this example, the virtual surgical plan may include a 3D virtual model of the anatomy of interest generated based on preoperative image data and a prosthetic component selected for the particular patient to repair the anatomy of interest. Furthermore, in this example, a user may use a MR system (e.g., MR system 212) to implement the virtual surgical plan. In this example, as part of using the MR system, the user may request the virtual surgical plan for the particular patient.

Additionally, the user may view virtual images of the surgical plan projected within a real environment. For example, MR system 212 may present 3D virtual objects such that the objects appear to reside within a real environment, e.g., with real anatomy of a patient, as described in various examples of this disclosure. In this example, the virtual images of the surgical plan may include one or more of the 3D virtual model of the anatomy of interest, a 3D model of the prosthetic component, and virtual images of a surgical workflow to repair the anatomy of interest. Furthermore, in this example, the user may register the 3D virtual model with a real anatomy of interest of the particular patient. The user may then implement the virtually generated surgical plan to repair the real anatomy of interest based on the registration. In other words, in the augmented surgery mode, the user can use the visualization device to align the 3D virtual model of the anatomy of interest with the real anatomy of interest.

In such examples, the MR system implements a registration process whereby the 3D virtual model is aligned (e.g., optimally aligned) with the real anatomy of interest. In this example, the user may register the 3D virtual model with the real anatomy of interest without using virtual or physical markers. In other words, the 3D virtual model may be aligned (e.g., optimally aligned) with the real anatomy of interest without the use of virtual or physical markers. The MR system may use the registration to track movement of the real anatomy of interest during implementation of the virtual surgical plan on the real anatomy of interest. In some examples, the MR system may track the movement of the real anatomy of interest without the use of tracking markers.

In some examples, as part of registering the 3D virtual model with the real anatomy of interest, the 3D virtual model can be aligned (e.g., by the user) with the real anatomy of interest and generate a transformation matrix between the 3D virtual model and the real anatomy of interest based on the alignment. The transformation matrix provides a coordinate system for translating the virtually generated surgical plan to the real anatomy of interest. For instance, the registration process may allow the user to view steps of the virtual surgical plan projected on the real anatomy of interest. For instance, the alignment of the 3D virtual model with the real anatomy of interest may generate a transformation matrix that may allow the user to view steps of the virtual surgical plan (e.g., identification of an entry point for positioning a prosthetic implant to repair the real anatomy of interest) projected on the real anatomy of interest.

In some examples, the registration process (e.g., the transformation matrix generated using the registration process) allows the user to implement the virtual surgical plan on the real anatomy of interest without use of tracking markers. In some examples, aligning the 3D virtual model with the real anatomy of interest including positioning a point of interest on a surface of the 3D virtual model at a location of a corresponding point of interest on a surface of the real anatomy of interest and adjusting an orientation of the 3D virtual model so that a virtual surface normal at the point of interest is aligned with a real surface normal at the corresponding point of interest. In some such examples, the point of interest is a center point of a glenoid.

With continued reference to FIG. 7, after performing the registration process, the surgeon may perform a reaming axis drilling process (706). During the reaming axis drilling process, the surgeon may drill a reaming axis guide pin hole in the patient's glenoid to receive a reaming guide pin. At a later stage of the shoulder surgery, the surgeon may insert a reaming axis pin into the reaming axis guide pin hole. In some examples, an MR system (e.g., MR system 212, etc.) may present a virtual reaming axis to help the surgeon perform the drilling in alignment with the reaming axis and thereby place the reaming guide pin in the correct location and with the correct orientation.

The surgeon may perform the reaming axis drilling process in one of various ways. For example, the surgeon may perform a guide-based process to drill the reaming axis pin hole. In the case, a physical guide is placed on the glenoid to guide drilling of the reaming axis pin hole. In other examples, the surgeon may perform a guide-free process, e.g., with presentation of a virtual reaming axis that guides the surgeon to drill the reaming axis pin hole with proper alignment. An MR system (e.g., MR system 212, etc.) may help the surgeon perform either of these processes to drill the reaming axis pin hole.

Furthermore, in the surgical process of FIG. 7, the surgeon may perform a reaming axis pin insertion process (708). During the reaming axis pin insertion process, the surgeon inserts a reaming axis pin into the reaming axis pin hole drilled into the patient's scapula. In some examples, an MR system (e.g., MR system 212, etc.) may present virtual guidance information to help the surgeon perform the reaming axis pin insertion process.

After performing the reaming axis insertion process, the surgeon may perform a glenoid reaming process (710). During the glenoid reaming process, the surgeon reams the patient's glenoid. Reaming the patient's glenoid may result in an appropriate surface for installation of a glenoid implant. In some examples, to ream the patient's glenoid, the surgeon may affix a reaming bit to a surgical drill. The reaming bit defines an axial cavity along an axis of rotation of the reaming bit. The axial cavity has an inner diameter corresponding to an outer diameter of the reaming axis pin. After affixing the reaming bit to the surgical drill, the surgeon may position the reaming bit so that the reaming axis pin is in the axial cavity of the reaming bit. Thus, during the glenoid reaming process, the reaming bit may spin around the reaming axis pin. In this way, the reaming axis pin may prevent the reaming bit from wandering during the glenoid reaming process. In some examples, multiple tools may be used to ream the patient's glenoid. An MR system (e.g., MR system 212, etc.) may present virtual guidance to help the surgeon or other users to perform the glenoid reaming process. For example, the MR system may help a user, such as the surgeon, select a reaming bit to use in the glenoid reaming process. In some examples, the MR system present virtual guidance to help the surgeon control the depth to which the surgeon reams the user's glenoid. In some examples, the glenoid reaming process includes a paleo reaming step and a neo reaming step to ream different parts of the patient's glenoid.

Additionally, in the surgical process of FIG. 7, the surgeon may perform a glenoid implant installation process (712). During the glenoid implant installation process, the surgeon installs a glenoid implant in the patient's glenoid. In some instances, when the surgeon is performing an anatomical shoulder arthroplasty, the glenoid implant has a concave surface that acts as a replacement for the user's natural glenoid. In other instances, when the surgeon is performing a reverse shoulder arthroplasty, the glenoid implant has a convex surface that acts as a replacement for the user's natural humeral head. In this reverse shoulder arthroplasty, the surgeon may install a humeral implant that has a concave surface that slides over the convex surface of the glenoid implant. As in the other steps of the shoulder surgery of FIG. 7, an MR system (e.g., MR system 212, etc.) may present virtual guidance to help the surgeon perform the glenoid installation process.

In some examples, the glenoid implantation process includes a process to fix the glenoid implant to the patient's scapula (714). In some examples, the process to fix the glenoid implant to the patient's scapula includes drilling one or more anchor holes or one or more screw holes into the patient's scapula and positioning an anchor such as one or more pegs or a keel of the implant in the anchor hole(s) and/or inserting screws through the glenoid implant and the screw holes, possibly with the use of cement or other adhesive. An MR system (e.g., MR system 212, etc.) may present virtual guidance to help the surgeon with the process of fixing the glenoid implant the glenoid bone, e.g., including virtual guidance indicating anchor or screw holes to be drilled or otherwise formed in the glenoid, and the placement of anchors or screws in the holes.

Furthermore, in the example of FIG. 7, the surgeon may perform a humerus preparation process (716). During the humerus preparation process, the surgeon prepares the humerus for the installation of a humerus implant. In instances where the surgeon is performing an anatomical shoulder arthroplasty, the humerus implant may have a convex surface that acts as a replacement for the patient's natural humeral head. The convex surface of the humerus implant slides within the concave surface of the glenoid implant. In instances where the surgeon is performing a reverse shoulder arthroplasty, the humerus implant may have a concave surface and the glenoid implant has a corresponding convex surface. As described elsewhere in this disclosure, an MR system (e.g., MR system 212, etc.) may present virtual guidance information to help the surgeon perform the humerus preparation process.

Furthermore, in the example surgical process of FIG. 7, the surgeon may perform a humerus implant installation process (718). During the humerus implant installation process, the surgeon installs a humerus implant on the patient's humerus. As described elsewhere in this disclosure, an MR system (e.g., MR system 212, etc.) may present virtual guidance to help the surgeon perform the humerus preparation process.

After performing the humerus implant installation process, the surgeon may perform an implant alignment process that aligns the installed glenoid implant and the installed humerus implant (720). For example, in instances where the surgeon is performing an anatomical shoulder arthroplasty, the surgeon may nest the convex surface of the humerus implant into the concave surface of the glenoid implant. In instances where the surgeon is performing a reverse shoulder arthroplasty, the surgeon may nest the convex surface of the glenoid implant into the concave surface of the humerus implant. Subsequently, the surgeon may perform a wound closure process (722). During the wound closure process, the surgeon may reconnect tissues severed during the incision process in order to close the wound in the patient's shoulder.

For a shoulder arthroplasty application, the registration process may start by visualization device 213 presenting the user with 3D virtual bone model 1008 of the patient's scapula and glenoid that was generated from preoperative images of the patient's anatomy, e.g., by virtual planning system 102. The user can then manipulate 3D virtual bone model 1008 in a manner that aligns and orients 3D virtual bone model 1008 with the patient's real scapula and glenoid that the user is observing in the operating environment. As such, in some examples, the MR system may receive user input to aid in the initialization and/or registration. However, discussed above, in some examples, the MR system may perform the initialization and/or registration process automatically (e.g., without receiving user input to position the 3D bone model). For other types of arthroplasty procedures, such as for the knee, hip, foot, ankle or elbow, different relevant bone structures can be displayed as virtual 3D images and aligned and oriented in a similar manner with the patient's actual, real anatomy.

Regardless of the particular type of joint or anatomical structure involved, selection of the augment surgery mode initiates a procedure where 3D virtual bone model 1008 is registered with an observed bone structure. In general, the registration procedure can be considered as a classical optimization problem (e.g., either minimization or maximization). For a shoulder arthroplasty procedure, known inputs to the optimization (e.g., minimization) analysis are the 3D geometry of the observed patient's bone (derived from sensor data from the visualization device 213, including depth data from the depth camera(s) 532) and the geometry of the 3D virtual bone derived during the virtual surgical planning state (such as by using the BLUEPRINT™ system). Other inputs include details of the surgical plan (also derived during the virtual surgical planning stage, such as by using the BLUEPRINT™ system), such as the position and orientation of entry points, cutting planes, reaming axes and/or drilling axes, as well as reaming or drilling depths for shaping the bone structure, the type, size and shape of the prosthetic components, and the position and orientation at which the prosthetic components will be placed or, in the case of a fracture, the manner in which the bone structure will be rebuilt.

Upon selection of a particular patient from a welcome page of UI presented by MR system 212 (FIG. 4), the surgical planning parameters associated with that patient are connected with the patient's 3D virtual bone model 1008, e.g., by one or more processors of visualization device 213. In the Augment Surgery mode, registration of 3D virtual bone model 1008 (with the connected preplanning parameters) with the observed bone by visualization device 213 allows the surgeon to visualize virtual representations of the surgical planning parameters on the patient.

The optimization (e.g., minimization) analysis that is implemented to achieve registration of the 3D virtual bone model 1008 with the real bone generally is performed in two stages: an initialization stage and an optimization (e.g., minimization) stage. During the initialization stage, the user approximately aligns the 3D virtual bone model 1008 with the patient's real bone, such as by using gaze direction, hand gestures and/or voice commands to position and orient, or otherwise adjust, the alignment of the virtual bone with the observed real bone. The initialization stage will be described in further detail below. During the optimization (e.g., minimization) stage, which also will be described in detail below, an optimization (e.g., minimization) algorithm is executed that uses information from the optical camera(s) 530 and/or depth camera(s) 532 and/or any other acquisition sensor (e.g., motion sensors 533) to further improve the alignment of the 3D model with the observed anatomy of interest. In some examples, the optimization (e.g., minimization) algorithm can be a minimization algorithm, including any known or future-developed minimization algorithm, such as an Iterative Closest Point algorithm or a genetic algorithm as examples.

In this way, in one example, a mixed reality surgical planning method includes generating a virtual surgical plan to repair an anatomy of interest of a particular patient. The virtual surgical plan including a 3D virtual model of the anatomy of interest is generated based on preoperative image data and a prosthetic component selected for the particular patient to repair the anatomy of interest. Furthermore, in this example, the method includes using a MR visualization system to implement the virtual surgical plan. In this example, using the MR system may comprise requesting the virtual surgical plan for the particular patient. Using the MR system also comprises viewing virtual images of the surgical plan projected within a real environment. For example, visualization device 213 may be configured to present one or more 3D virtual images of details of the surgical plan that are projected within a real environment, e.g., such that the virtual image(s) appear to form part of the real environment. The virtual images of the surgical plan may include the 3D virtual model of the anatomy of interest, a 3D model of the prosthetic component, and virtual images of a surgical workflow to repair the anatomy of interest. Using the MR system may also include registering the 3D virtual model with a real anatomy of interest of the particular patient. Additionally, in this example, using the MR system may include implementing the virtually generated surgical plan to repair the real anatomy of interest based on the registration.

Furthermore, in some examples, the method comprises registering the 3D virtual model with the real anatomy of interest without using virtual or physical markers. The method may also comprise using the registration to track movement of the real anatomy of interest during implementation of the virtual surgical plan on the real anatomy of interest. The movement of the real anatomy of interest may be tracked without the use of tracking markers. In some instances, registering the 3D virtual model with the real anatomy of interest may comprise aligning the 3D virtual model with the real anatomy of interest and generating a transformation matrix between the 3D virtual model and the real anatomy of interest based on the alignment. The transformation matrix provides a coordinate system for translating the virtually generated surgical plan to the real anatomy of interest. In some examples, aligning may comprise virtually positioning a point of interest on a surface of the 3D virtual model within a corresponding region of interest on a surface of the real anatomy of interest; and adjusting an orientation of the 3D virtual model so that a virtual surface shape associated with the point of interest is aligned with a real surface shape associated with the corresponding region of interest. In some examples, aligning may further comprise rotating the 3D virtual model about a gaze line of the user. The region of interest may be an anatomical landmark of the anatomy of interest. The anatomy of interest may be a shoulder joint. In some examples, the anatomical landmark is a center region of a glenoid.

In some examples, after a registration process is complete, a tracking process can be initiated that continuously and automatically verifies the registration between 3D virtual bone model 1008 and observed bone structure 252 during the Augment Surgery mode. During a surgery, many events can occur (e.g., patient movement, instrument movement, loss of tracking, etc.) that may disturb the registration between the 3D anatomical model and the corresponding observed patient anatomy or that may impede the ability of MR system 212 to maintain registration between the model and the observed anatomy. Therefore, by implementing a tracking feature, MR system 212 can continuously or periodically verify the registration and adjust the registration parameters as needed. If MR system 212 detects an inappropriate registration (such as patient movement that exceeds a threshold amount), the user may be asked to re-initiate the registration process.

In some examples, tracking can be implemented using one or more optical markers, such as the marker 1601 shown in FIG. 16, that is fixed to a particular location on the anatomy. MR system 212 monitors the optical marker(s) in order to track the position and orientation of the relevant anatomy in 3D space. If movement of the marker is detected, MR system 212 can calculate the amount of movement and then translate the registration parameters accordingly so as to maintain the alignment between the 3D model and the observed anatomy without repeating the registration process.

In other examples, tracking is markerless. For example, rather than using optical markers, MR system 212 implements markerless tracking based on the geometry of the observed anatomy of interest. In some examples, the markerless tracking may rely on the location of anatomical landmarks of the bone that provide well-defined anchor points for the tracking algorithm. In situations or applications in which well-defined landmarks are not available, a tracking algorithm can be implemented that uses the geometry of the visible bone shape or other anatomy. In such situations, image data from optical camera(s) 530 and/or depth cameras(s) 532 and/or motion sensors 533 (e.g., IMU sensors) can be used to derive information about the geometry and movement of the visible anatomy. An example of a tracking algorithm that can be used for markerless tracking is described in David J. Tan, et al., "6D Object Pose Estimation with Depth Images: A Seamless Approach for Robotic Interaction and Augmented Reality," arXiv: 1709.01459v1 [cs,CV] (Sep. 5, 2017), although any suitable tracking algorithm can be used. In some examples, the markerless tracking mode of MR system 212 can include a learning stage in which the tracking algorithm learns the geometry of the visible anatomy before tracking is initiated. The learning stage can enhance the performance of tracking so that tracking can be performed in real time with limited processing power.

Figure 17:
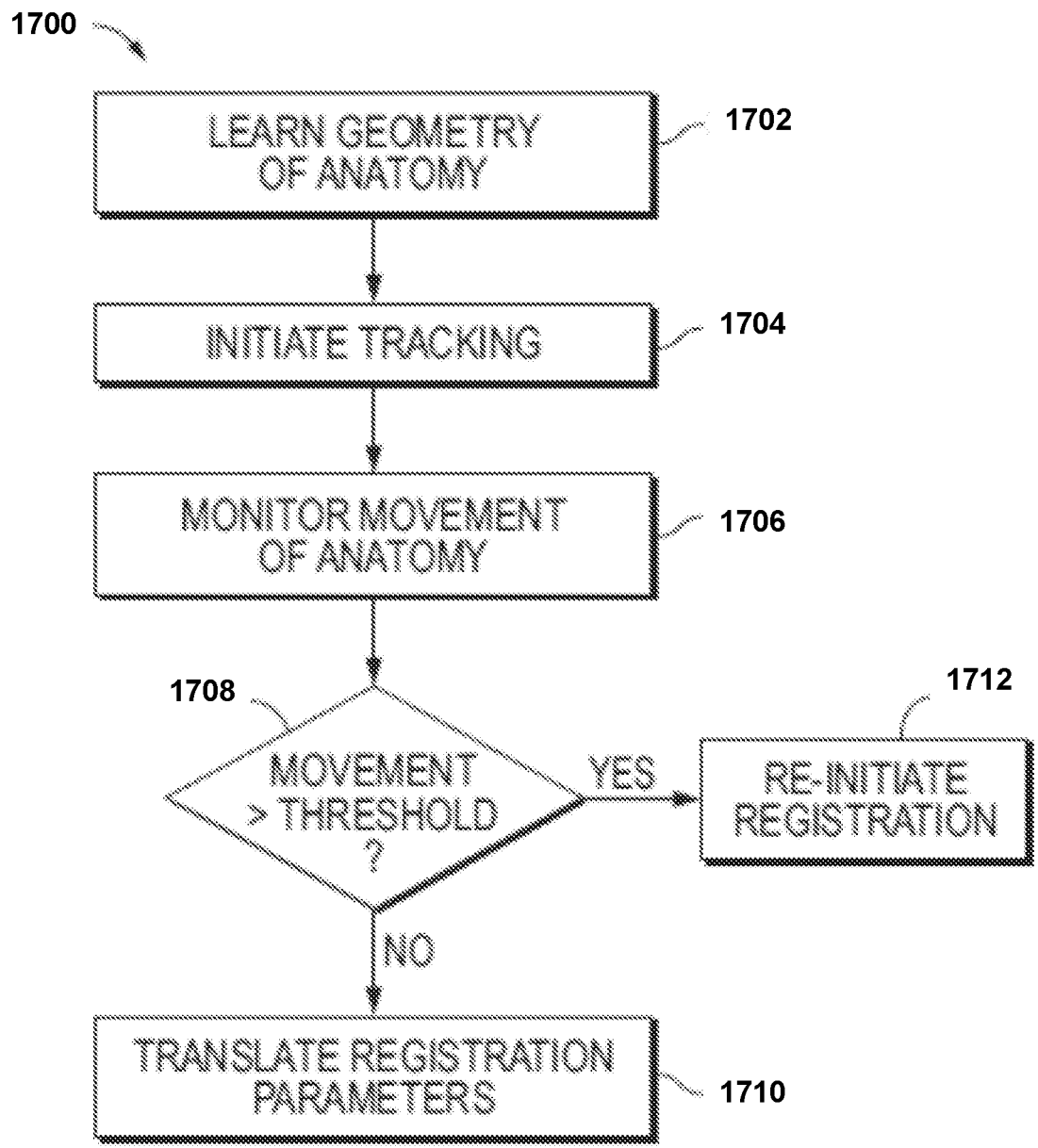
FIG. 17 is an example of a process flow for tracking in the augment surgery mode of the mixed reality (MR) system, according to an example of this disclosure.

FIG. 17 illustrates an example of a process flow 1700 for tracking in an augment surgery mode of MR system 212, according to an example of this disclosure. The process of FIG. 17 may be performed by visualization device 213 of MR system 212. At block 1702, a learning process is performed during which the tracking algorithm learns the geometry of the anatomy of interest based on a virtual bone model. In some examples, the learning is performed offline (i.e., before the surgery). At block 1704, tracking is initiated during the Augment Surgery Mode. At block 1706, movement of the anatomy of interest is continuously (or periodically) monitored. At block 1708, if detected movement exceeds a threshold amount, the user may be prompted to re-initiate the registration process of FIG. 8A or 8B (block 1712). As discussed above, in some examples, MR system 212 may automatically re-initiate and/or perform the registration process if detected movement exceeds the threshold amount. Otherwise, the amount of movement is used to translate the registration parameters, as needed (block 1710).

In some examples, marker and markerless tracking can both be implemented. For example, optical markers can be used as a back-up to the markerless tracking algorithm or as a verification of the tracking algorithm. Further, the choice of implementing marker and/or markerless tracking can be left to the discretion of the user or may depend on the particular surgical procedure and the specific anatomical features that are visible.

In some examples, to guide a surgeon in accordance with the surgical plan, surgical instruments or tools (marker (e.g., visible, infrared, etc.) or markerless (e.g., tool geometry)) can be tracked to ensure that instrument pose and orientation are correct using any of the same tracking techniques described above. To guide the surgeon's use of the surgical instruments, MR system 212 can display visible indicators or provide other perceptible indications (e.g., vibrations, audible beeps, etc.) that prompt the surgeon to move the instrument in certain directions. For example, MR system 212 can generate circles visible to the surgeon that, when concentric, indicate that the tool is aligned according to the surgical plan.

As discussed elsewhere in this disclosure, orthopedic surgical procedures may involve performing various work on a patient's anatomy. Some examples of work that may be performed include, but are not necessarily limited to, cutting, drilling, reaming, screwing, adhering, and impacting. In general, it may be desirable for a practitioner (e.g., surgeon, physician's assistant, nurse, etc.) to perform the work as accurately as possible. For instance, if a surgical plan for implanting a prosthetic in a particular patient specifies that a portion of the patient's anatomy is to be reamed at a particular diameter to a particular depth, it may desirable for the surgeon to ream the portion of the patient's anatomy to as close as possible to the particular diameter and to the particular depth (e.g., to increase the likelihood that the prosthetic will fit and function as planned and thereby promote a good health outcome for the patient).

Figure 18:
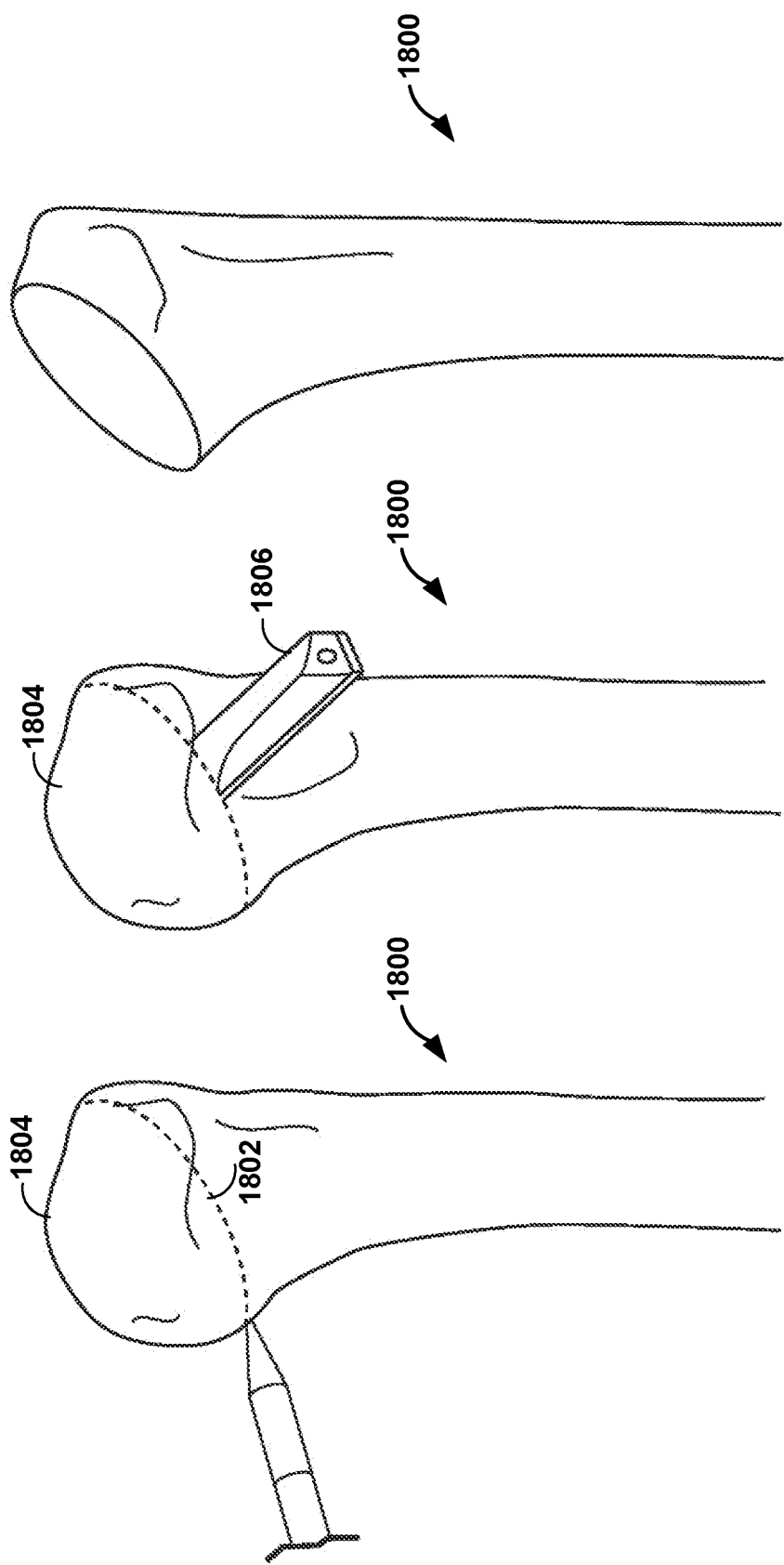
FIGS. 18A-18C illustrate steps that a surgeon may perform to resect a humeral head of a humerus in a shoulder arthroplasty procedure.

In some examples, a surgeon may perform one or more work operations by "free hand" (i.e., by applying or otherwise using a tool without mechanical or visual guides/aids for the tool). For instance, as shown in FIGS. 18A-18C, in the course of a shoulder arthroplasty procedure, a surgeon may perform a surgical step of resection of humeral head 1804 of humerus 1800 by visually estimating (e.g., "eyeballing") and marking anatomical neck 1802 of humerus 1800. The surgeon may then perform the resection of humeral head 1804 by guiding cutting tool 1806 (e.g., a blade of an oscillating saw) along the marked anatomical neck 1802 with the surgeon's free hand, i.e., without mechanical or visual guidance. However, performing surgical steps involving these types of work operations entirely by free hand may introduce unwanted error, possibly undermining the results of the orthopedic surgical procedure.

Figure 19:
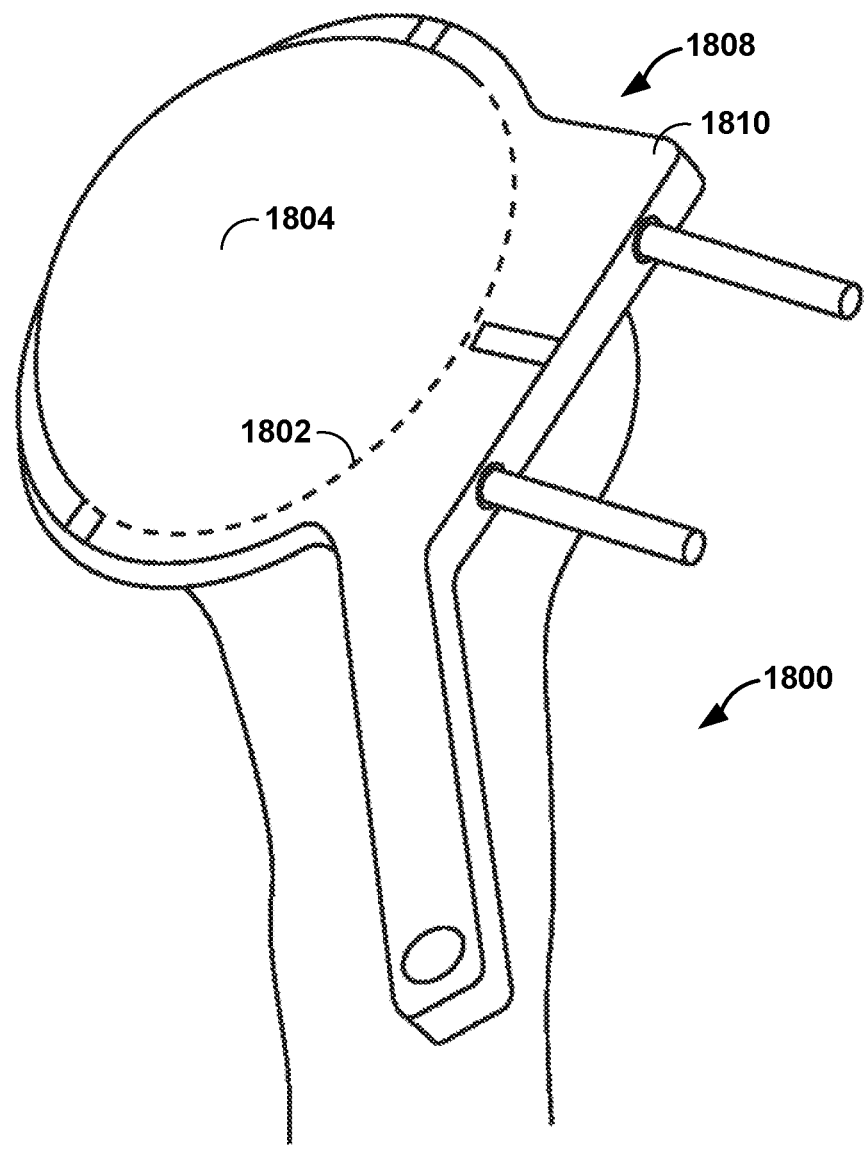
FIG. 19 illustrates a mechanical guide for resection of the humeral head in a shoulder arthroplasty procedure.

In some examples, in the course of an orthopedic surgical procedure, a surgeon may perform one of more work operations, which also may be referred to as surgical steps, with the assistance of a mechanical guide. For instance, as shown in FIG. 19, a surgeon may attach mechanical guide 1808 on humerus 1800 prior to performing a resection of humeral head 1804 (e.g., as part of performing the humerus cut process of step 702 of FIG. 7). The surgeon may adjust one or more components of mechanical guide 1808 such that top surface 1810 of mechanical guide 1808 is co-planar with anatomic neck 1802 of humerus 1800 (for purposes of illustration, anatomic neck 1802 is illustrated as a broken line). After attaching mechanical guide 1808 to humeral head 1804 and adjusting the mechanical guide, the surgeon may perform the resection of humeral head 1804 by guiding a cutting tool (e.g., a blade of an oscillating saw) along top surface 1810. However, utilizing a mechanical guide may be undesirable. As one example, attachment and/or adjustment of a mechanical guide introduces additional time into a surgical procedure. As another example, the mechanical guide is an additional tool that may result in additional cost for the mechanical guide and/or additional time for sterilizing and tracking the mechanical guide (e.g., during the procedure and during the pre-closing inventory).

In accordance with one or more techniques of this disclosure, a visualization system, such as MR system 212, may be configured to display virtual guidance including one or more virtual guides for performing work on a portion of a patient's anatomy. For instance, the visualization system may display a virtual cutting plane overlaid on an anatomic neck of the patient's humerus. In some examples, a user such as a surgeon may view real-world objects in a real-world scene. The real-world scene may be in a real-world environment such as a surgical operating room. In this disclosure, the terms real and real-world may be used in a similar manner. The real-world objects viewed by the user in the real-world scene may include the patient's actual, real anatomy, such as an actual glenoid or humerus, exposed during surgery. The user may view the real-world objects via a see-through (e.g., transparent) screen, such as see-through holographic lenses, of a head-mounted MR visualization device, such as visualization device 213, and also see virtual guidance such as virtual MR objects that appear to be projected on the screen or within the real-world scene, such that the MR guidance object(s) appear to be part of the real-world scene, e.g., with the virtual objects appearing to the user to be integrated with the actual, real-world scene. For example, the virtual cutting plane/line may be projected on the screen of a MR visualization device, such as visualization device 213, such that the cutting plane is overlaid on, and appears to be placed within, an actual, observed view of the patient's actual humerus viewed by the surgeon through the transparent screen, e.g., through see-through holographic lenses. Hence, in this example, the virtual cutting plane/line may be a virtual 3D object that appears to be part of the real-world environment, along with actual, real-world objects.

A screen through which the surgeon views the actual, real anatomy and also observes the virtual objects, such as virtual anatomy and/or virtual surgical guidance, may include one or more see-through holographic lenses. The holographic lenses, sometimes referred to as "waveguides," may permit the user to view real-world objects through the lenses and display projected holographic objects for viewing by the user. As discussed above, an example of a suitable head-mounted MR device for visualization device 213 is the Microsoft HOLOLENS™ headset, available from Microsoft Corporation, of Redmond, Washington, USA. The HOLOLENS™ headset includes see-through, holographic lenses, also referred to as waveguides, in which projected images are presented to a user. The HOLOLENS™ headset also includes an internal computer, cameras and sensors, and a projection system to project the holographic content via the holographic lenses for viewing by the user. In general, the Microsoft HOLOLENS™ headset or a similar MR visualization device may include, as mentioned above, LCoS display devices that project images into holographic lenses, also referred to as waveguides, e.g., via optical components that couple light from the display devices to optical waveguides. The waveguides may permit a user to view a real-world scene through the waveguides while also viewing a 3D virtual image presented to the user via the waveguides. In some examples, the waveguides may be diffraction waveguides.

The presentation virtual guidance such as of a virtual cutting plane may enable a surgeon to accurately resect the humeral head without the need for a mechanical guide, e.g., by guiding a saw along the virtual cutting plane displayed via the visualization system while the surgeon views the actual humeral head. In this way, a visualization system, such as MR system 212 with visualization device 213, may enable surgeons to perform accurate work (e.g., with the accuracy of mechanical guides but without the disadvantages of using mechanical guides). This "guideless" surgery may, in some examples, provide reduced cost and complexity.

The visualization system (e.g., MR system 212/visualization device 213) may be configured to display different types of virtual guides. Examples of virtual guides include, but are not limited to, a virtual point, a virtual axis, a virtual angle, a virtual path, a virtual plane, and a virtual surface or contour. As discussed above, the visualization system (e.g., MR system 212/visualization device 213) may enable a user to directly view the patient's anatomy via a lens by which the virtual guides are displayed, e.g., projected.

The visualization system may obtain parameters for the virtual guides from a virtual surgical plan, such as the virtual surgical plan described herein. Example parameters for the virtual guides include, but are not necessarily limited to: guide location, guide orientation, guide type, guide color, etc.

The techniques of this disclosure are described below with respect to a shoulder arthroplasty surgical procedure. Examples of shoulder arthroplasties include, but are not limited to, reversed arthroplasty, augmented reverse arthroplasty, standard total shoulder arthroplasty, augmented total shoulder arthroplasty, and hemiarthroplasty. However, the techniques are not so limited, and the visualization system may be used to provide virtual guidance information, including virtual guides in any type of surgical procedure. Other example procedures in which a visualization system, such as MR system 212, may be used to provide virtual guides include, but are not limited to, other types of orthopedic surgeries; any type of procedure with the suffix "plasty," "stomy," "ectomy," "clasia," or "centesis,"; orthopedic surgeries for other joints, such as elbow, wrist, finger, hip, knee, ankle or toe, or any other orthopedic surgical procedure in which precision guidance is desirable.

A typical shoulder arthroplasty includes various work on a patient's scapula and performing various work on the patient's humerus. The work on the scapula may generally be described as preparing the scapula (e.g., the glenoid cavity of the scapula) for attachment of an implant component and attaching the implant component to the prepared scapula. Similarly, the work on the humerus may generally be described as preparing the humerus for attachment of an implant component and attaching the implant component to the prepared humerus. As described herein, the visualization system may provide guidance for any or all work performed in such an arthroplasty procedure.

As discussed above, a MR system (e.g., MR system 212, etc.) may receive a virtual surgical plan for attaching a prosthetic to a patient and/or preparing bones, soft tissue or other anatomy of the patient to receive the prosthetic. The virtual surgical plan may specify various work to be performed and various parameters for the work to be performed. As one example, the virtual surgical plan may specify a location on the patient's glenoid for performing reaming and a depth for the reaming. As another example, the virtual surgical plan may specify a surface for resecting the patient's humeral head. As another example, the virtual surgical plan may specify locations and/or orientations of one or more anchorage locations (e.g., screws, stems, pegs, keels, etc.).

In some examples, MR system 212 may provide virtual guidance to assist a surgeon in performing work on a patient's humerus. As shown in FIGS. 23A-30, MR system 212 may provide virtual guidance to assist a surgeon in humeral preparation, such as cutting to remove all or a portion of the humeral head. FIG. 30 is a conceptual diagram illustrating MR system 212 providing virtual guidance for attaching an implant to a humerus, in accordance with one or more techniques of this disclosure. A tool may be used to attach the implant to humerus 2000. For instance, the surgeon may utilize handle 2040 to insert prosthesis 2042 into the prepared humerus 2000. In some examples, one or more adhesives (e.g., glue, cement, etc.) may be applied to prosthesis 2042 and/or humerus 2000 prior to insertion. As shown in FIG. 30, MR system 212 may provide virtual guidance to assist a surgeon in humeral implant positioning, such as preparation of the humerus to receive an implant and positioning of the implant within the humerus.

Many different techniques may be used to prepare a humerus for prosthesis attachment and to perform actual prosthesis attachment. Regardless of the technique used, MR system 212 may provide virtual guidance to assist in one or both of the preparation and attachment. As such, while the following techniques are examples in which MR system 212 provides virtual guidance, MR system 212 may provide virtual guidance for other techniques.

In an example technique, the work steps include resection of a humeral head, creating a pilot hole, sounding, punching, compacting, surface preparation, with respect to the humerus, and attaching an implant to the humerus. Additionally, in some techniques, the work steps may include bone graft work steps, such as installation of a guide in a humeral head, reaming of the graft, drilling the graft, cutting the graft, and removing the graft, e.g., for placement with an implant for augmentation of the implant relative to a bone surface such as the glenoid.

A surgeon may perform one or more steps to expose a patient's humerus. For instance, the surgeon may make one or more incisions to expose the upper portion of the humerus including the humeral head. The surgeon may position one or more retractors to maintain the exposure. In some examples, MR system 212 may provide guidance to assist in the exposure of the humerus, e.g., by making incisions, and/or placement of retractors.

Figure 20:
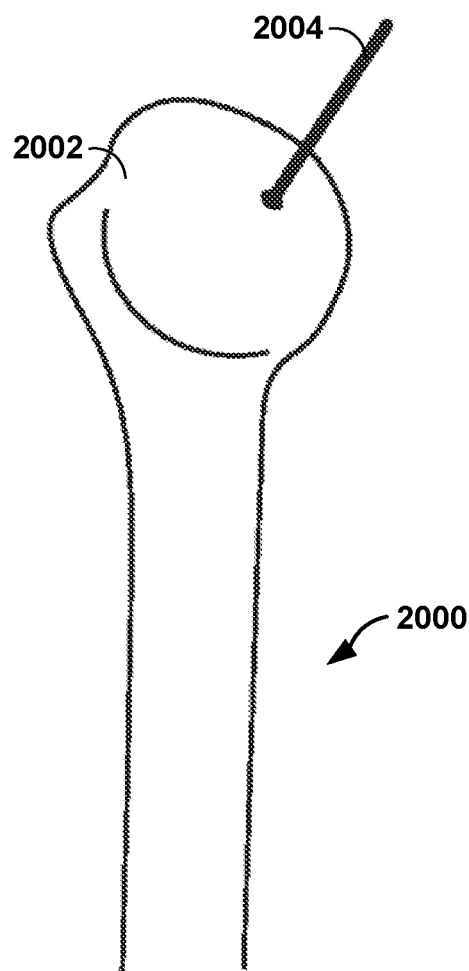
FIGS. 20 and 21 are conceptual diagrams illustrating an MR system providing virtual guidance for installation of a mechanical guide in a humeral head in a shoulder arthroplasty procedure, in accordance with one or more techniques of this disclosure.
Figure 21:
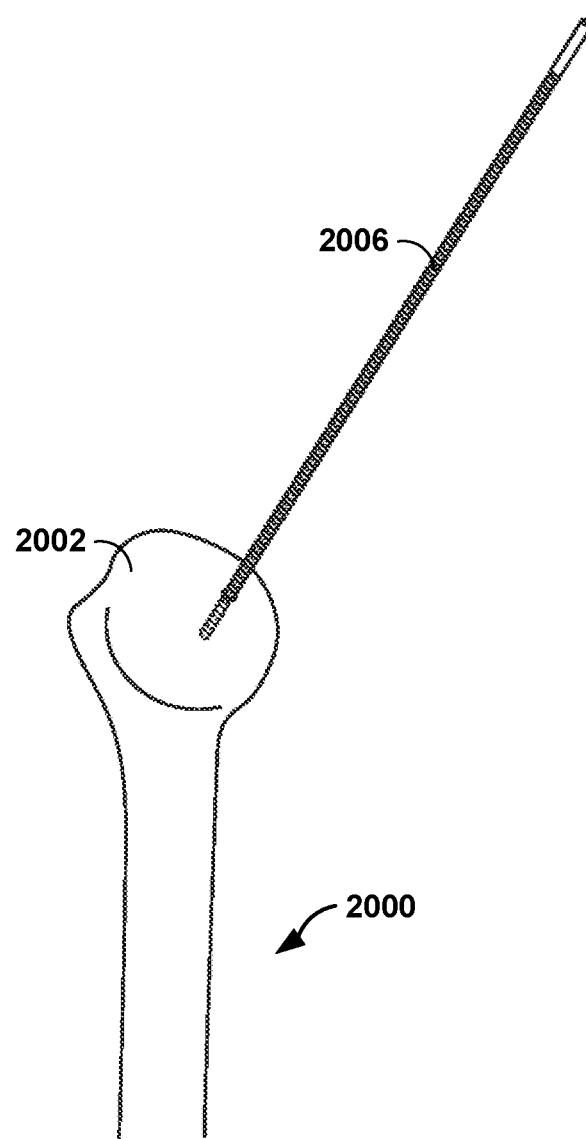

FIGS. 20 and 21 are conceptual diagrams illustrating an MR system providing virtual guidance for installation of a mechanical guide in a humeral head, in accordance with one or more techniques of this disclosure. It is noted that, for purposes of illustration, the surrounding tissue and some bone is omitted from FIGS. 20 and 21, and other figures. As shown in FIG. 20, MR system 212 may display virtual axis 2004 on humeral head 2002 of humerus 2000. FIG. 20 and subsequent figures illustrate what the surgeon, or other user, would see when viewing via visualization device 213. In particular, when viewing via visualization device 213, the surgeon would see a portion of humerus 2000 and virtual axis 2004 (and/or other virtual guidance) overlaid on the portion of humerus 2000.

To display virtual axis 2004, MR system 212 may determine a location on a virtual model of humerus 2000 at which a guide is to be installed. MR system 212 may obtain the location from a virtual surgical plan (e.g., the virtual surgical plan described above as generated by virtual planning system 202). The location obtained by MR system 212 may specify one or both of coordinates of a point on the virtual model and a vector. The point may be the position at which the guide is to be installed and the vector may indicate the angle/slope at which the guide is to be installed.

As discussed above, the virtual model of humerus 2000 may be registered with humerus 2000 such that coordinates on the virtual model approximately correspond to coordinates on humerus 2000. As such, by displaying virtual axis 2004 at the determined location on the virtual model, MR system 212 may display virtual axis 2004 at the planned position on humerus 2000.

The surgeon may attach a physical guide using the displayed virtual guidance. For instance, where the guide is a guide pin with a self-tapping threaded distal tip, the surgeon may align the guide pin with the displayed virtual axis 2004 and utilize a drill or other instrument to install the guide pin. In some examples, MR system 212 may display depth guidance information to enable the surgeon to install the guide pin to a planned depth.

FIG. 21 is a conceptual diagram illustrating guide 2006 as installed in humeral head 2002. Guide 2006 may take the form of an elongated pin to be mounted in a hole formed in the humeral head. GAs shown in FIGS. 20 and 21, by displaying virtual axis 2004, a surgeon may install guide 2006 at the planned position on humeral head 2002. In this way, MR system 212 may enable the installation of a guide without the need for an additional mechanical guide.

As discussed above, MR system 212 may provide virtual guidance, such as virtual markers, to assist the surgeon in the installation of the guide pin. For instance, in the example of FIG. 20, MR system 212 may display virtual axis 2004 to assist the surgeon in the installation of the guide pin. Other examples of virtual markers that MR system 212 may display include, but are not limited to axes, points, circles, rings, polygons, X shapes, crosses, or any other shape or combination of shapes. MR system 212 may display the virtual markers as static or with various animations or other effects.

Figure 22A:
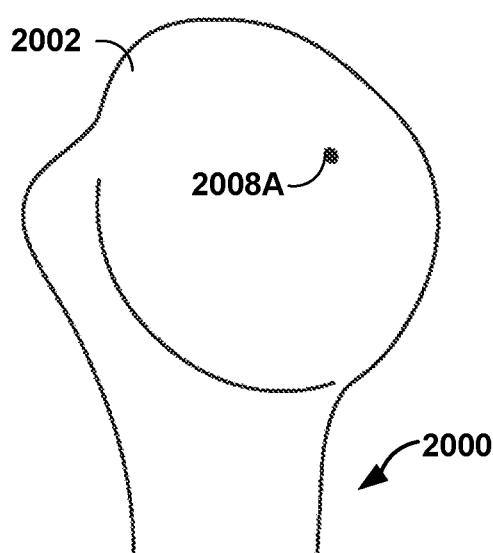
FIGS. 22A-22D illustrate examples of virtual markers that an MR system may display.
Figure 22B:
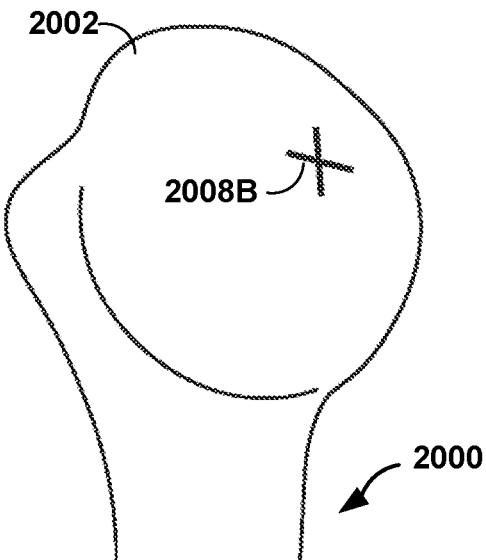
Figure 22C:
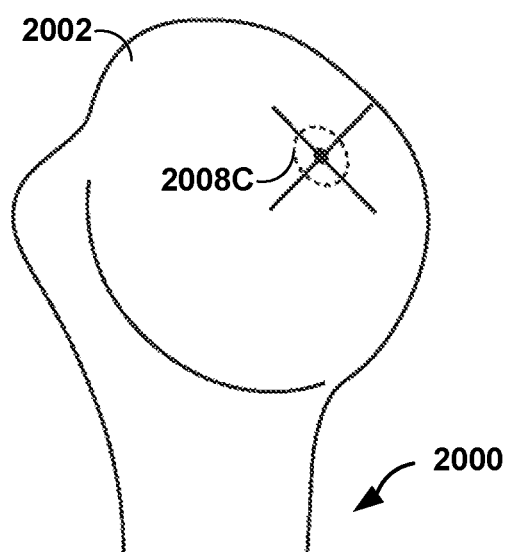
Figure 22D:
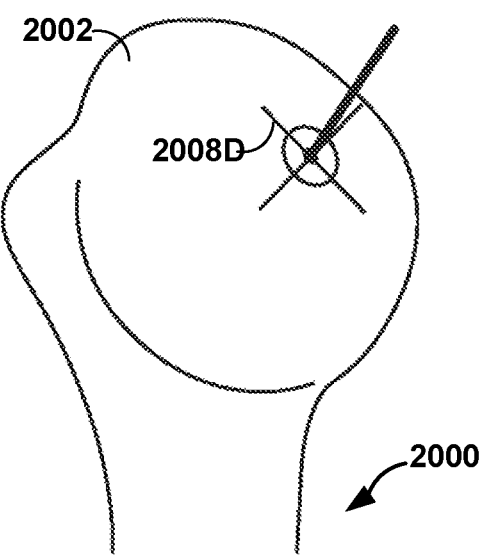

FIGS. 22A-22D illustrate examples of virtual markers that MR system 212 may display. FIG. 22A illustrates an example in which MR system 212 displays virtual marker 2008A as a point. FIG. 22B illustrates an example in which MR system 212 displays virtual marker 2008B as a cross/X shape. FIG. 22C illustrates an example in which MR system 212 displays virtual marker 2008C as a reticle. FIG. 22D illustrates an example in which MR system 212 displays virtual marker 2008D as combination of a reticle and an axis.

As discussed above, in some examples, MR system 212 may display the virtual markers with various animations or other effects. As one example, MR system 212 may display a virtual marker as a reticle having a rotating ring. As another example, MR system 212 may display a virtual marker as a flashing cross/X shape.

MR system 212 may display the virtual markers with particular colors. For instance, in some examples, MR system 212 may preferably display the virtual markers in a color other than red, such as green, blue, yellow, etc. Displaying the virtual markers in a color or colors other than red may provide one or more benefits. For instance, as blood appears red and blood may be present on or around the anatomy of interest, a red colored virtual marker may not be visible.

The use of the various types of virtual markers described above is not limited to installation of the guide pin. For instance, MR system 212 may display any of the virtual markers described above to assist the surgeon in performing any work. As one example, MR system 212 may display any of the virtual markers described above to assist the surgeon in performing any work on humerus 2000. As another example, MR system 212 may display any of the virtual markers described above to assist the surgeon in performing any work on a scapula or another other bone.

In order to prepare the humerus for implantation of the implant component, the surgeon may resect, cut, or otherwise remove the humeral head. Several MR assisted techniques for humeral head resection are contemplated, including techniques involving cutting the humeral head with removal of a graft and cutting the humeral head without removal of a graft. In a first example technique, MR system 212 may display a virtual cutting surface, such as a virtual cutting plane, that guides the surgeon in resecting the humeral head, e.g., without taking a graft. In this case, there may be no need for a mechanical guide, making the procedure less complex and possibly less costly, while still maintaining accuracy. Further details of the first example technique are discussed below with reference to FIGS. 23A-23C. In a second example technique, MR system 212 may display a virtual axis that guides the surgeon in installing a physical guide, i.e., mechanical guide, on the humerus, which then guides the surgeon in resecting the humeral head. Further details of the second example technique are discussed below with reference to FIG. 24.

FIGS. 23A-23C are conceptual diagrams illustrating an MR system providing virtual guidance for resection of a humeral head, in accordance with one or more techniques of this disclosure. As shown in FIGS. 23A and 23B, MR system 212 may display virtual cutting plane 2010 at a planned position on humerus 2000. To display virtual cutting plane 2010, MR system 212 may determine a location on a virtual model of humerus 2000 at which humeral head 2002 is to be resected. MR system 212 may obtain the location from a virtual surgical plan (e.g., the virtual surgical plan described above). As such, MR system 212 may display a virtual cutting surface (e.g., cutting plane) obtained from the virtual surgical plan that guides resection of a portion of a head of the humerus.

As discussed above, a virtual model of humerus 2000 may be registered with humerus 2000 such that coordinates on the virtual model approximately correspond to coordinates on humerus 2000. As such, by displaying virtual cutting plane 2010 at the determined location on the virtual model, MR system 212 may display virtual cutting plane 2010 at the planned position on humerus 2000.

The surgeon may resect humeral head 2002 using the displayed virtual guidance. For instance, the surgeon may utilize oscillating saw 2012 to resect humeral head 2002 by cutting along virtual cutting plane 2010. In some examples, MR system 212 may display targeting guidance to indicate whether the tool (e.g., oscillating saw 2012) is on the prescribed plane.

Figure 24:
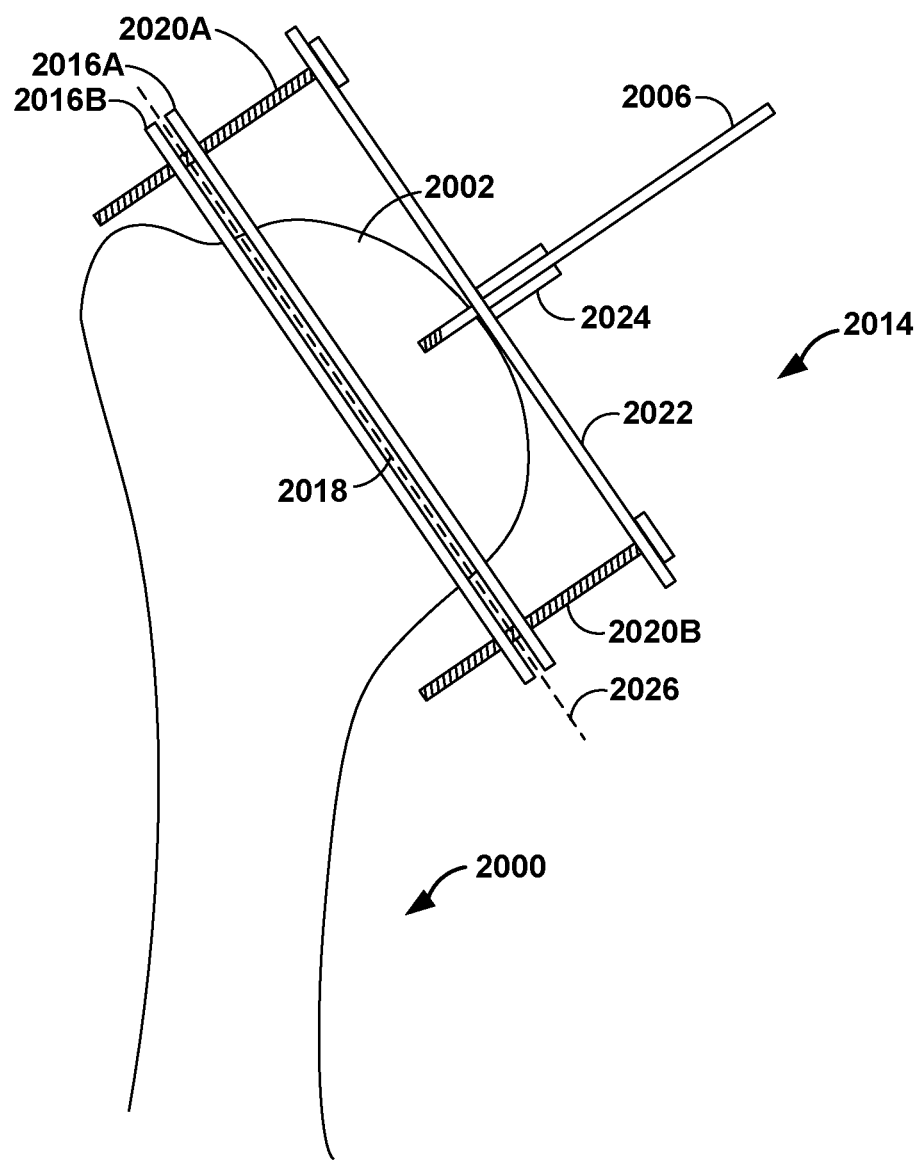
FIG. 24 is a conceptual diagram illustrating a physical guide for humeral head resection that is positioned using virtual guidance in a shoulder arthroplasty procedure, in accordance with one or more techniques of this disclosure.

FIG. 24 is a conceptual diagram illustrating a physical guide for humeral head resection that is positioned using virtual guidance, in accordance with one or more techniques of this disclosure. As discussed above, in the second example technique, MR system 212 may display a virtual axis that guides the surgeon in installing a physical guide, which guides the surgeon in resecting the humeral head. For instance, MR system 212 may display a virtual marker, such as a virtual axis, using techniques similar to those discussed above with reference to FIGS. 20 and 21. The surgeon may use the virtual axis to guide installation of physical guide 2006. As such, MR system 212 may display a virtual drilling axis obtained from the virtual surgical plan that guides drilling a hole in the humerus and attachment of a guide pin in the hole in the humerus.

The surgeon may use guide 2006 to assist in the installation of resection guide 2014 (e.g., the guide pin may be configured to guide attachment of a resection guide to the humerus). In general, resection guide 2014 may be a physical assembly configured to physically guide a tool (e.g., an oscillating saw) for resecting a humeral head. In the example of FIG. 24, resection guide 2014 includes plates 2016A and 2016B (collectively, "plates 2016"), upper plate 2022, adjustment screws 2020A and 2020B (collectively, "adjustment screws 2020"), and guide receiver 2024.

Guide receiver 2024 may be sized to accept guide 2006 such that resection guide 2014 may be passed over guide 2006. Plates 2016 define slot 2018, which may be sized to receive and guide a physically guide a tool (e.g., an oscillating saw) between plates 2016 and across cutting plane 2026. Upper plate 2022 may be configured to rest against a top of humeral head 2002 (either native or after work has been performed to remove a graft). Adjustment screws 2020 may be collectively or independently adjusted to position plates 2016, and thus cutting plane 2026, relative to upper plate 2022.

MR system 212 may provide virtual guidance to assist in the positioning of resection guide 2014. As one example, MR system 212 may display a virtual cutting plane at the desired location of cutting plane 2026. The surgeon may adjust adjustment screws 2020 until slot 2018 is alighted with the virtual cutting plane. In some examples, MR system 212 may provide guidance as to which of adjustment screws 2020 is to be tightened or loosened. Once resection guide 2014 is properly configured (e.g., slot 2018 is alighted with the virtual cutting plane), the surgeon may operate a tool to resect humeral head 2002.

Figure 25:
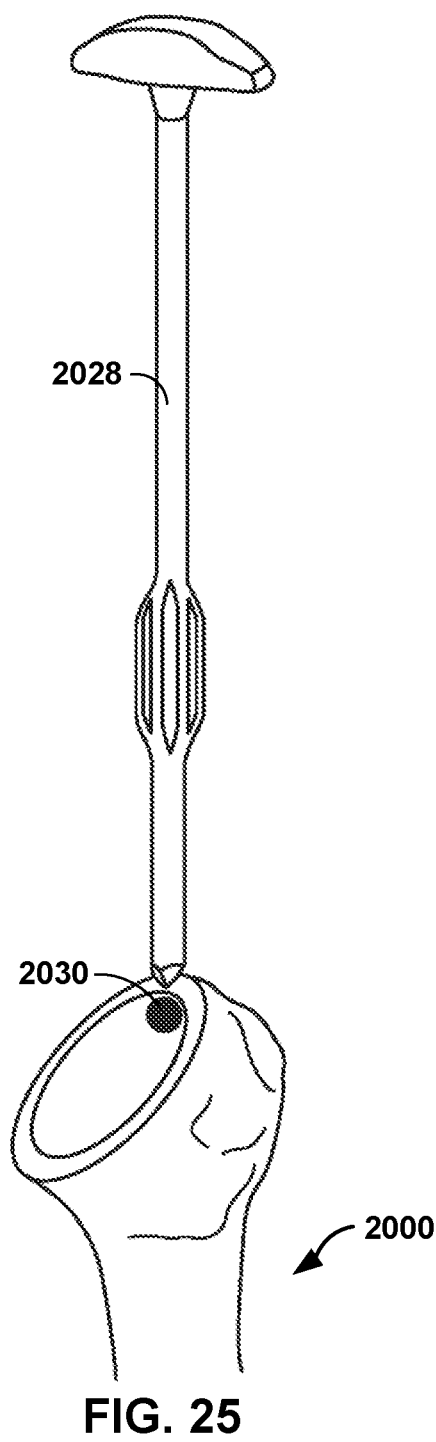
FIGS. 25 and 26 are conceptual diagrams illustrating an MR system providing virtual guidance for creating a pilot hole in a humerus in a shoulder arthroplasty procedure, in accordance with one or more techniques of this disclosure.
Figure 26:
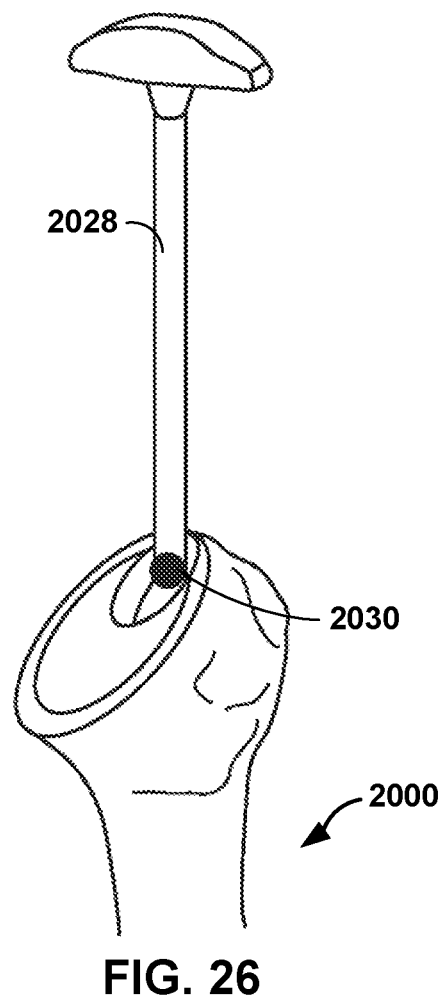

FIGS. 25 and 26 are conceptual diagrams illustrating an MR system providing virtual guidance for creating a pilot hole in a humerus, in accordance with one or more techniques of this disclosure. As shown in FIGS. 25 and 26, starter awl 2028 may be used to create a pilot hole in-line with a humeral canal at a hinge point of the resection.

MR system 212 may provide virtual guidance to assist in the creation of the pilot hole. As one example, MR system 212 may display targeting guidance, such as a virtual marker (e.g., virtual point 2030) that represents the location at which the surgeon should create the pilot hole. For instance, MR system 212 may display a virtual axis obtained from the virtual surgical plan that guides creation of a pilot hole in the humerus after a head of the humerus has been resected. As another example MR system 212 may display depth guidance to assist the surgeon in creating the pilot hole to a prescribed depth.

Figure 27:
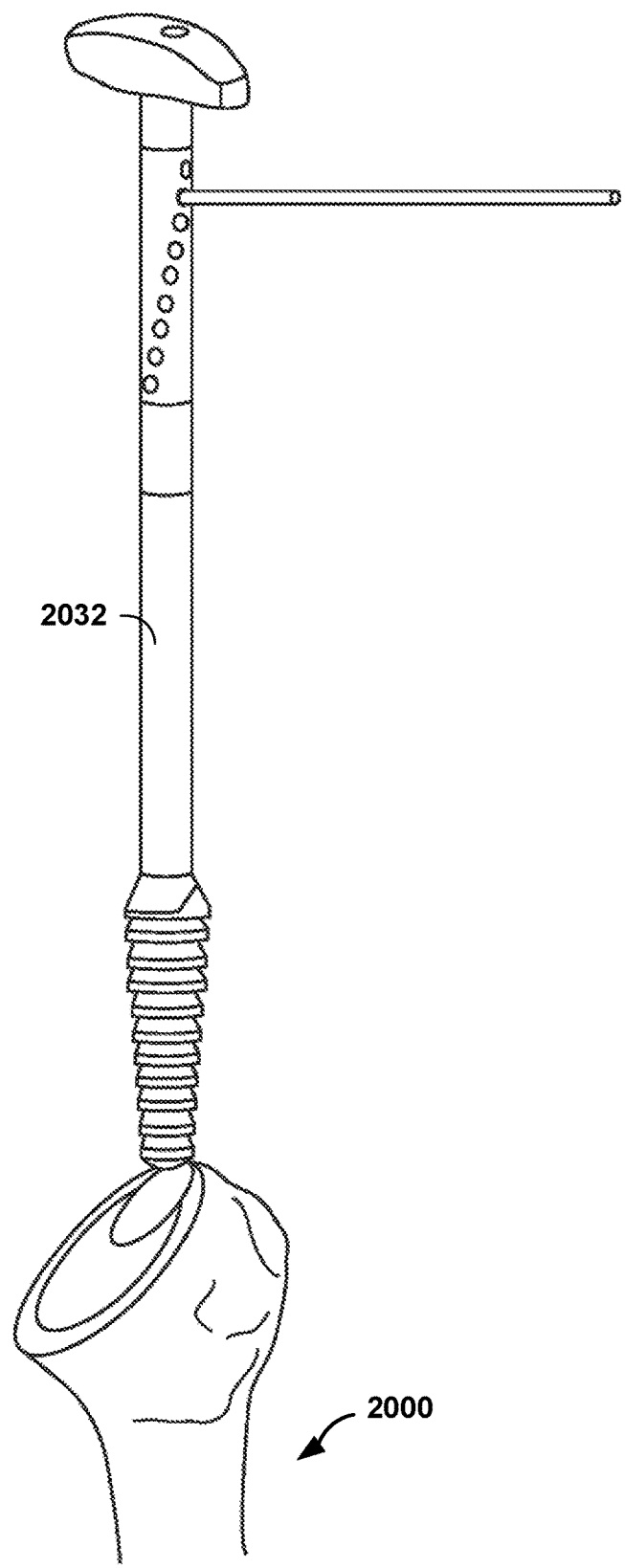
FIG. 27 is a conceptual diagram illustrating an MR system providing virtual guidance for sounding a humerus in a shoulder arthroplasty procedure, in accordance with one or more techniques of this disclosure.

FIG. 27 is a conceptual diagram illustrating an MR system providing virtual guidance for sounding a humerus, in accordance with one or more techniques of this disclosure. As shown in FIG. 27, sounder 2032 may be used to determine an upper size limit of a distal portion of humerus 2000. In some examples, as discussed herein, multiple sounders of different sizes may be used to the upper size limit.

MR system 212 may provide virtual guidance to assist in the sounding. As one example, MR system 212 may display virtual targeting guidance for sounder 2032. For instance, MR system 212 may display a virtual marker (e.g., as discussed above with reference to FIGS. 22A-22D) that indicates where sounder 2032 should be inserted.

Figure 28:
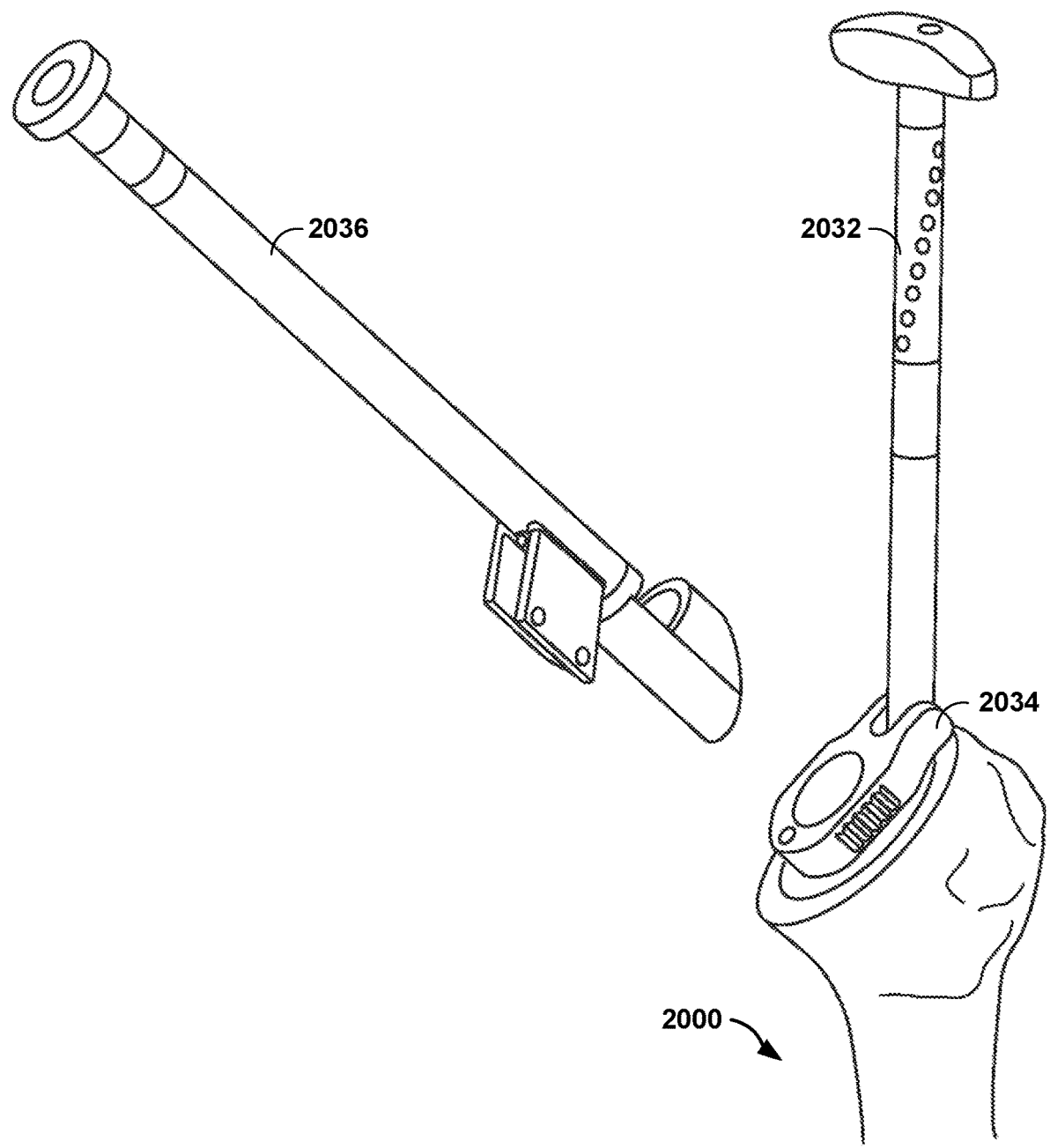
FIG. 28 is a conceptual diagram illustrating an MR system providing virtual guidance for punching a humerus in a shoulder arthroplasty procedure, in accordance with one or more techniques of this disclosure.

FIG. 28 is a conceptual diagram illustrating an MR system providing virtual guidance for punching a humerus, in accordance with one or more techniques of this disclosure. As shown in FIG. 28, the surgeon may attach punch template 2034 to sounder 2032 (or the final sounder determined during the sounding step). The surgeon may then place punch 2036 into template 2034 until punch 2036 bottoms out on template 2034. The surgeon may then remove the scored bone by pulling sounder 2032, template 2034, and punch 2036 out of humerus 2000.

MR system 212 may provide virtual guidance to assist in the punching. As one example, MR system 212 may display an indication of whether punch 2036 is properly positioned in template 2034. For instance, where punch 2036 is properly positioned in template 2034, MR system 212 may display a virtual marker that indicates proper position (e.g., a checkmark). Similarly, where punch 2036 is not properly positioned in template 2034, MR system 212 may display a virtual marker that indicates improper position (e.g., an X).

Figure 29:
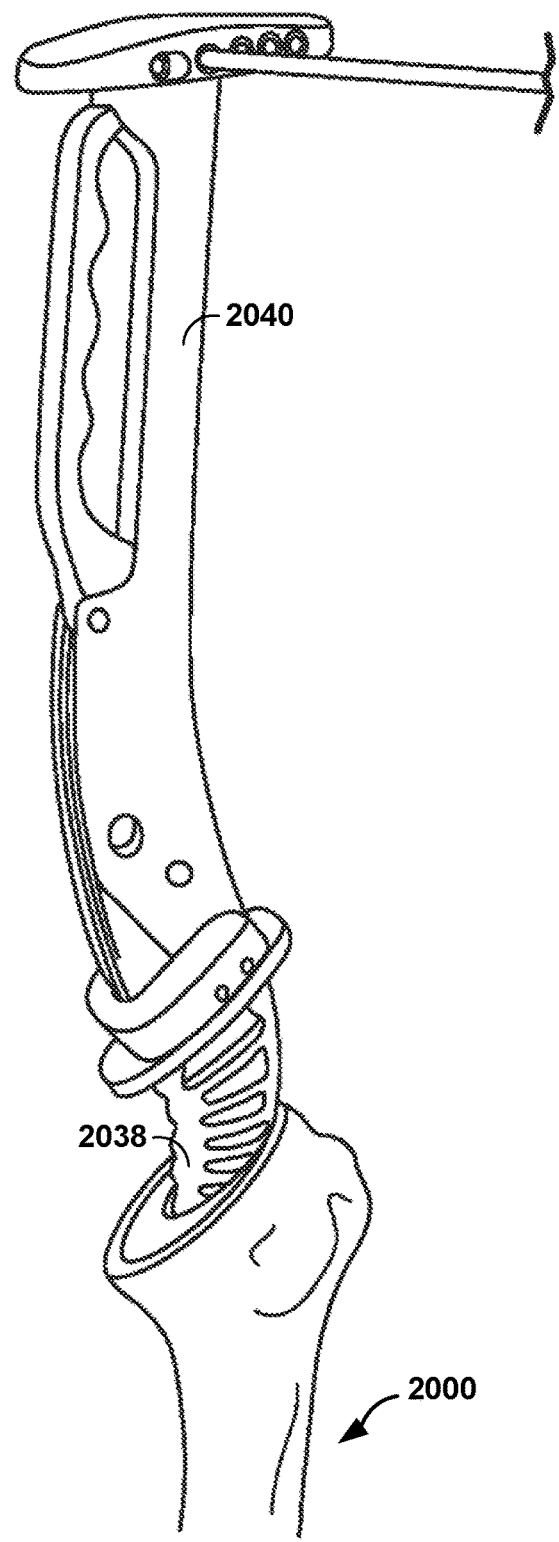
FIG. 29 is a conceptual diagram illustrating an MR system providing virtual guidance for compacting a humerus in a shoulder arthroplasty procedure, in accordance with one or more techniques of this disclosure.
Figure 30:
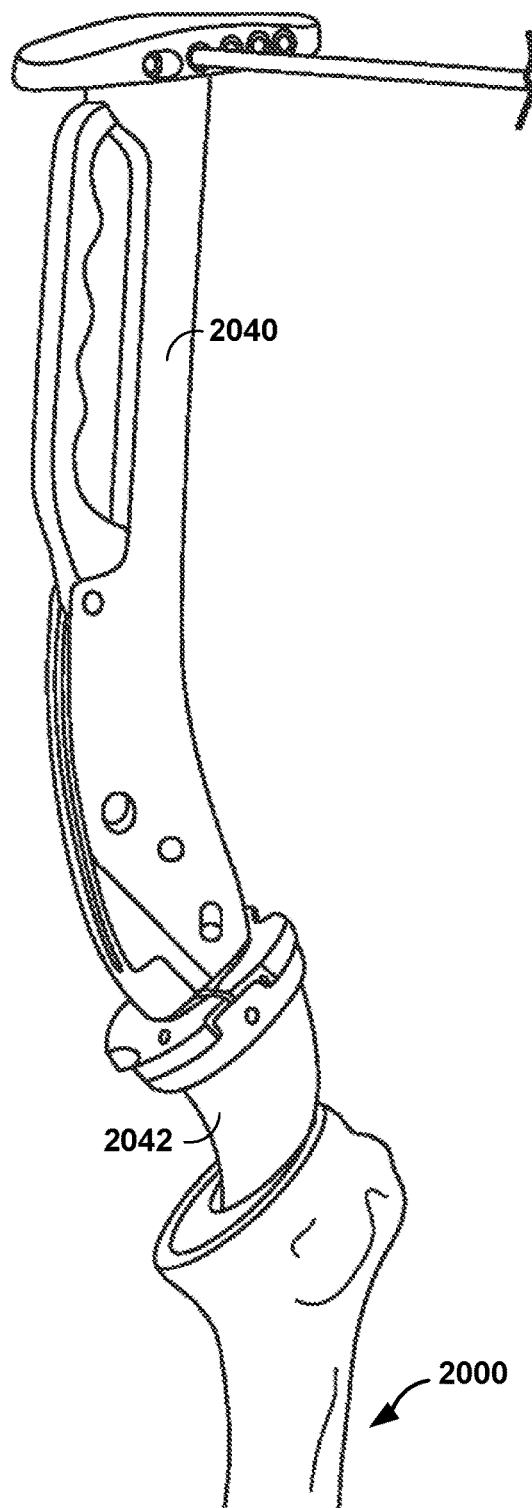
FIG. 30 is a conceptual diagram illustrating an MR system providing virtual guidance for attaching an implant to a humerus in a shoulder arthroplasty procedure, in accordance with one or more techniques of this disclosure.

FIG. 29 is a conceptual diagram illustrating an MR system providing virtual guidance for compacting a humerus, in accordance with one or more techniques of this disclosure. As shown in FIG. 29, compactor 2038 may be attached to handle 2040 and inserted into humerus 2000. In some examples, multiple compactors may be used. For instance, the surgeon may begin with a compactor three sizes below a size of the final sounder and compact sequentially until satisfactory fixation is achieved. Satisfactory fixation can be assessed by a slight torque motion of handle 2040. Compactor 2038 should not move within the humerus during this test if satisfactory fixation has been achieved.

MR system 212 may provide virtual guidance to assist in the compacting. As one example, MR system 212 may display indication of whether satisfactory fixation has been achieved. For instance, where MR system 212 determines that satisfactory fixation has been achieved, MR system 212 may display a virtual marker that indicates satisfactory fixation (e.g., a checkmark). Similarly, where MR system 212 determines that satisfactory fixation has not been achieved, MR system 212 may display a virtual marker that indicates unsatisfactory fixation (e.g., an X).

The surgeon may disconnect compactor 2038 (e.g., the final compactor) from handle 2040. The surgeon may then perform one or more surface preparation steps.

As shown above, certain steps of a surgical procedure may involve a surgeon inserting an implant or implant tool into a bone. As one example, the surgeon may insert a starter awl, such as starter awl 2028, as discussed above with reference to FIGS. 25 and 26. As another example, the surgeon may insert one or more sounders, such as sounder 2032, as discussed above with reference to FIG. 27. As another example, the surgeon may insert a punch, such as punch 2036, as discussed above with reference to FIG. 28. As another example, the surgeon may insert a compactor, such as compactor 2038, as discussed above with reference to FIG. 29. As another example, the surgeon may insert an implant component, such as prosthesis 2042 (e.g., a stem for a humeral implant, such as an anatomic or reverse humeral implant for shoulder replacement), as discussed above with reference to FIG. 30. In accordance with this disclosure, a system, such as MR system 212 of FIG. 2, may utilize virtual tracking to provide the surgeon with information regarding a distance between the implant or implant tool and a wall (e.g., a cortical wall) of the bone.

Figure 31:
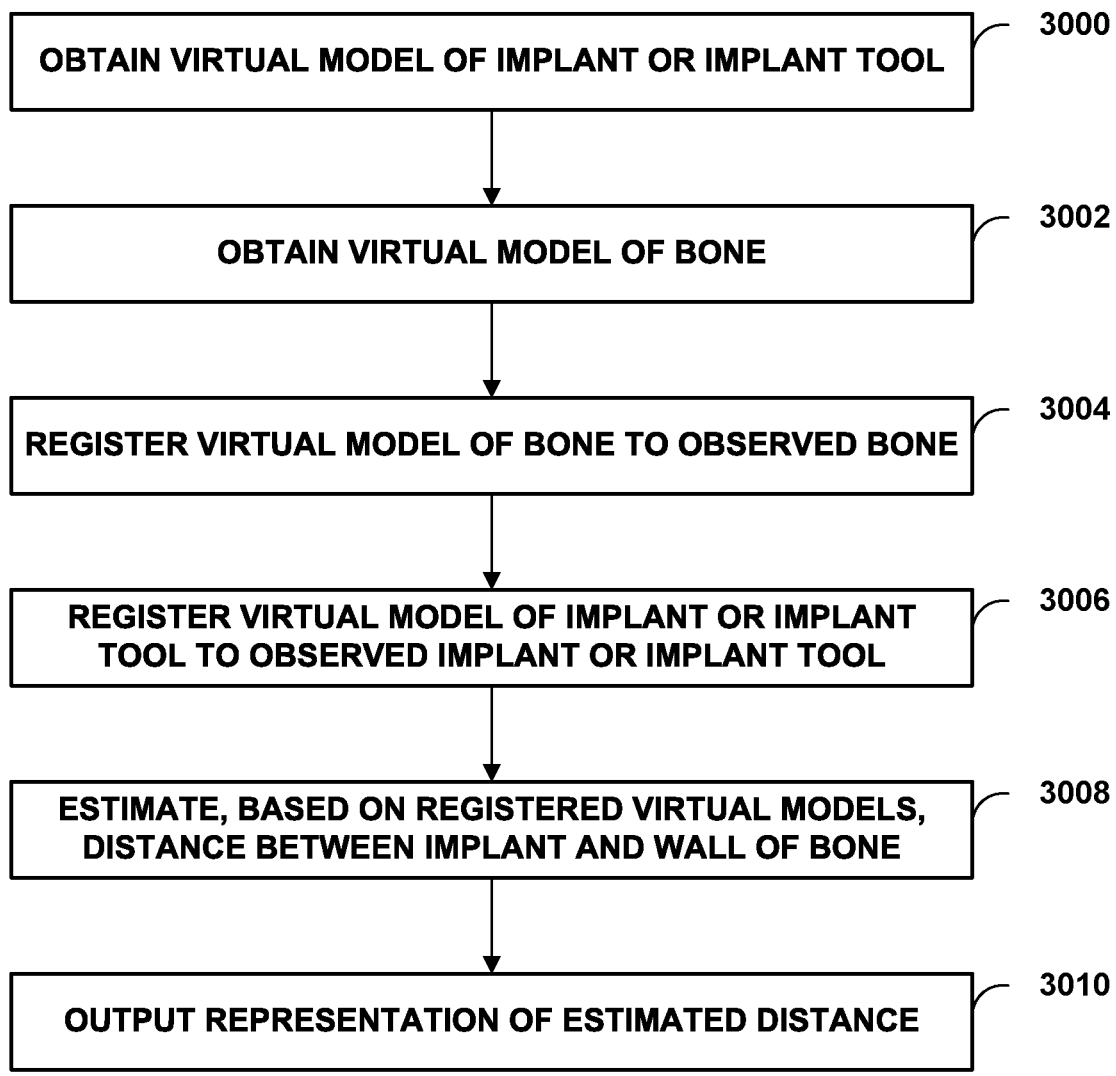
FIG. 31 is a flowchart illustrating an example process for monitoring a spatial relationship between an implant or implant tool and a bone, in accordance with one or more techniques of this disclosure.

FIG. 31 is a flowchart illustrating an example process for monitoring a spatial relationship between an implant or implant tool and a bone, in accordance with one or more techniques of this disclosure. For purposes of explanation, the process of FIG. 31 will be described as being performed by MR system 212 of FIG. 2. However, the process of FIG. 31 is not so limited and may be performed by other systems or devices.

MR system 212 may obtain a virtual model of an implant or an implant tool (3000). For instance, MR system 212 may obtain a 3D model (e.g., a point cloud or mesh) that represents at least a portion of a surface of the implant or implant tool (e.g., an outer surface of starter awl 2028, sounder 2032, punch 2036, compactor 2038, and/or prosthesis 2042). As one specific example, processing device(s) 210 of MR system 212 may obtain, from a virtual surgical plan stored in memory 215, a point cloud or mesh that represents an outer surface of the implant or implant tool.

MR system 212 may obtain a virtual model of a bone (3002). For instance, MR system 212 may obtain a 3D model (e.g., a point cloud or mesh) that represents at least a portion of a wall of the bone. For instance, MR system 212 may obtain, from a virtual surgical plan stored in memory 215, a 3D model that represents one or more walls of the bone. For instance, MR system 212 may obtain a first point cloud or mesh that represents an inner wall of at least a portion of humerus 1800 and a second point cloud or mesh that represents an outer wall of at least a portion of humerus 1800.

MR system 212 may register the virtual model of the bone to a corresponding observed bone (3004). For instance, MR system 212 may register the virtual model of humerus 1800 to a corresponding observed portion of humerus 1800 using the registration techniques discussed above with reference to FIGS. 20A-31. As discussed above, the registration the virtual model of humerus 1800 to a corresponding observed portion of humerus 1800 may use markers or may be markerless. Where the registration uses one or more markers, the markers may be attached to humerus 1800 at any suitable position. As one example, as shown in the example of FIG. 16, marker 1601 may be attached to the humerus. As a consequence of the registration, MR system 212 may be able to map changes in the position of the observed bone to the virtual model of the bone (e.g., using SLAM as described above).

MR system 212 may register the virtual model of the implant or implant tool to a corresponding observed implant or implant tool (3006). For instance, MR system 212 may register the virtual model of prosthesis 2042 to a corresponding observed portion of prosthesis 2042 using the registration techniques discussed above with reference to FIGS. 20A-31. As discussed above, the registration the virtual model of prosthesis 2042 to a corresponding observed portion of prosthesis 2042 may use markers or may be markerless. Where the registration uses one or more markers, the markers may be attached to prosthesis 2042, and/or a handle used to insert prosthesis 2042 (e.g., handle 2040 of FIG. 30) at any suitable position. As a consequence of the registration, MR system 212 may be able to map changes in the position of the observed implant or implant tool to the virtual model of the implant or implant tool (e.g., using SLAM as described above).

MR system 212 may estimate, based on the registered virtual models, a distance between the implant or implant tool and a wall of the bone (3008). For instance, MR system 212 may determine distances between points on the virtual model of the implant or implant tool and the virtual model of the bone. Further details regarding the distance estimation are discussed below with reference to FIGS. 32A-32E.

MR system 212 may output a representation of the estimated distance (3010). As one example, MR system 212 may output an alert if the estimated distance (e.g., if any of the distances between the points on the virtual model of the implant or implant tool and the virtual model of the bone) is less than a threshold distance. As another example, MR system 212 may continuously output the estimated distance (or distances) between the implant and wall of the bone. The distances between the implant and the wall of the bone may be a remaining distance indicating how much space is present until the implant makes contact with the wall of the bone. MR system 212 may also present to a user information such as an indication of one or more locations and distances for where the implant is closest to the wall of the cortical bone, an indication of one or more locations and distances where the implant is less than a threshold amount away from the wall of the bone, an indication of an average distance between the implant and the wall of the cortical bone, or other such indications.

MR system 212 may output any of the aforementioned representations, alerts, or notifications using any type of output modality. Example output modalities include, but are not necessarily limited to, haptic, audio, graphical, textual, or any other indication perceptible to the surgeon. As one example, MR system 212 may cause a speaker of sensory devices 526 of visualization device 213 of FIG. 4 to emit a tone in response to determining that the estimated distance is less than the threshold distance. As another example, MR system 212 may cause one or more of sensory devices 526 to vibrate in response to determining that the estimated distance is less than the threshold distance. As another example, MR system 212 may cause visualization device 213 to display a graphical representation of the relative positions of the implant and the wall of the bone. As another example, MR system 212 may cause visualization device 213 to display text indicating a current distance between the implant and the wall of the bone.

As discussed above, in some examples, MR system 212 may cause visualization device 213 to display a graphical representation of the relative positions of the implant and the wall of the bone. For instance, MR system 212 may cause visualization device to display the virtual model of the implant and the virtual model of the bone. As such, in some examples, the surgeon can change their perspective (e.g., move their head around) to see the relative positions of the implant and the bone.

FIGS. 32A-32E are conceptual diagrams illustrating example virtual models of a bone and an implant, in accordance with one or more techniques of this disclosure. Each of FIGS. 32A-32E includes bone virtual model 3200 and implant tool virtual model 3204. As shown in the example of FIGS. 32A-32E, bone virtual model 3200 may correspond to at least a portion of humerus 2000 and implant tool virtual model 3204 may correspond to at least a portion of compactor 2038. However, in other examples, bone virtual model 3200 may correspond to other bones and implant tool virtual model 3204 may correspond to other implant tools or implants. As one example, implant tool virtual model 3204 may correspond to a least a portion of prosthesis 2042.

In some examples, it may be desirable for implant tool virtual model 3204 to correspond to objects that will at least partially protrude from the bone during use. For example, where implant tool virtual model 3204 corresponds to an object that does not partially protrude from the bone during use, it may be difficult for an MR system, such as MR system 212, to maintain registration of implant tool virtual model 3204 (e.g., where visual registration is used). In accordance with one or more techniques of this disclosure, implant tool virtual model 3204 may correspond to both portions of an implant or implant tool that do not protrude from the bone during use and portions of the implant or implant tool that do protrude from the bone during use. For instance, implant tool virtual model 3204 may correspond to portions of an implant or implant tool and a handle used to insert the implant or implant tool. As one example, implant tool virtual model 3204 may correspond to a least a portion of compactor 2038 and handle 2040. As another example, implant tool virtual model 3204 may correspond to a least a portion of prosthesis 2042. As another example, implant tool virtual model 3204 may correspond to a least a portion of prosthesis 2042 and handle 2040.

As the position and orientation of the handle used to insert the implant or implant tool may be fixed to the position and orientation the implant or implant tool, MR system 212 may be able to track the position of the implant or implant tool by at least tracking a portion of the handle. For instance, MR system 212 may determine a position of a portion of implant tool virtual model 3204 that corresponds to a portion of prosthesis 2042 by tracking a portion of implant tool virtual model 3204 that correspond to a portion handle 2040.

Each of bone virtual model 3200 and implant tool virtual model 3204 may include a plurality of points. In the example of FIGS. 32A-32E, bone virtual model 3200 includes points 3202A-32025 (collectively, "points 3202") and implant tool virtual model 3204 includes points 3206A-3206R (collectively, "points 3206"). Points 3202 may represent a wall of a bone, such as an inner or outer cortical wall of humerus 2000. Virtual model 3200, including points 3202 may be obtained based on images (e.g., CT images, MRI images, etc.) of the patient (e.g., images captured during preoperative phase 302 of FIG. 3). Virtual model 3200 may represent the wall of the bone as the wall will (e.g., is planned to) exist prior to the surgeon using the implant or implant tool that corresponds to implant tool virtual model 3204. For instance, in the example of FIGS. 32A-32E, virtual model 3200 may represent the wall of humerus 2000 after any combination of a humeral head has been removed from humerus 2000, starter awl 2028 has been used to create a hole in humerus 2000 (e.g., as described above with reference to FIGS. 25 and 26), one or more sounders 2032 have been used to sound humerus 2000 (e.g., as described above with reference to FIG. 27), and punch 2036 has been used to punch humerus 2000 (e.g., as described above with reference to FIG. 28).

Points 3206 may represent an outer surface of an implant or implant tool, such as an outer surface of compactor 2038. Virtual model 3204, including points 3206, may be obtained from a manufacturer of the implant or implant tool (e.g., from a CAD model or other virtual representation of the implant or implant tool). While illustrated in the example of FIGS. 32A-32E as having 19 points, bone virtual model 503 may include additional or fewer points. For instance, bone virtual model 3200 may include hundreds, thousands, millions, of points that represent the wall of a bone. Similarly, virtual model 3204 may include hundreds, thousands, millions, of points that represent the outer surface of a tool.

As discussed above, a system, such as MR system 212 may register the virtual models and use the registered models to determine a distance between the implant or implant tool and a wall of the bone such as, e.g., an inner wall of cortical bone of the humerus. For instance, MR system 212 may register bone virtual model 3200 to humerus 2000 (e.g., step 3004 of FIG. 31) and register implant tool virtual model 3204 to compactor 2038 and/or handle 2040 (e.g., step 3006 of FIG. 31), and use the registered virtual models to estimate a distance between compactor 2038 and a wall of humerus 2000.

Figure 32A:
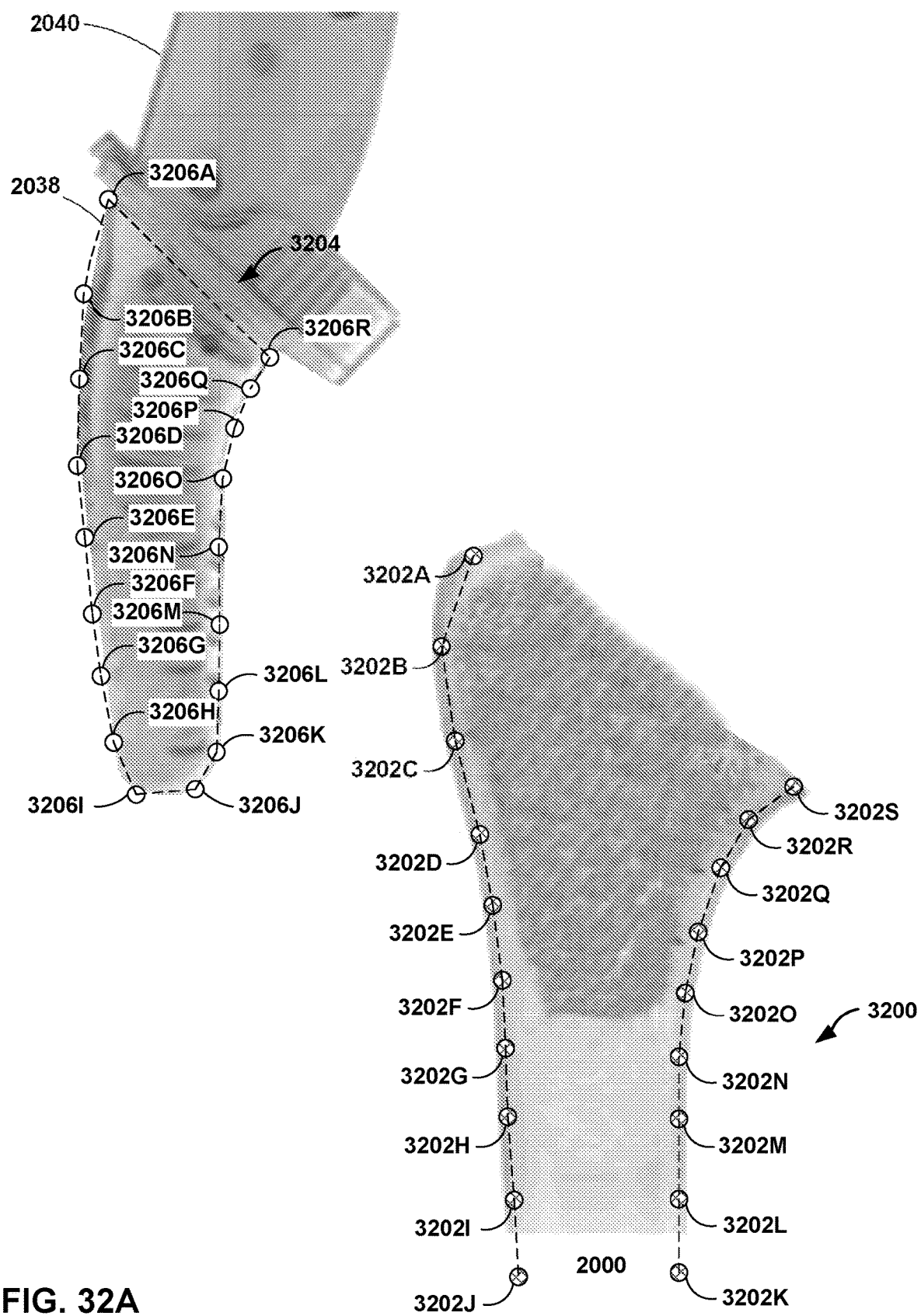
FIGS. 32A-32E are conceptual diagrams illustrating example virtual models of a bone and an implant, in accordance with one or more techniques of this disclosure.
Figure 32B:
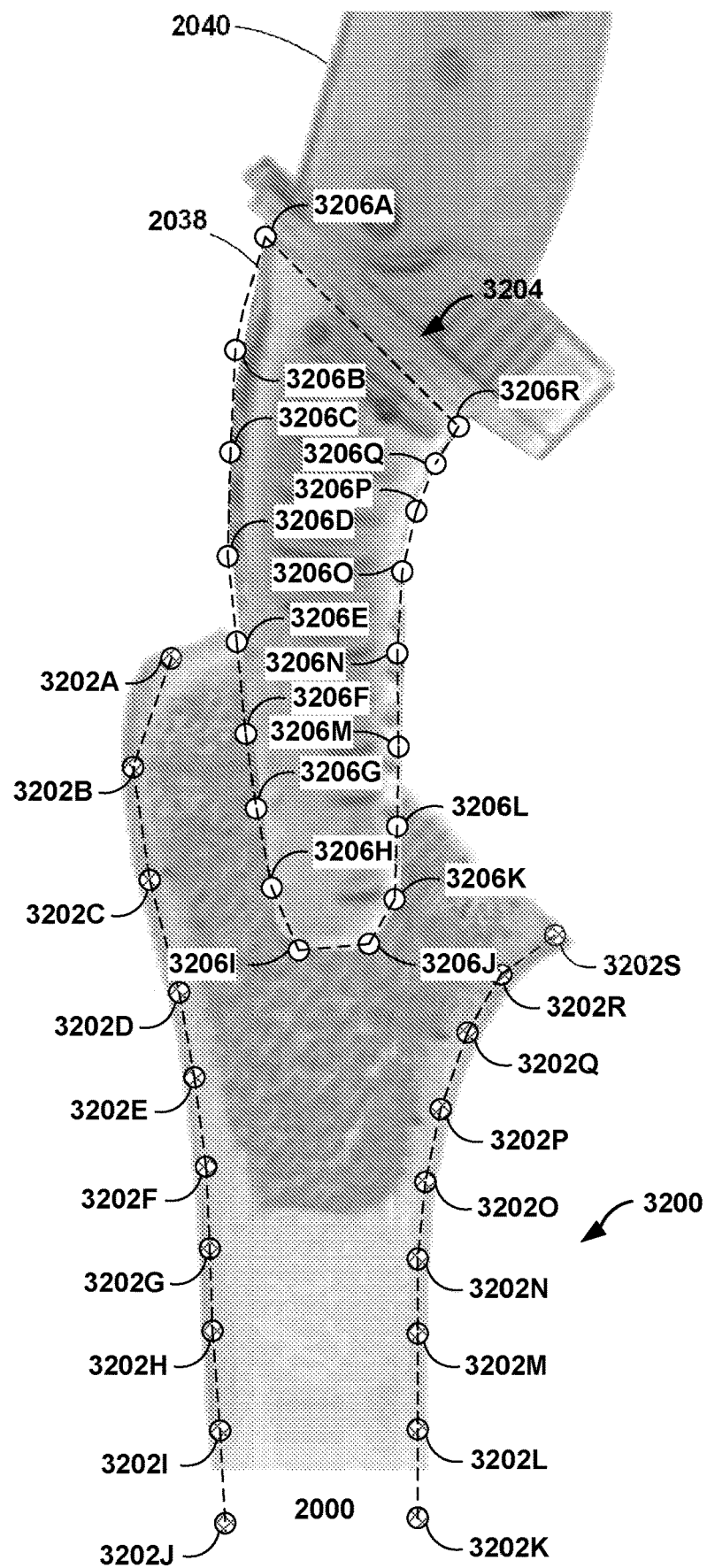
Figure 32C:
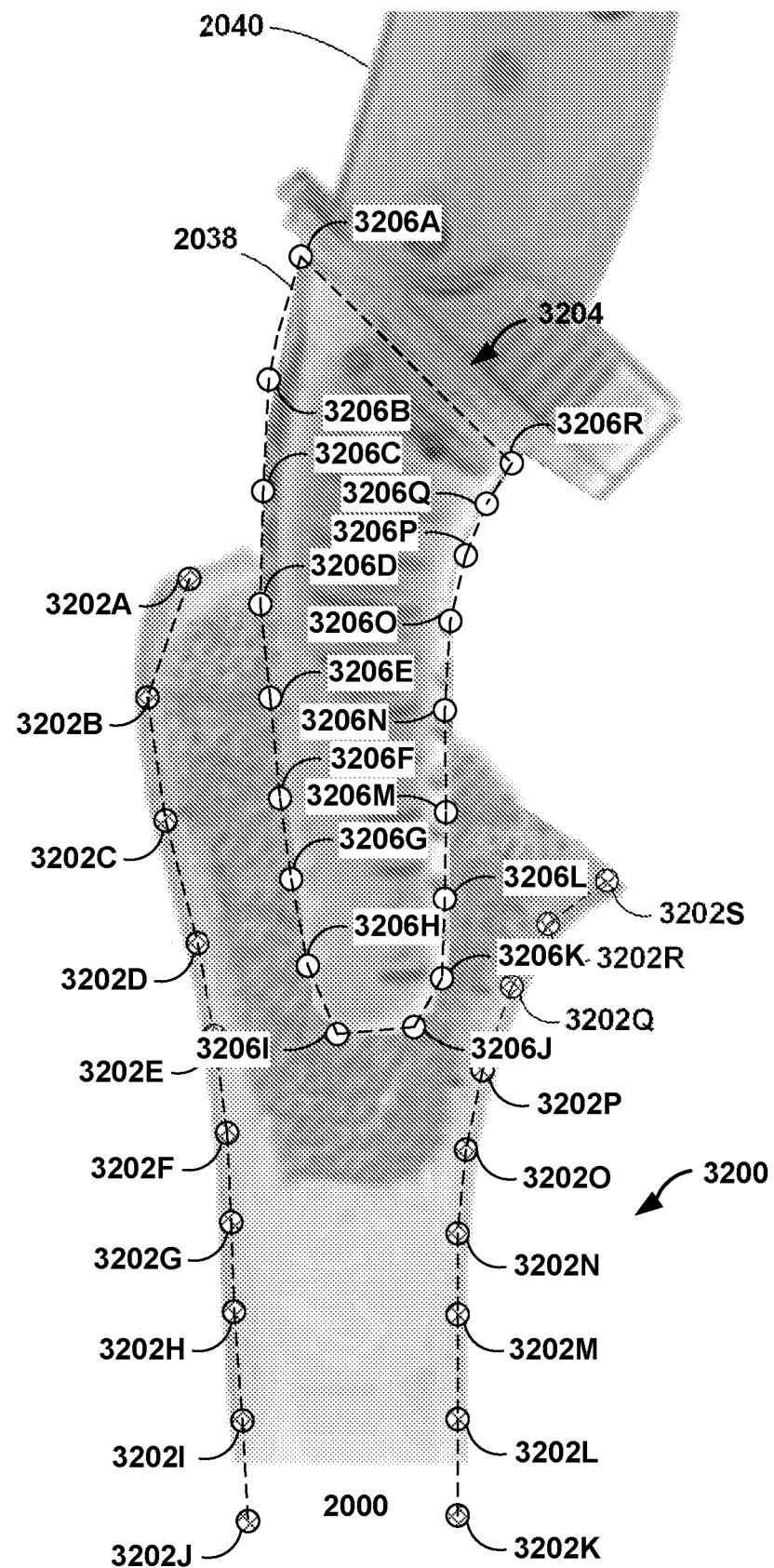
Figure 32D:
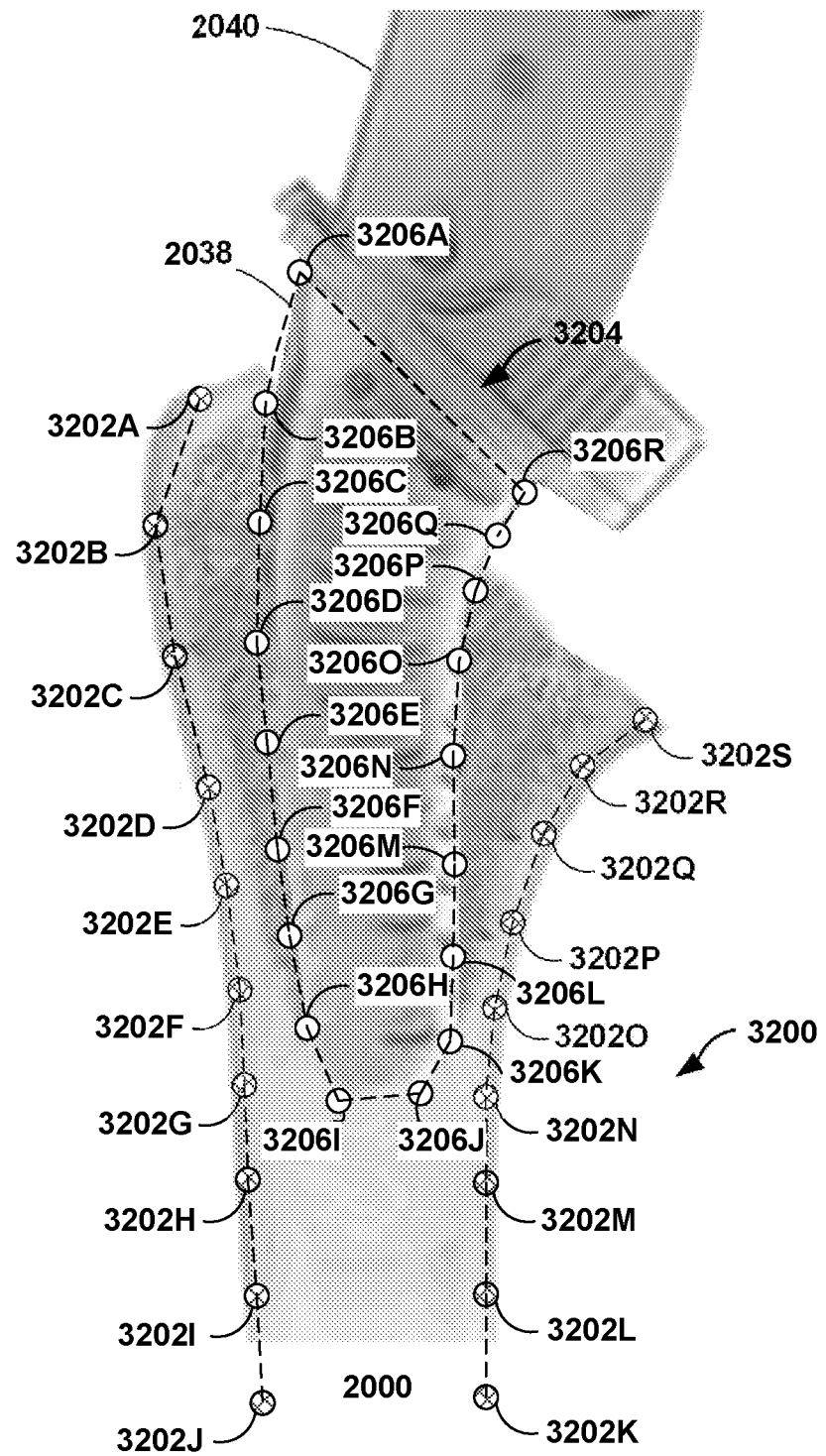
Figure 32E:
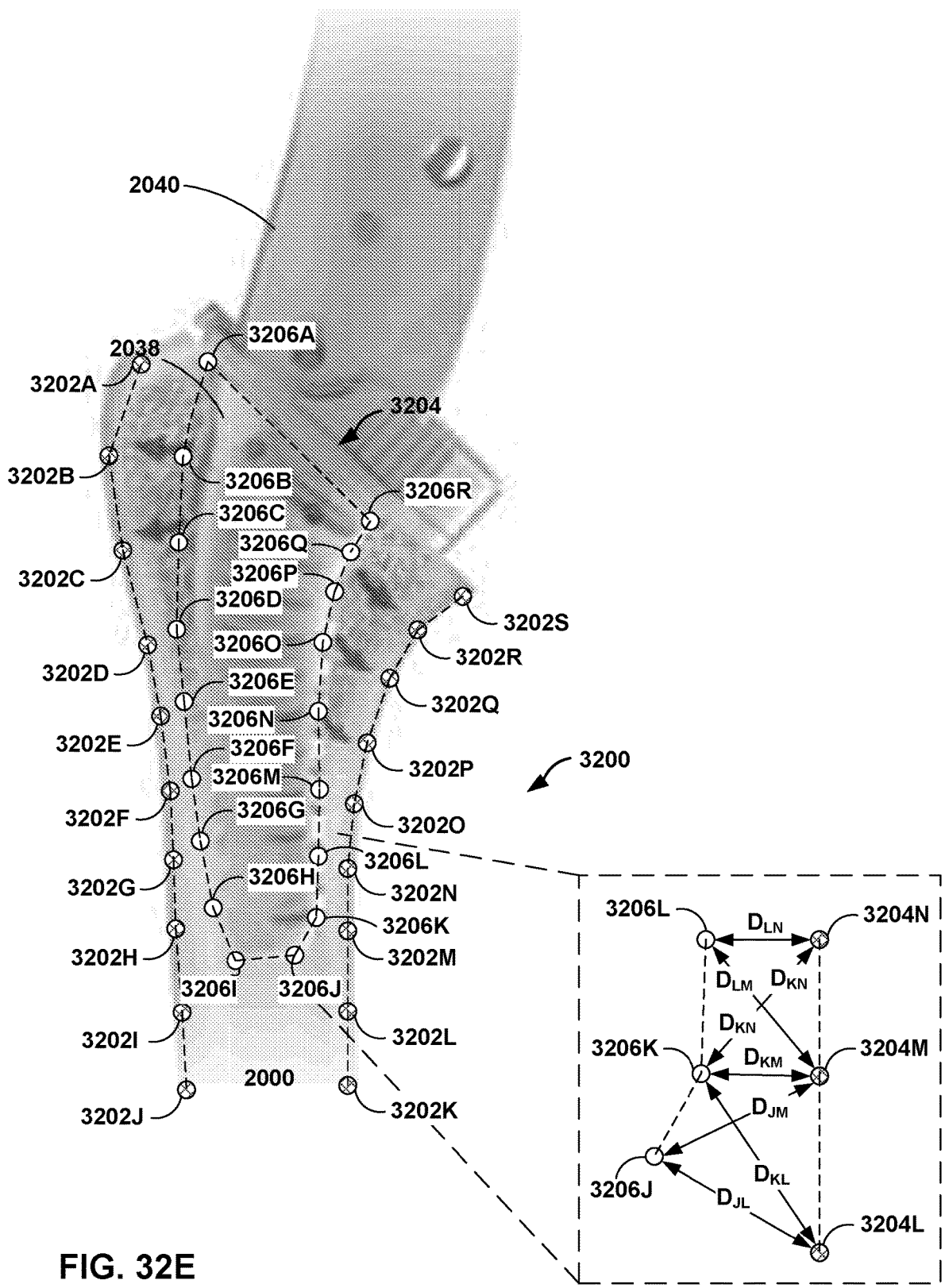

MR system 212 may continue to track the registered virtual models as the corresponding observed structures are moved. For instance, as shown in the example of FIGS. 32A-32E, MR system 212 may track the position of implant tool virtual model 3204 relative to the position of bone virtual model 3200 as compactor 2038 is inserted into humerus 2000 using handle 2040. MR system 212 may track the relative positions at any combination of stages of insertion. As one example, as shown in the example of FIG. 32A, MR system 212 may track the relative position of bone virtual model 3200 and implant tool virtual model 3204 (and thus the relative position of compactor 2038 and humerus 2000) pre-insertion. As another example, as shown in the example of FIGS. 32B-32D, MR system 212 may track the relative position of bone virtual model 3200 and implant tool virtual model 3204 (and thus the relative position of compactor 2038 and humerus 2000) as compactor 2038 is inserted into humerus 2000. As another example, as shown in the example of FIG. 32E, MR system 212 may track the relative position of bone virtual model 3200 and implant tool virtual model 3204 (and thus the relative position of compactor 2038 and humerus 2000) as compactor 2038 is fully inserted into humerus 2000.

In some examples, MR system 212 may estimate the distance by determining the distance between respective pairs of points on the implant virtual model and points on the bone virtual model. As one example, MR system 212 may determine $D_{LN}$ as the distance between point 3206L on implant tool virtual model 3204 and point 3202N on bone virtual model 3200. As another example, MR system 212 may determine $D_{LM}$ as the distance between point 3206L on implant tool virtual model 3204 and point 3202M on bone virtual model 3200.

In some examples, MR system 212 may determine distances between all points on implant tool virtual model 3204 and bone virtual model 3200. For instance, MR system 212 may determine distances between all points corresponding to the surface of the implant tool and all points corresponding to the wall of the bone.

In some examples, MR system 212 may determine distances between a subset of points on implant tool virtual model 3204 and bone virtual model 3200. As one example, MR system 212 may determine distances between a subset of points on the surface of the implant tool (e.g., a most distal portion of the implant tool, or the portion of the implant tool that is first introduced into the bone) and a subset of points on the bone (e.g., portions of the bone closest to the point at which the implant tool is introduced). As another example, MR system 212 may determine distances between a subset of points on the surface of the implant tool (e.g., a most distal portion of the implant tool, or the portion of the implant tool that is first introduced into the bone) and all points on the bone.

In some examples, MR system 212 may determine distances between points on implant tool virtual model 3204 and a subset of points on bone virtual model 3200. As one example, MR system 212 may determine distances between all points on the surface of the implant tool and a subset of points on the bone (e.g., portions of the bone closest to the point at which the implant tool is introduced).

MR system 212 may determine a distance between two points using any suitable technique. For instance, MR system 212 may determine distance $D_{KM}$ in accordance with the following equation where $3206K_X$, $3206K_Y$, and $3206K_Z$ correspond to the x,y,z coordinates of point 3206K and $3202M_X$, $3202M_Y$, and $3202M_Z$ correspond to the x,y,z coordinates of point 3202M:

$$D_{KM} = \sqrt{(3202M_X - 3206K_X)^2 + (3202M_Y - 3206K_Y)^2 + (3202M_Z - 3206K_Z)^2}$$

MR system 212 may determine a minimum from the determined distances. For instance, where MR system 212 determines distances $D_{LN}$ as 9 mm, $D_{LM}$ as 12 mm, $D_{KN}$ as 12 mm, $D_{KM}$ as 4 mm, and $D_{KN}$ as 12 mm, MR system 212 may determine that $D_{KM}$ is the minimum distance (i.e., between the implant tool and the bone wall).

MR system 212 may use the determined minimum distance to selectively provide an indication of various errors. For instance, as discussed above, if the determined minimum distance is less than a threshold distance (e.g., 2 mm, 3 mm, 4 mm, 5 mm), MR system 212 may output a warning to the surgeon.

MR system 212 may output the warning using any output modality. Example output modalities include, but are not necessarily limited to, haptic, audio, graphical, textual, or any other indication perceptible to the surgeon. As one example, MR system 212 may cause a speaker of sensory devices 526 of visualization device 213 of FIG. 4 to emit a tone in response to determining that the determined minimum distance is less than the threshold distance. As another example, MR system 212 may cause one or more of sensory devices 526 to vibrate in response to determining that the determined minimum distance is less than the threshold distance. As another example, MR system 212 may cause visualization device 213 to display a graphical warning (e.g., an "X", colored highlighting of one or both of the implant or bone virtual models, etc.) in response to determining that the determined minimum distance is less than the threshold distance. As another example, MR system 212 may cause visualization device 213 to display text (e.g., "Warning," "Cortical Contact Imminent," etc.) in response to determining that the determined minimum distance is less than the threshold distance.

Figure 33:
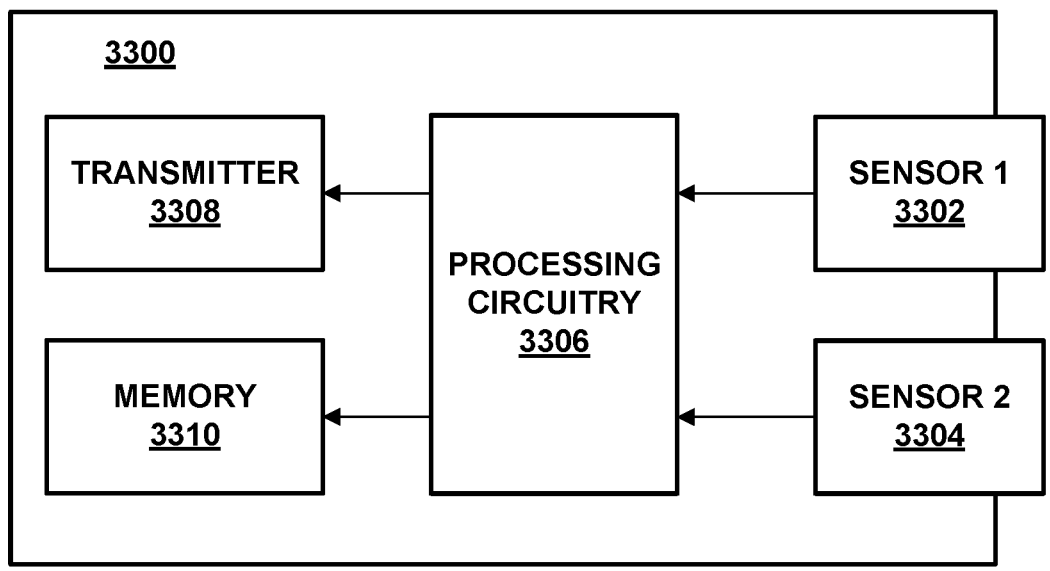
FIG. 33 shows an example implant component positioning device in accordance with another example of the techniques of this disclosure.

FIG. 33 shows an example of device 3300 which may be configured, possibly in conjunction with other devices described in this disclosure, to determine a depth of implantation for an implant component and/or a distance between a bone and the implant component. In the examples of FIG. 33, device 3300 includes first sensor 3302, second sensor 3304, processing circuitry 3306, transmitter 3308, and memory 3310. First sensor 3302 and second sensor 3304 may be located in close proximity to one another and are generally configured to sense in approximately the same directions. Accordingly, the directions in which first sensor 3302 and second sensor 3304 sense are approximately parallel or slightly converging.

Device 3300 may be considered to be a component of intraoperative guidance system 108 or may be considered to be a component that is separate from intraoperative guidance system 108 but in communication with intraoperative guidance system 108. In some implementations, device 3300 may be a standalone device capable of presenting information to a user through one or a combination of auditory, visual, or haptic feedback.

Device 3300 may take any one of several forms. Device 3300 may, for example, be part of a strap or band that wraps around a patient's arm or leg or may be a cuff or sleeve into which a patient inserts an arm or a leg being operated on. In other implementation, device 3300 may be a wand- or probe-like device that a device user moves across a portion of a patient's body or may be a plank-like, e.g., substantially planar, surface that a device user rotates around a patient's arm or leg.

In operation, first sensor 3302 is configured to output, to processing circuitry 3306, a first value that is indicative of a distance between the first sensor and an outer bone wall inside a patient. The bone wall may, for example, be a cortical bone. In the example of a humeral implant, the bone wall may be a cortical bone wall around a humeral canal in which an implant components is placed. First sensor 3302 may, for example, be an ultrasonic or ultrasound sensor that emits a soundwave (e.g., as discrete bursts) and receives a reflection of the soundwave off of the outer bone wall. First sensor 3302 or processing circuitry 3306 may determine the first value based on a difference between a time when the ultrasonic sensor emits the soundwave and a time when the ultrasonic sensor receives the reflection of the soundwave. Thus, the output of sensor 3302 may be a time value or multiple time values from which a distance can be determined using sonomicrometry or some other technique.

Sensor 3304 may be configured to output, to processing circuitry 3306, a second value that is indicative of a distance to an implantable component inside the patient. The implantable component may, for example, be metallic, and sensor 3304 may be configured to detect metal. The second sensor may, for example, be a magnetic sensor, such as a hall effect sensor, and the second value may be a voltage value. Sensor 3304 may, for example, be configured to emit a magnetic field and detect a voltage change induced in the magnetic sensor in response to emitting the magnetic field. The metal of an implantable component can cause the change in the magnetic field, and the voltage change induced in sensor 3304 can be correlated to a distance to the metal of the implant component. In some instances, the value output by sensor 3304 may indicate that no implant component is detected at the position of the sensor, e.g., along an arm of the patient in the case of shoulder arthroplasty procedure. In this context, the position refers to a position along a longitudinal axis of the bone. For a humerus bone, that axis runs from the head of the humerus to the trochlea of the humerus, or more generally, from the shoulder joint to the elbow joint.

Processing circuitry 3306 processes the first value and the second value, and transmitter 3308 transmits an output based on the first value and the second value. In some examples, processing circuitry 3306 converts the output value of sensor 3302 into a first distance value representative of the distance between sensor 3302 and the outer bone wall inside of the patient. If the output of sensor 3302 is a time value, for example, then processing circuitry 3306 can convert the time value into a first distance value based on a known value for the speed of sound in human tissue. Processing circuitry 3306 can also convert the output value of sensor 3304 into a second distance value representative of the distance between sensor 3304 and the implantable component inside of the patient. By subtracting the first distance value from the second distance value, processing circuitry 3306 can determine a distance between an outer wall of a bone and an outer wall of an implant component being implanted into the bone. By subtracting a bone thickness from the distance between the outer wall of the bone and the outer wall of the implant component, processing circuitry 3306 can determine a distance between an inner wall of the bone and the outer wall of the implant component being implanted into the bone. The bone thickness may be a known or estimated bone thickness.

Transmitter 3308 may then transmit the determined distance(s) to another system, such as intraoperative guidance system 108. If the second value indicates that no implant component is detected, then transmitter 3308 may transmit that information instead of a determined distance. In other examples, transmitter 3308 transmits the first value and the second value to intraoperative guidance system 108, and intraoperative guidance system 108 converts the output value of sensor 3302 into the first distance value and also converts the output value of sensor 3304 into the second distance value. Intraoperative guidance system 108 can then subtract the first distance value from the second distance value to determine the distance between an outer wall of a bone and an outer wall of an implant component being implanted into the bone. Or, if the second value indicates that no implant component is detected, then intraoperative guidance system 108 can make the determination that no implant component is present.

Figure 34:
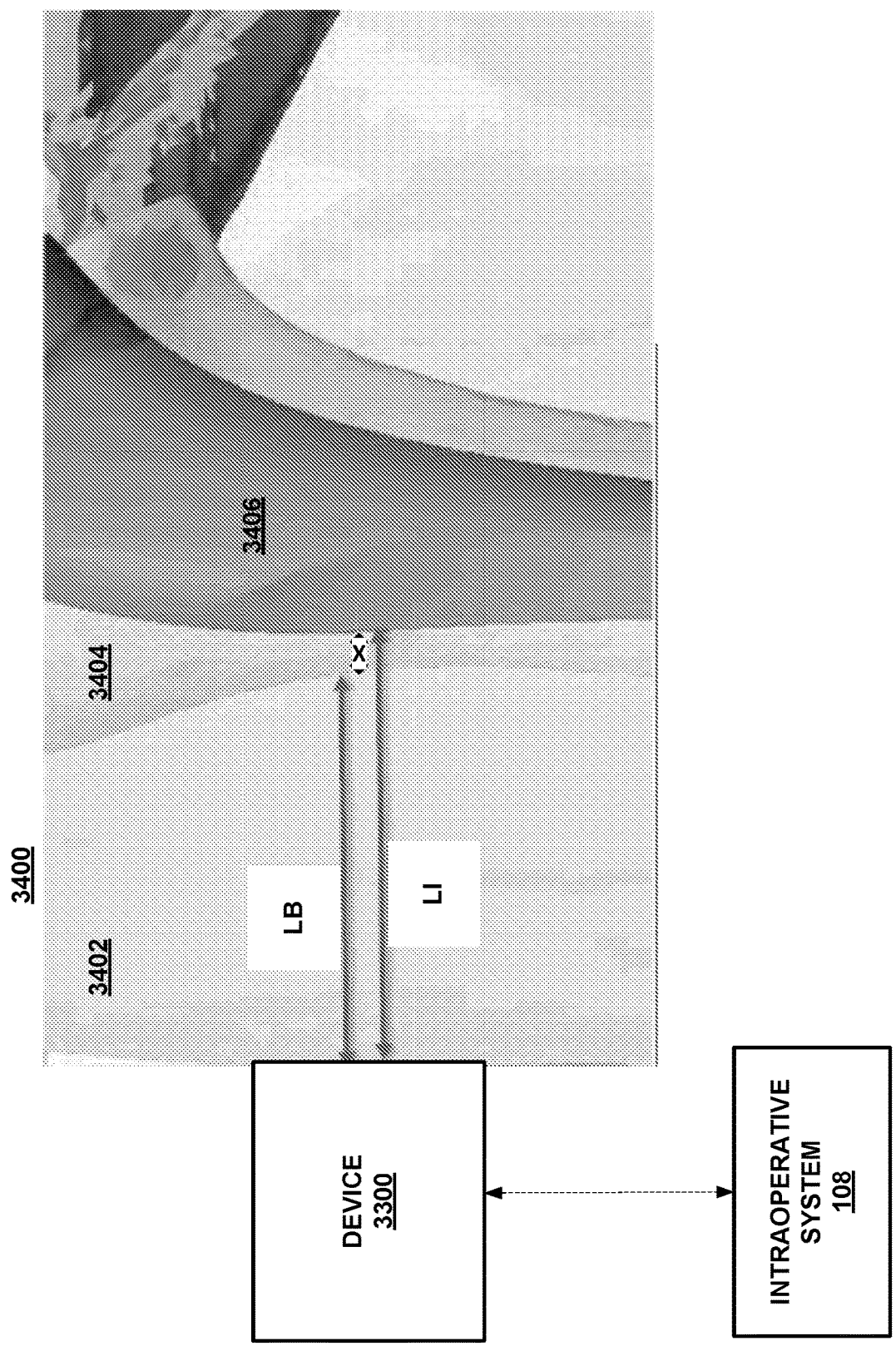
FIG. 34 shows an example of the implant component positioning device of FIG. 33 being used to measure a distance between an outer diameter of a bone wall an outer diameter of an implant component.

FIG. 34 shows an example of device 3300 being used to measure a distance between an outer diameter of a bone wall and an outer diameter of an implant component. FIG. 34 shows an example of an arm 3400, with soft tissue 3402, humerus cortical bone 3404, and implant component 3406. In the example of FIG. 34, implant component 3406 is shown as a stem of a stemmed humeral implant, which may, for example, also include a humeral ball for engagement with a glenoid implant. The techniques of this disclosure, however, are not limited to any particular type of implant component. Device 3300 is placed against an outer surface of arm 3400 with sensors 3302 and 3304 oriented towards humerus bone 3404 and implant component 3406.

As explained above, first sensor 3302 of device 3300 is configured to output, to processing circuitry 3306, a first value that is indicative of a distance to an outer wall of cortical bone 3404. The distance to the outer wall of cortical bone 3404 inside arm 3400 is shown as distance LB in FIG. 34. Sensor 3304 is configured to output, to processing circuitry 3306, a second value that is indicative of a distance to an outer wall of implant component 3406. The distance to the outer wall of implant component 3406 is shown as distance LI in FIG. 34.

Device 3300 transmits the first value and the second value to intraoperative guidance system 108. If the first value is indicative of a time difference between when first sensor 3302 emits a soundwave and receives a reflection of the soundwave, then intraoperative guidance system 108 can convert the time difference value to distance value LB based on the speed of sound through soft tissue 3402. In other implementations, components of device 3300, such as processing circuitry 3306 and/or sensor 3302, may determine distance value LB, in which case the first value transmitted from device 3300 to intraoperative guidance system 108 may be an indication of distance LB. The first value transmitted from device 3300 to intraoperative guidance system 108 may be a value directly indicative of distance LB or any value from which distance LB can be derived.

If the second value is indicative of a voltage level, then intraoperative guidance system 108 can convert voltage level to distance value LI based on known parameters of sensor 3304. In other implementations, components of device 3300, such as processing circuitry 3306 and/or sensor 3304, may determine distance value LI, in which case the second value transmitted from device 3300 to intraoperative guidance system 108 may be an indication of distance LI. The second value transmitted from device 3300 to intraoperative guidance system 108 may be a value directly indicative of distance LI or any value from which distance LI can be derived.

Intraoperative guidance system 108 can determine the distance between an outer wall of cortical bone 3404 and an outer wall of implant component 3406. The distance between the outer wall of cortical bone 3404 and the outer wall of implant component 3406 is shown in FIG. 34 as distance X. Intraoperative guidance system 108 can determine the value for distance X by subtracting distance LB from distance LI. In other implementations, device 3300 may determine the value for distance X by subtracting distance LB from distance LI and transmit the value for distance X to intraoperative guidance system 108.

Sensor 3302 and sensor 3304 may be configured to move or be moved, either automatically or manually, up and down a limb and/or around a circumference of the limb. By moving sensors 3302 and 3304, device 3300 may determine a value for distance X at multiple points along a limb. Device 3300 may also be configured to determine an implant depth for implant component 3406 by determining a last axial positional along a limb at which sensor 3304 can detect the presence of implant component 3406 and a first axial position along the limb at which sensor 3304 cannot detect the presence of implant component 3406. The axial positions may, for example, be expressed as proximal to a shoulder or distal to a shoulder along an axis that generally corresponds to the arm.

One or both of device 3300 and intraoperative guidance system 108 may also be configured to determine a predicted or estimated distance between the outer wall of the implant component and an inner wall of a cortical bone by subtracting, from the determined distance between the outer wall of the bone and the outer wall of the implant component (i.e., distance X), an estimated value for the thickness of the cortical bone. In some instances, the thickness of the cortical bone may be determined from pre-operative imaging of the patient and/or predictive modeling, as disclosed elsewhere in this disclosure. In other instances, the thickness of the cortical bone may be determined based on known averages for patients with certain demographic characteristics, such as gender, age, height, etc.

With multiple values for distance X at multiple axial positions along a limb, device 3300 may also be configured to predict a point of first contact between the implant component and an inner cortical wall of bone 3404 or predict a region of the inner cortical wall that may have a highest probability of fracture. Device 3300 may, for example, make such a prediction based on a model of a bone, determined using techniques described elsewhere in this disclosure, and a model, such as a 3D model, of the implant component being installed. The model of the implant component being installed may be stored or obtainable by device 3300 and may include information such as the dimensions and shape of the implant component.

Thus, with multiple values for distance X at multiple points along a limb, device 3300 can determine a present location for implant component 3406. Using the multiple values for distance X at multiple points along a limb, device 3300 can also determine an orientation for implant component 3406. The orientation may, for example, be a rate at which the tip of implant component 3406 is moving towards a medial or lateral side of bone 3404. Thus, based on the location and orientation of implant component 3406 and based on the model of the bone and the model of the implant component being installed in the bone, device 3300 can predict a point of first contact between the implant component and an inner cortical wall of bone 3404 or a region of the inner cortical wall that may have a highest probability of fracture.

Generally speaking, the steps described above for converting the outputs of sensors 3302 and 3304 to distance values LB and LI and determining distance X based on distances LB and LI can be distributed in any manner across device 3300 (e.g., processing circuitry 3306 and sensors 3302 and 3304) and intraoperative guidance system 108. Therefore, although certain functions are described above as being performed by device 3300 or intraoperative guidance system 108, unless stated otherwise, it should be assumed that those functions can also be performed by the other of device 3300 or intraoperative guidance system 108.

As explained in greater detail elsewhere in this disclosure, if distance X is less than a threshold value, or if a distance between an outer wall of implant component 3406 and an inner wall of cortical bone 3404 is less than a threshold value, e.g., as determined by the difference of X minus an estimated bone wall thickness, then intraoperative guidance system 108 may be configured to provide alerts to a surgical team that implant component 3406 is getting close to the outer wall of cortical bone 3404, which may indicate that cortical bone 3404 is in danger of fracture. Intraoperative guidance system 108 may also be configured to continuously provide a surgical team with a distance between an implant component and an outer wall or, alternatively, an inner wall of a cortical bone in addition to or instead of an alert. The distance between the implant component and the outer or inner wall of the cortical bone may be a remaining distance indicating how much space is present until the implant component makes contact with the outer wall or, alternatively, an inner wall of the cortical bone.

If device 3500 and intraoperative guidance system 108 detect values for distance X at multiple locations, then intraoperative guidance system 108 may also present to a user information such as an indication of one or more locations and distances for where an implant component is closest to an inner wall of the cortical bone, an indication of one or more locations and distances for where an implant component is less than a threshold amount away from an inner or outer wall of the cortical bone, an indication of an average distance between the implant component and the inner or outer wall of the cortical bone, or other such indications. As explained in greater detail elsewhere in this disclosure, the various alerts and other information output by intraoperative guidance system 108 may, in some instances, also be output by device 3300.

Figure 35:
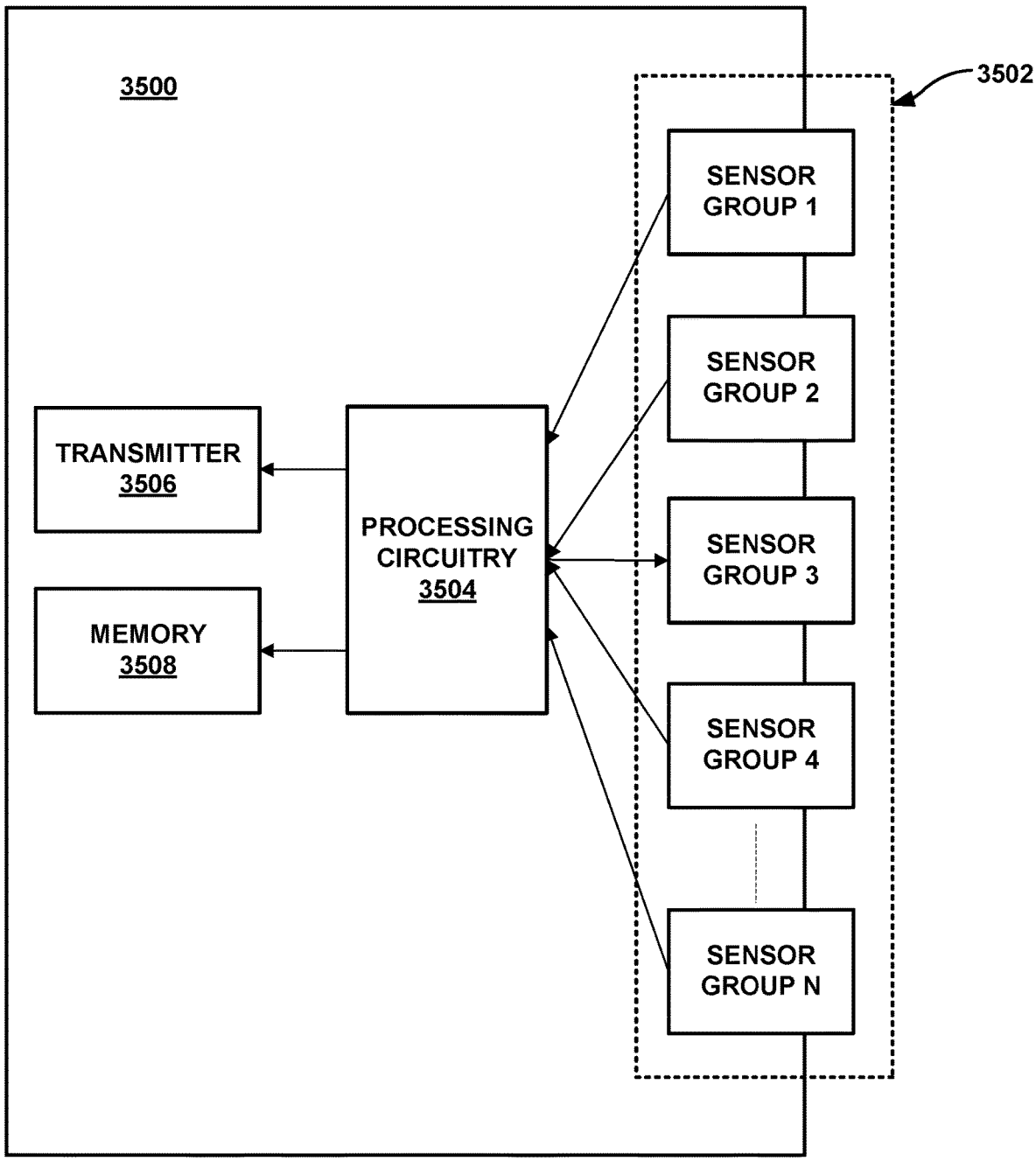
FIG. 35 shows an example implant component positioning device in accordance with the techniques of this disclosure.

FIG. 35 shows device 3500, which is another example of an implant component positioning device in accordance with the techniques of this disclosure. Device 3500 may be configured, possibly in conjunction with other devices described in this disclosure, to determine a depth of implantation for an implant component and/or a distance between a bone and the implant component. Device 3500 includes sensors 3502, processing circuitry 3504, transmitter 3506 and memory 3508.

Device 3500 may be considered to be a component of intraoperative guidance system 108 or may be considered to be a component that is separate from intraoperative guidance system 108 but in communication with intraoperative guidance system 108. In some implementations, device 3500 may be a standalone device capable of presenting information to a user through one or a combination of auditory, visual, or haptic feedback. Device 3500 may take any one of several forms. Device 3500 may, for example, be part of a strap or band that wraps around a patient's arm or leg or may be a cuff or sleeve into which a surgeon, nurse or technician inserts an arm or a leg of a patient being operated on. In other implementation, device 3300 may be a wand-like or probe-like device that a device user moves across a portion of a patient's body or may be a planar, e.g., plank like, surface that a device user rotates around a patient's arm or leg.

Sensors 3502 includes a plurality of sensor groups, shown as sensor group 1 through sensor group N in FIG. 35. Each sensor group in sensors 3502 includes at least two sensors. The two sensors include a first configured to output, to processing circuitry 3504, a first value that is indicative of a distance to an outer bone wall inside a patient. The first sensor in the sensor group may, for example, be an ultrasonic sensor that emits a soundwave and receives a reflection of the soundwave. The first sensor or processing circuitry 3504 may determine the first value based on a difference between a time when the ultrasonic sensor emits the soundwave and a time when the ultrasonic sensor receives the reflection of the soundwave. Thus, the output of the first sensor of each sensor group may be a time value or multiple time values. In this regard, each sensor of sensor groups 1 through sensor group N includes at least one sensor that functions as sensor 3302 described above.

The second sensor of the sensor group may be configured to output, to processing circuitry 3504, a second value that is indicative of a distance to an implanted implant component inside the patient. The second sensor of the sensor group may, for example, be a magnetic sensor, such as a hall effect sensor, and the second value may be a voltage value. In this regard, each sensor of sensor groups 1 through sensor group N includes at least one sensor that functions as sensor 3304 described above. It is contemplated that the first sensor and second sensor within each sensor group are located in close proximity to one another and are generally configured to sense in approximately the same directions. Accordingly, the directions in which the first sensor and the second sensor within each sensor group sense are approximately parallel or slightly converging.

For each sensing group of sensors 3502, processing circuitry 3504 processes the first value and the second value, and transmitter 3506 transmits an output based on the first value and the second value. In some examples, processing circuitry 3504 converts the output value of the first sensor of the sensor group into a first distance value representative of the distance from the first sensor to the bone wall inside of the patient. If for example, the output of the first sensor is a time value, then processing circuitry 3504 can convert the time value into a first distance value based on a known value for the speed of sound in human tissue. Processing circuitry 3504 can also convert the output value of the second sensor into a second distance value representative of the distance from the second sensor to the implant component inside of the patient. By subtracting the first distance value from the second distance value, in one example, processing circuitry 3504 can determine a distance between an outer wall of a bone and an outer wall of an implant component being implanted into the bone. By further subtracting, an estimated thickness for a cortical wall, in another example, processing circuitry 3504 may alternatively or additionally determine a distance between an inner wall of a cortical bone and an outer wall of an implant component being implanted into the bone. Transmitter 3506 may then transmit the determined distances to another system, such as intraoperative system 08.

In other examples, transmitter 3506 transmits the first value and the second value to intraoperative guidance system 108, and intraoperative guidance system 108 converts the output value of the first sensor into the first distance value and also converts the output value of the second sensor into the second distance value. Intraoperative guidance system 108 can then subtract the first distance value from the second distance value to determine the distance between the outer wall of the bone and the outer wall of the implant component being implanted into the bone. By further subtracting, the estimated thickness for the cortical wall, intraoperative guidance system 108 may alternatively or additionally determine a distance between an inner wall of a cortical bone and an outer wall of an implant component being implanted into the bone.

For each sensor group of sensors 3502, processing circuitry 3504 can determine a distance between the outer or inner wall of the bone and the outer wall of the implant component being implanted into the bone, in the manner described above, or transmit values to intraoperative guidance system 108, such that intraoperative guidance system 108 can determine a distance between the inner or outer wall of the bone and the outer wall of the implant component being implanted into the bone.

Figure 36:
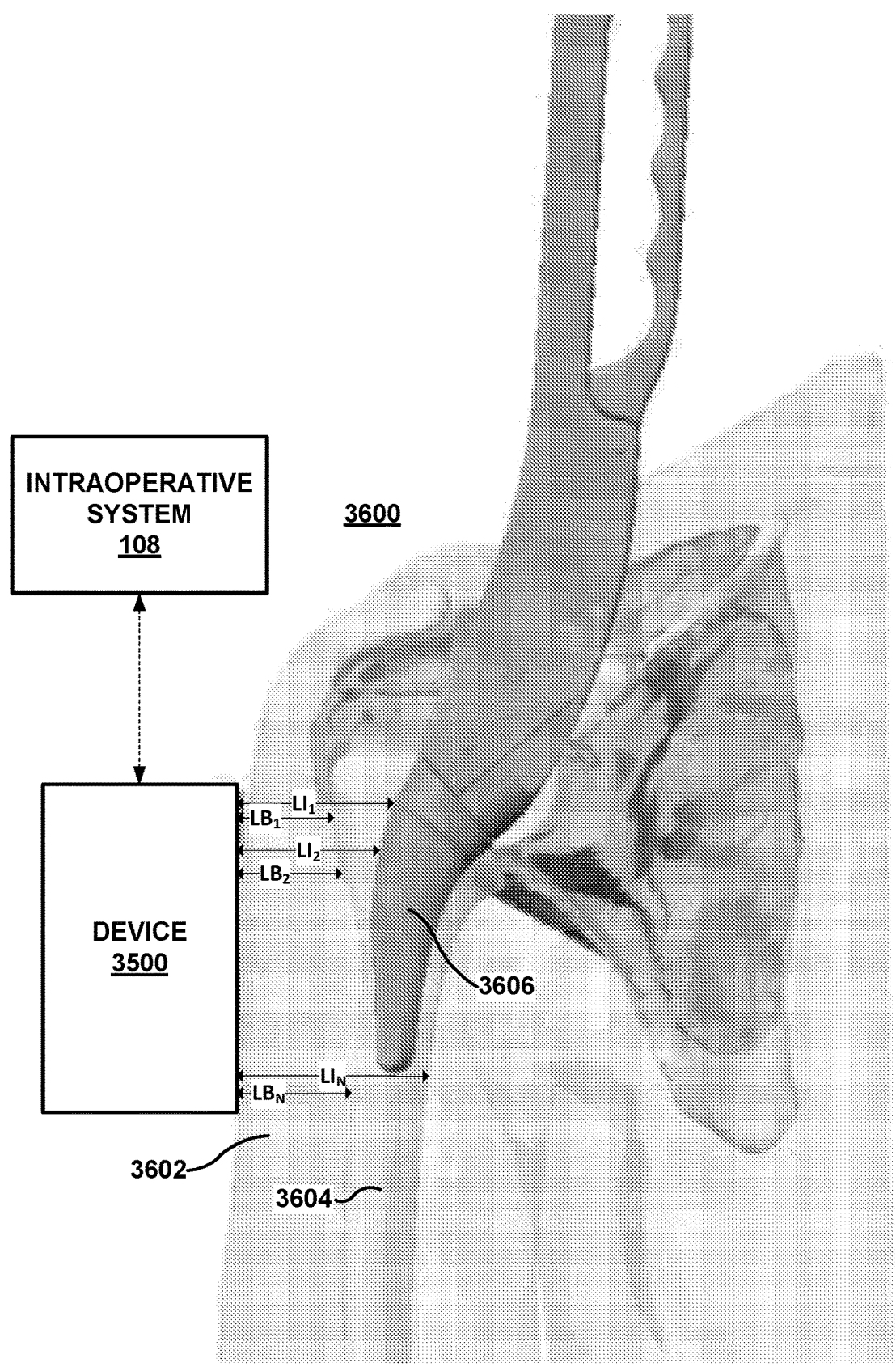
FIG. 36 shows an example of the implant component positioning device of FIG. 35 being used to measure a distance between an outer diameter of a bone wall an outer diameter of an implant component.

FIG. 36 shows an example of device 3500 being used to measure a distance between an outer diameter of a bone wall and an outer diameter of an implant component, for a plurality of points along bone 3604. FIG. 36 shows an example of an arm 3600, with soft tissue 3602, humerus cortical bone 3604, and implant component 3606. Device 3500 is placed against an outer surface of arm 3600 with the sensors of sensor groups 1-N oriented towards humerus bone 3604 and implant component 3606. In the example of FIG. 36, $LB_1$ and $LI_1$ represent distances determined using the values obtained by sensor group 1; $LB_2$ and $LI_2$ represent distances determined using the values obtained by sensor group 2; and so on.

As explained above, for each sensor group, a first sensor is configured to output, to processing circuitry 3504, a first value that is indicative of a distance to an outer wall of cortical bone 3404. These distances to the outer wall of cortical bone 3604 inside arm 3600 are shown as distances $LB_1$, $LB_2$, and $LB_N$ in FIG. 36. For each sensor group, a second sensor is configured to output, to processing circuitry 3504, a second value that is indicative of a distance to an outer wall of implant component 3606. These distances to the outer wall of implant component 3606 are shown as distances $LI_1$, $LI_2$, and $LI_N$ in FIG. 36.

For each sensor group, device 3300 transmits a first value and a second value to intraoperative guidance system 108, and intraoperative guidance system 108 converts the first value into a distance value (e.g., distances $LB_1$, $LB_2$ ... $LB_N$) based on the speed of sound through soft tissue 3602. In other implementations, components of device 3500, such as processing circuitry 3504 and/or sensor 3502, may determine distance values for $LB_1$, $LB_2$ ... $LB_N$ and then transmit those distance values to intraoperative guidance system 108. Thus, for each sensor group, device 3500 may transmit to intraoperative guidance system 108 values directly indicative of distances $LB_1$, $LB_2$ ... $LB_N$ or values from which distances $LB_1$, $LB_2$ ... $LB_N$ can be derived.

Intraoperative guidance system 108 can convert the second values into distance values (e.g., distances $LI_1$, $LI_2$ ... $LI_N$) based on known parameters of the second sensors in sensor groups 3502. In other implementations, components of device 3500, such as processing circuitry 3504 and/or sensors 3502, may determine distance values $LI_1$, $LI_2$ ... $LI_N$ and then transmit those distance values intraoperative guidance system 108 may be an indication of distance LI. Thus, for each sensor group, device 3500 may transmit to intraoperative guidance system 108 values directly indicative of distances $LI_1$, $LI_2$ ... $LI_N$ or values from which distances $LI_1$, $LI_2$ ... $LI_N$ can be derived.

Intraoperative guidance system 108 can determine a distance between an outer wall of cortical bone 3604 and an outer wall of implant component 3606, for each of sensor groups 1-N. The distance between the outer wall of cortical bone 3604 and the outer wall of implant component 3606 for each sensor group is equal to $LI_1-LB_1$, $LI_2-LB_2$, ... $LI_N-LB_N$. Intraoperative guidance system 108 can additionally or alternatively determine a distance between an inner wall of cortical bone 3604 and an outer wall of implant component 3606, for each of sensor groups 1-N. The distance between the inner wall of cortical bone 3604 and the outer wall of implant component 3606 for each sensor group is equal to $LI_1-LB_1-BT_1$, $LI_2-LB_2-BT_2$, ... $LI_N-LB_N-BT_N$, where $BT_1$, $BT_2$, etc. refer to an estimated bone thickness at the point on the bone where the first sensor and sensor are determining the distances to the outer bone wall and the implant component.

In other implementations, device 3300 may determine the values for to $LI_1-LB_1$, $LI_2-LB_2$, ... $LI_N-LB_N$ or values for to $LI_1-LB_1-BT_1$, $LI_2-LB_2-BT_2$, ... $LI_N-LB_N-BT_N$ and transmit those values to intraoperative guidance system 108. Generally speaking, the steps described above for converting the outputs of the first sensor and second sensor for each of sensor groups 1-N distance values LB and LI and determining distance value LB–LI, and the steps for converting distance values LB–LI to LB–LI–BT can be distributed in any manner across device 3500 (e.g., processing circuitry 3504 and sensors 3502) and intraoperative guidance system 108. Therefore, although certain functions are described above as being performed by device 3500 or intraoperative guidance system 108, unless stated otherwise, it should be assumed that those functions can also be performed by the other of device 3500 or intraoperative guidance system 108.

As device 3500 has multiple sensor groups, device 3500, in conjunction with intraoperative guidance system 108, may be configured to detect a distance between an inner or outer wall of a bone and an outer wall of an implant component at multiple points along a limb. FIG. 36, for examples, shows the sensor groups of device 3500 taking readings at different axial positions along a length of the arm using a 1D array of sensors, but the sensor groups of sensors 3502 may also be configured to take readings at different points around a circumference of the arm, using, for example, a 2D array of sensors. In some implementations, for example, device 3500 may have sensor groups oriented at approximately the same axial position on a limb but positioned at different circumferential positions around the arm or part of the arm, e.g., separated by 45 degrees, 90 degrees or 180 degrees around the circumference of the limb. In some implementations, device 3500 may have three or more sensor groups oriented at approximately the same axial position on a limb and surrounding a 360-degree circumference of the limb.

The system of device 3500 and intraoperative guidance system 108 may also be configured to determine an implant depth using the sensor groups of sensors 3502. FIG. 36, for example, shows sensor groups 1 and 2 as being distances $LI_1$ and $LI_2$, respectively, away from implant component 3606. Sensor group N, however, is located and configured to sense at a depth below (e.g., distally further from relative to the shoulder) the depth to which implant component 3606 has been implanted. Thus, for a plurality of sensor groups arranged at a different heights along a limb, device 3500 can determine an implant depth for implant component 3606 based on a last sensor group that detects the presence of implant component 3606 and the first sensor group that does not detect the presence of implant component 3606. By knowing positions of the various sensor groups in sensor groups 1 through N relative to bone 3604, the system of device 3500 and intraoperative guidance system 108 can determine the depth of implant component 3606 to be between the last sensor group that detects the presence of implant component 3606 and the first sensor group that does not detect the presence of implant component 3606. Thus, including more sensors groups in the direction of the humerus from shoulder to the elbow may enable device 3500 to more precisely determine an axial position, also referred to as an implant depth, for implant component 3606.

As will be explained in greater detail below, if any of distances $(LI_1-LB_1)$, $(LI_2-LB_2)$, . . . , $(LI_N-LB_N)$ or $(LI_1-LB_1-BT_1)$, $(LI_2-LB_2-BT_2)$, . . . , $(LI_N-LB_N-BT_N)$ are less than a threshold value, then intraoperative guidance system 108 may be configured to provide alerts to a surgical team that implant component 3606 is getting close to the inner wall or outer wall of cortical bone 3604, which may indicate that cortical bone 3604 is at risk of fracture. Moreover, intraoperative guidance system 108 may also be configured to continuously provide a surgical team with distances between an implant component and an inner wall or outer wall of a cortical bone at multiple locations in addition to or instead of an alert. The distances between the implant component and the outer wall of the cortical bone may be a remaining distance indicating how much space is present until the implant component makes contact with the outer wall of the cortical bone. Intraoperative guidance system 108 may also present to a user information such as an indication of one or more locations and distances for where an implant component is closest to an inner wall or an outer wall of the cortical bone, an indication of one or more locations and distances for where an implant component is less than a threshold amount away from an inner wall of the cortical bone, an indication of an average distance between the implant component and the inner wall of the cortical bone, or other such indications. As explained in greater detail elsewhere in this disclosure, the various alerts and other information output by intraoperative guidance system 108 may, in some instances, also be output by device 3500.

By determining a distance between an inner or outer wall of a bone and an outer wall of an implant component at multiple points along a limb, device 3500 may also be configured to predict a point of first contact between the implant component and an inner cortical wall of bone 3404 or predict a region of the inner cortical wall that may have a highest probability of fracture. Using the distance between the wall of the bone and the implant component at multiple points along the limb, device 3500 can determine an orientation for implant component 3606, as described above, and can predict a point of first contact between the implant component and an inner cortical wall of bone 3604 or a region of the inner cortical wall that may have a highest probability of fracture.

Figure 37:
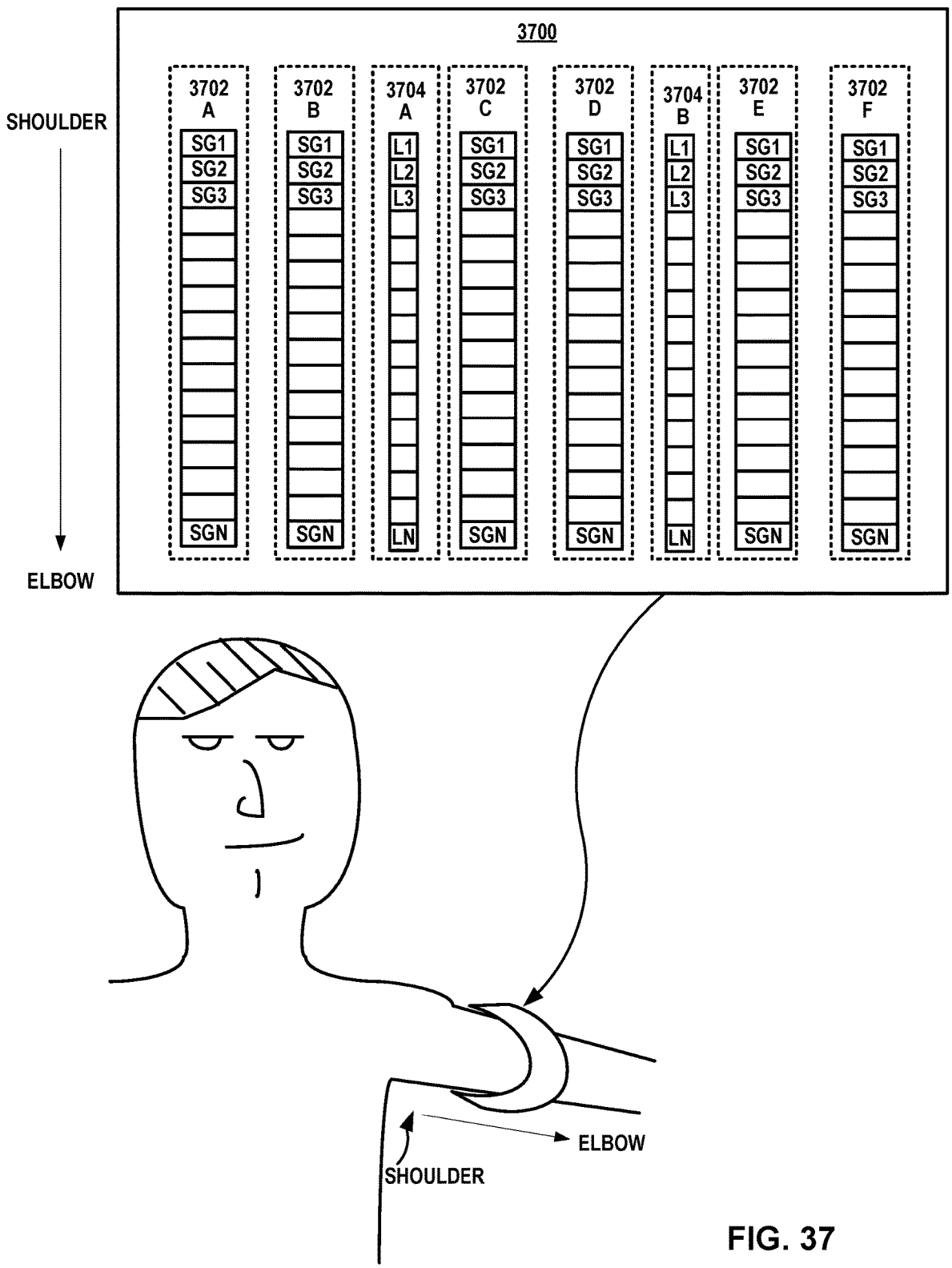
FIG. 37 shows another example implant component positioning device in accordance with the techniques of this disclosure.

FIG. 37 shows an example of device 3700 which may be configured, possibly in conjunction with other devices described in this disclosure, to determine a distance between a bone and an implant component. Device 3700 may also be configured to determine an implant depth for the implant component. Device 3700 is shown in FIG. 37 as being a cuff that surrounds a patient's arm.

Device 3700 includes columns of sensor groups 3702A-3702F (hereinafter referred to as columns 3702A-3702F) and also includes columns of lights 3704A and 3704B. Columns of sensor groups 3702A-3702F collectively form a 2D array of sensors. More or fewer columns of sensors groups and more or fewer columns of lights may also be used. Although not shown in FIG. 37, device 3700 may also include processing circuitry, memory, transmitting circuitry, and other circuitry for implementing the various functions described herein. Each column of columns 3702A-3702F includes a plurality of sensor groups, shown as SG1 through SGN in FIG. 37.

A member of a surgical team may apply device 3700 to a patient's limb, such as the arms, as shown in FIG. 37. In FIG. 37, the device may be applied to the patient such that an orientation of device 3700 is such that sensor group SG1 in each of columns 3702A-3702F are the sensor groups closest to the patient's shoulder, and sensor groups SGN in each of columns 3702A-3702F are the sensor groups closest to the patient's elbow. All of the SG1 sensor groups are approximately a same axial position relative to a patient's shoulder; all of the SG2 sensor groups are approximately a same height relative to a patent's shoulder; and so on.

When applied to a patient, the SG1s for each column of columns 3702A-3702F take readings at different points around a common circumference of a limb. In other words, SG1 of column 3702A, SG1 of column 3702B, SG1 of column 3702C, and so on takes readings at different points around the common circumference of the limb. A common circumference generally refers to a circumference for which all points are at the approximately same height, with the height being defined as a location on an axis that runs, for example, from a shoulder towards an elbow. This axis is typically parallel to the bone which is having an implant component installed.

Each sensor group in columns 3702A-3702F includes at least two sensors. The first sensor determines a value indicative of a distance between the first sensor and an outer wall of a bone. In this regard, each sensor of the sensor groups in columns 3702A through 3702F includes at least one sensor that functions as sensor 3302 described above. The second sensor of the sensor groups may be configured to output a second value that is indicative of a distance to an implanted implant component inside the patient. In this regard, each sensor of the sensor groups in columns 3702A through 3702F includes at least one sensor that functions as sensor 3304 described above.

Device 3700 includes processing circuitry, such that device 3700 can determine a distance between an implant component and an inner or outer wall of a bone for each sensor group in the same manner as described above with respect to device 3300 and device 3500. Device 3700 may also interact with intraoperative guidance system 108 in the same manner as described above with respect to device 3300 and device 3500. Thus, device 3700 is configured to obtain multiple determinations of a distance between an implant component and an inner or outer wall of the cortical bone both down the arm and around the arm.

In the example of FIG. 37, device 3700 also may include columns of lights 3704A and 3704B. When device 3700 is wrapped around a patient's arm, columns of lights 3704A and 3704B may, for example, be separated by 90 or 180 degrees or some other separation distance. Columns of lights 3704A and 3704B may convey information regarding the depth and location of an implant component to a surgical team. Each light may, for example, be configured to illuminate in different colors, with the different colors signifying different information regarding the implant component.

For instance, a light within columns 3704A and 3704B may be green to indicate that an implant component is detected and is more than a threshold distance away from an inner wall of the cortical bone, red to indicate that an implant component is detected at less than a threshold distance away from an inner wall of the cortical bone, or off to indicate that the implant component is not detected, with the first off light in a column also indicating a an implant depth of the implant component. In other implementations, a light within columns 3704A and 3704B may be red to indicate that an implant component is detected at less than a first threshold distance away from an inner wall of the cortical bone, yellow to indicate that an implant component is detected and is greater than a first threshold distance away from an inner wall of the cortical bone but less than a second threshold distance away from the inner wall of the cortical bone, green to indicate that an implant component is detected and is more than the first threshold distance and more than the second threshold distance away from an inner wall of the cortical bone, or off to indicate that the implant component is not detected. In these examples, a red light may be a signal to a surgeon that the cortical bone is in danger of fracturing, and a green light may be a signal to a surgeon that the cortical bone is not in danger of fracturing. A yellow light may be used to signal to a surgeon that the cortical bone is not in imminent danger of fracturing but is nearing such a condition.

By determining a distance between an inner or outer wall of a bone and an outer wall of an implant component using multiple sensor groups of sensors 3702, device 3700 may also be configured to predict a point of first contact between the implant component and an inner cortical wall of a bone or predict a region of the inner cortical wall that may have a highest probability of fracture, as described in more detail above.

As described above, a surgeon may perform a surgery while wearing a head-mounted MR visualization device of intraoperative guidance system 108 that presents guidance information to the surgeon. Intraoperative guidance system 108, while in communication with any of device 3300, device 3500, or device 3700 may be configured to provide information to a surgeon regarding implant depth and distance to a cortical wall, which in turn may provide the surgeon with a better idea of when a bone is in danger of fracturing so that the surgeon can take measures to avoid the fracture.

Intraoperative guidance system 108 can include receiver circuitry configured to receive a signal, from any of devices 3300, 3500, or 3700, for example, that includes data indicative of one or more distances between a bone and an implant component, with the one or more distances between the bone and the implant component corresponding to one or more locations on the bone. Intraoperative guidance system 108 can also include processing circuitry configured to process the data to cause an output device, such as a head-mounted MR visualization device or other type of output device, to generate an output based on the one or more distances between the bone and the implant component.

The output device may, for example, be an auditory output device configured to produce auditory alerts or notifications. The auditory output device may be incorporated into the head-mounted MR visualization device but may also be part of a separate device. The auditory alerts may take the form of voice alerts indicating that an implant component is within a threshold distance of an inner wall of the cortical bone. An example of an auditory notification includes a voice indication of a nearest distance between the implant component and the inner wall of the cortical bone and a height and location (e.g., proximal, distal, medial) for that point of nearest contact. In other examples, the auditory output device may be configured to convey this information to a surgeon using a tonal sequence known to the surgeon.

The output device may additionally or alternatively be a haptic output device and may be incorporated into the head-mounted MR visualization device or may be part of a separate device. The haptic output device may, for example, be configured to produce a haptic response based on a distance between the implant component and inner wall of the cortical bone. An example of a haptic response includes an amount or intensity of vibration. In some implementations, the haptic output device may be implemented into a hammer or other tool used by the surgeon. As the implant component gets closer to an inner wall of the cortical bone, an amount or intensity of vibration in the hammer may increase to inform the surgeon that the distance between the implant component and the inner wall of the cortical bone is decreasing or is below a threshold level.

The processing circuitry of intraoperative guidance system 108 may be configured to determine a model of the bone using stored images of the bone and/or using various modeling techniques described in this disclosure, such as statistical shape modeling and bone density modeling, as described elsewhere in this disclosure. All or portions of the model of the bone may also be determined based on known averages or other predictive techniques that are not specific to the patient's bones. The model may be either a 2D model or a 3D model.

The processing circuitry of intraoperative guidance system 108 may be configured to cause the output device, e.g., the MR visualization device or a monitor, to display a visual representation of the model of the bone and annotate the visual representation of the model based on the one or more distances between the bone and the implant component. In some implementations, the processing circuitry of intraoperative guidance system 108 may be configured to cause the output device to show a model of the implant component superimposed over the model of the bone. Intraoperative guidance system 108 can determine the position of the model of the implant component relative to the model of the bone based on an implant depth and distances between the implant component and the cortical wall determined by devices 3300, 3500, or 3700.

Figure 38:
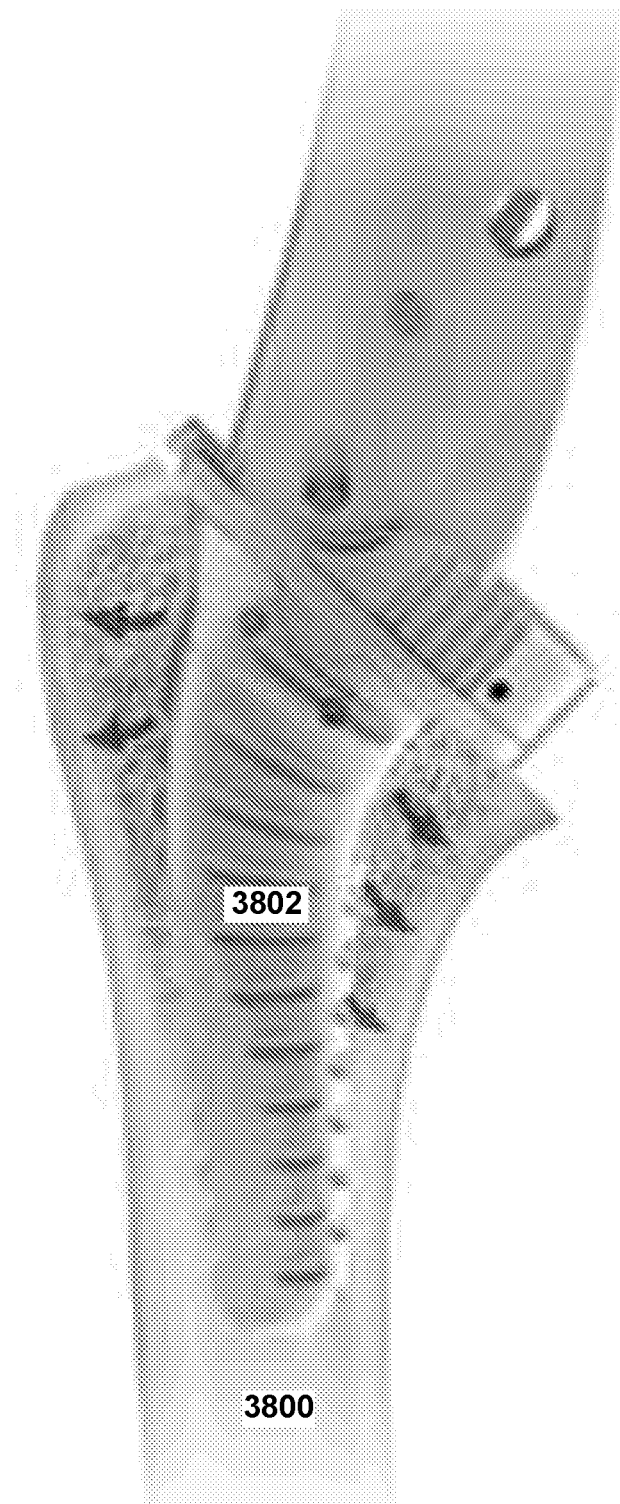
FIG. 38 shows an example of an image that may be presented to a surgical team in accordance with the techniques of this disclosure.

FIG. 38 shows an example of an image that may be presented by intraoperative guidance system 108 to a user of any of devices 3300, 3500, or 3700. The image of FIG. 38 may, for example, be presented to a user via a head-mounted MR visualization device or other type of display. The image includes a model of a bone 3800 and a model of an implant component 3802. Bone 3800 and implant component 3802 are not actual images of the bone being operated on and the implant component being installed but, instead, are models determined by intraoperative guidance system 108.

The processing circuitry of intraoperative guidance system 108 may, for example, be configured to cause the output device to show a location where a distance between the bone (e.g., and inner wall of the cortical bone) and the implant component is less than a threshold amount. The output device may show this location in any one or more of numerous ways, such as annotating the location with a symbol (e.g., a stop sign-type symbol) or (e.g., read) a color or by adding text to the image that gives the distance between the implant component and the bone wall. The output device may, additionally or alternatively, show this location by using blinking, highlighting, circling, framing, etc.

The processing circuitry of intraoperative guidance system 108 may also be configured to cause the output device to show a location where a distance between the bone and the implant component is greater than a first threshold amount but less than a second threshold amount. The output device may show this location with a symbol (e.g., a yield-sign type symbol) or a color (e.g., yellow) that is different than the symbol or color used above or by adding text to the image that gives the distance between the implant component and the bone wall.

The processing circuitry of intraoperative guidance system 108 may also be configured to cause the output device to show a location where a distance between the bone and the implant component is greater than the first threshold amount and greater than the second threshold amount. The output device may show this location with a symbol (or lack of a symbol) or a color (e.g., green) that is different than the symbol or color used above or by adding text to the image that gives the distance between the implant component and the bone wall.

The various thresholds described herein may be patient specific and may be selected automatically or recommended by intraoperative guidance system 108 or may be selected manually by a user of intraoperative guidance system 108. Moreover, the thresholds used may either be constant for an entire limb or may vary for different axial and circumferential positions along the limb. Intraoperative guidance system 108 may, for example, determine the thresholds or recommendations for the thresholds based on the determined model of the bone. Intraoperative guidance system 108 may, for example, select lower thresholds for a patient with a thicker cortical bone wall than for a patient with a thinner cortical wall. Similarly, intraoperative guidance system 108 may select lower thresholds for a patient with generally healthier and strong cortical wall than for a patient with a deteriorated or otherwise unhealthy cortical wall. In other examples, intraoperative guidance system 108 may select lower thresholds for a portion of a limb that is generally healthier and higher thresholds for a portion of a limb with a deteriorated or otherwise unhealthy cortical wall.

In the examples above, the first threshold may be less than 0.5 mm. Thus, if intraoperative guidance system 108 determines that a point on the implant component is less than 0.5 mm away from an inner wall of a cortical bone, then intraoperative guidance system 108 may present to a surgeon a warning that the cortical bone is in danger of fracturing. The warning may take virtually any form, including a visual warning, an auditory warning, or a haptic warning. The second threshold may, for example, be 3 mm. Thus, if intraoperative guidance system 108 determines that a point on the implant component is greater than 0.5 mm away from an inner wall of a cortical bone but less than 3 mm, then intraoperative guidance system 108 may present a warning to a surgeon that a bone is not in imminent danger of fracturing but is nearing such a condition. If intraoperative guidance system 108 determines that a point on the implant component is greater than 3 mm away from an inner wall of a cortical bone, then intraoperative guidance system 108 may present a notification to a surgeon that a bone is not in danger of cracking or fracturing. The notification may, for example, be a lack of a warning.

Figure 39:
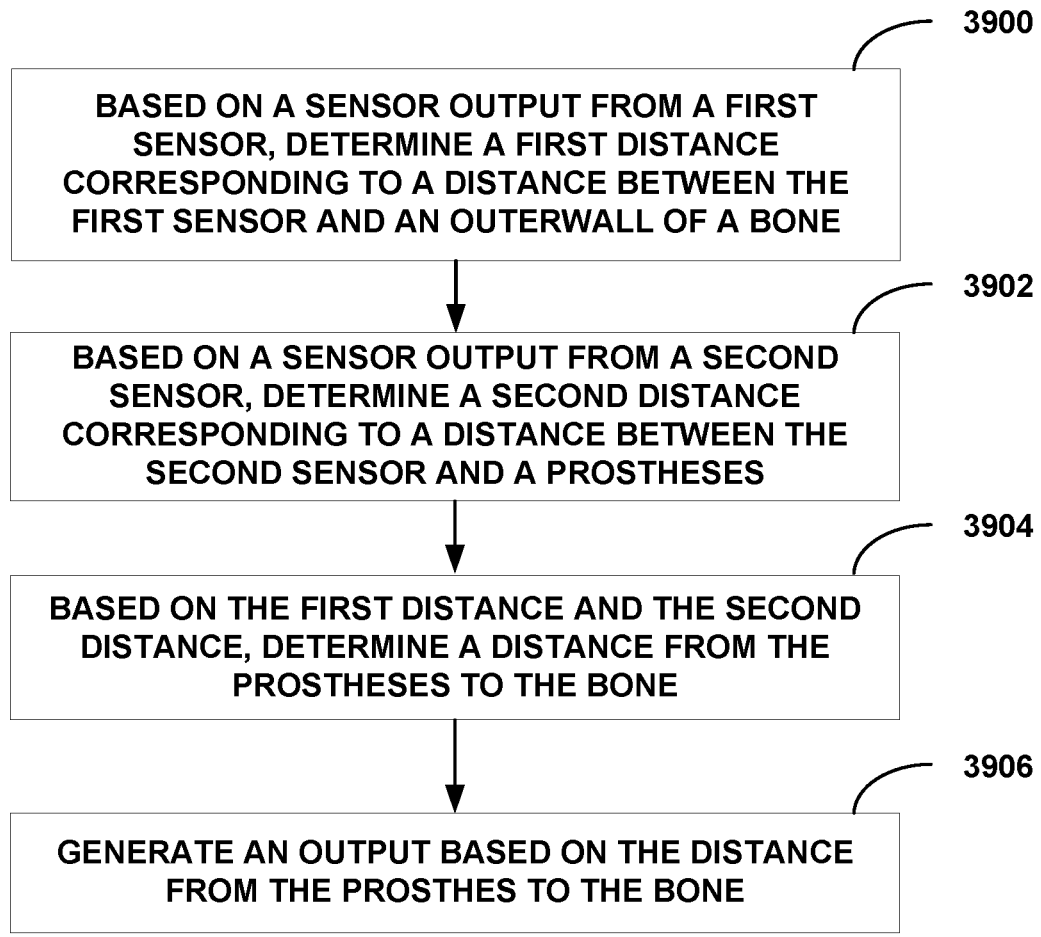
FIG. 39 shows a flow diagram illustrating a process that may performed by a system in accordance with the techniques of this disclosure.

FIG. 39 shows a flow diagram illustrating a process that may be performed by a system in accordance with the techniques of this disclosure. The process of FIG. 39 may be performed by any of device 3300, device 3500, device 3700, intraoperative guidance system 108, or may be performed by a system that includes both intraoperative guidance system 108 and one of device 3300, device 3500, or device 3700. For ease of explanation, the techniques of FIG. 39 will be described with respect to a generic system.

Based on a sensor output from a first sensor, the system determines a first distance corresponding to a distance between the first sensor and an outer wall of a bone (3900). The first sensor may, for example, be an ultrasonic sensor configured to emit a soundwave and receive a reflection of the soundwave. The system may determine the first distance based on a difference between a time when the ultrasonic sensor emits the soundwave and a time when the ultrasonic receives the reflection of the soundwave, as described elsewhere in this disclosure.

Based on a sensor output from a second sensor, the system determines a second distance corresponding to distance between the second sensor and an implant component (3902). The second sensor may, for example, be a magnetic sensor, such as a hall effect sensor, and the system may determine the second distance by emitting a magnetic field; detecting a voltage change induced by the magnetic field; and translating the voltage change into a distance value.

Based on the first distance and the second distance, the system determines a distance from the implant component to the bone (3904). As described elsewhere in this disclosure, the distance from the implant component to the bone may be a distance from an outer wall of the implant component to an inner wall of the bone or may be a distance from an outer wall of the implant component to an outer wall of the bone.

The system generates an output based on the distance from the implant component to the bone (3906).

Figure 40:
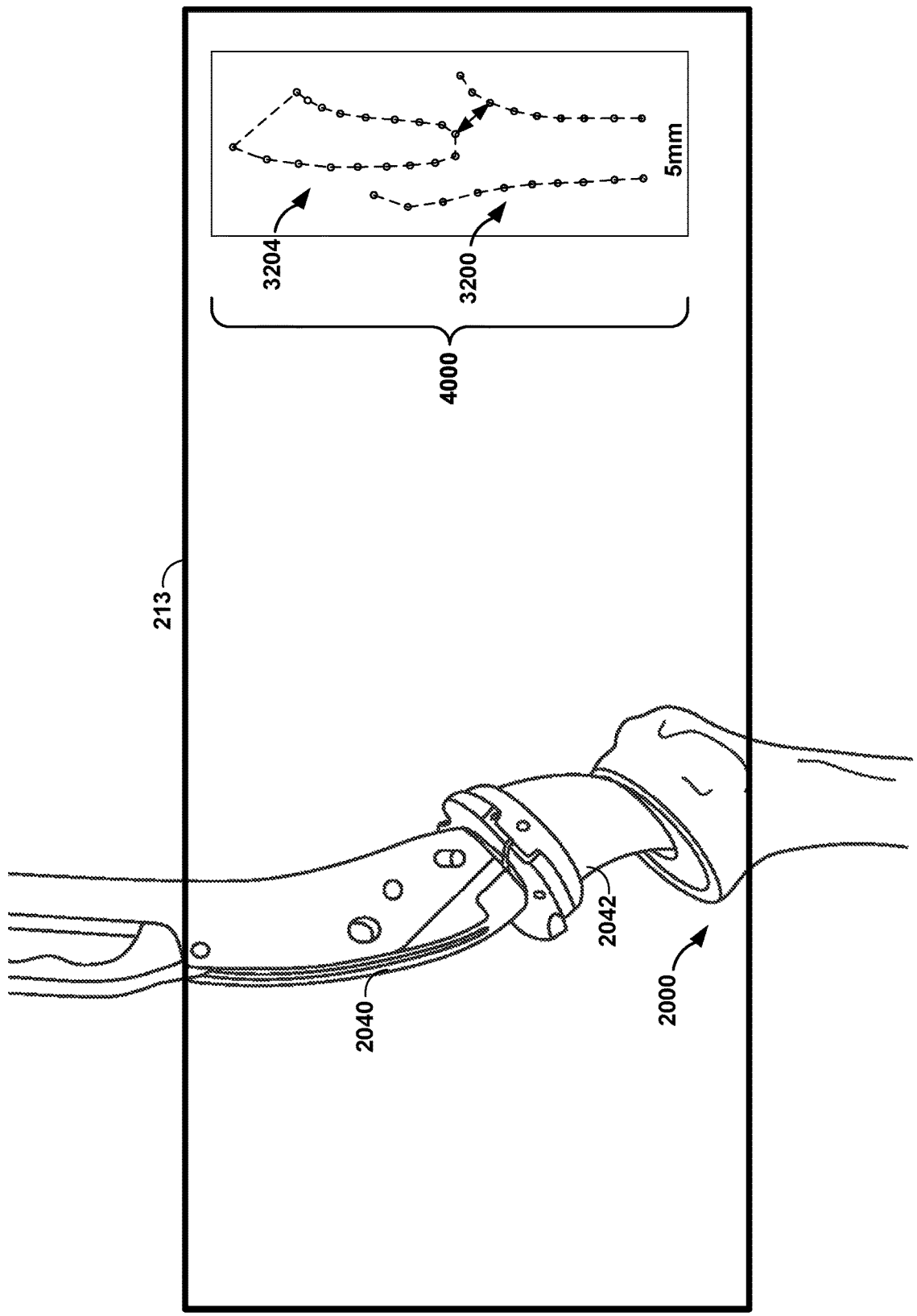
FIG. 40 is a conceptual diagram of an example view that may be provided by an MR system and that provides a secondary view window, in accordance with one or more techniques of this disclosure.

FIG. 40 is a conceptual diagram of an example view that may be provided by an MR system and that provides a secondary view window, in accordance with one or more techniques of this disclosure. The example of FIG. 40 shows what a surgeon may see while using an MR visualization device (e.g., visualization device 213) during an orthopedic shoulder surgery. Particularly, in the example of FIG. 40, the surgeon may view an exposed portion of humerus 2000.

As discussed above, the surgeon may use one or more tools to perform work on portion of a patient's anatomy (e.g., humerus 2000, etc.). For instance, the surgeon may use handle 2040 to insert prosthesis 2042 into the prepared humerus 2000. In some situations, it may be challenging for the surgeon to assess how deeply a tool, such as a prosthesis 2042, has penetrated a tissue or a bone. This may be especially challenging when the surgeon is looking down the length of handle 2040.

Hence, in accordance with one or more techniques of this disclosure, visualization device 213 of MR system 212 may generate a MR visualization that includes a secondary view window 4000, which may be a sub-window overlaid or otherwise composed with any contents, such as other virtual guidance, of a main window. Secondary view window 4000, along with other virtual guidance (e.g., virtual markers, depth guidance, etc.) may appear along with physical, real-world objects in the surgeon's field of view. Thus, in the example of FIG. 40, the surgeon may see secondary view window 4000 along with the exposed portion of humerus 2000, handle 2040, and prosthesis 2042, as well as any virtual guidance such as a virtual axis or virtual entry point. In some examples, the surgeon or other user may resize or reposition secondary view window 4000.

Secondary view window 4000 contains images representing a different perspective on a surgical site. For instance, in the example of FIG. 40, the surgical site is a patient's humerus and the surgeon is inserting prosthesis 2042 into humerus 2000.

The surgeon may use secondary view window 4000 to check the depth to which the tool has penetrated and/or to monitor relative positions of the tool and bone. For instance, in the example of FIG. 40, the surgeon may use secondary view window 4000 to determine a position of prosthesis 2042 relative to a position of humerus 2000.

The images presented in secondary view window 4000 may be generated in various ways. For instance, the images presented in secondary view window 4000 may comprise or consist of virtual objects. For instance, the images presented in secondary view window 4000 may include a virtual 3-dimensional model of the patient's anatomy. Additionally, the images presented in secondary view window 4000 may include a virtual 3-dimensional model of a tool being used by the surgeon. Thus, in the example of FIG. 40, secondary view window 4000 may include a virtual 3-dimensional model of the patient's humerus 2000 and a virtual 3-dimensional model of prosthesis 2042.

In examples where the images presented in secondary view window 4000 comprise or consist of virtual objects, the patient's anatomy may be registered with a corresponding virtual model of the patient's anatomy, as described elsewhere in this disclosure. For instance, the patient's humerus may be registered to a virtual model of the patient's humerus. Thus, a computing system (e.g., MR system 212 of FIG. 2) may be able to determine the position and orientation of the patient's anatomy in a 3-dimensional space. Furthermore, the computing system may receive information from one or more sensors (e.g., cameras, motion sensors, etc.) that enable the computing system to determine a location of a tool (e.g., prosthesis 2042) in the same 3-dimensional space. One or more markers on the tool may assist the computing system in identifying the location of the tool. Accordingly, the computing system may determine the position of the tool relative the patient's anatomy. The computing system may generate the images of secondary view window 4000 based on the relative positions of the patient's anatomy and the tool. Thus, in the example of FIG. 40, the computing system may generate a MR visualization in secondary view window 4000 that shows the relative positions of the virtual 3-dimensional models of the patient's humerus 2000 and prosthesis 2042 (e.g., the relative positions of bone virtual model 3200 and implant tool virtual model 3204).

Presenting virtual 3-dimensional models of the patient's anatomy and a tool used by the surgeon may address a certain set of challenges. For instance, in examples where a nurse holds or wears a camera that feeds images into secondary view window 4000, the nurse's natural movements may create camera shake that may be distracting to the surgeon. To compensate for camera shake, a computing system may need to apply image stabilization, which may be computationally expensive, potentially resulting in battery drain, and may result in a reduced field of view. Furthermore, virtual 3-dimensional models in secondary view window 4000 do not suffer from camera shake in this way, which may conserve computation resources otherwise expended on image stabilizing, as well as potentially increased field of view and reduced surgeon distraction.

Another potential advantage of using virtual 3-dimensional models may be that unneeded background information may be omitted from secondary view window 4000. For instance, in the example of FIG. 40, tissue or other surgical field items may be omitted from the images presented in secondary view window 4000. Omitting unneeded background information may further reduce visual distraction for the surgeon. Furthermore, the surgeon may be able to rotate or otherwise change the perspective of the virtual 3-dimensional models shown in secondary view window 4000 to angles that may be impractical for a human nurse to obtain with a handheld or head-worn camera. Accordingly, fixed position video cameras or mechanical-arm mounted cameras may need to be used to achieve the perspective that the surgeon may want. The use of virtual 3-dimensional models may eliminate the need for expending hospital resources on such cameras and mounting systems.

As discussed above, in some examples, MR system 212 may display an indication of the relative positions of the virtual 3-dimensional models of the patient's anatomy and the tool (e.g., the relative positions of bone virtual model 3200 and implant tool virtual model 3204). As one example, MR system 212 may display the indication by displaying visual representations of the virtual 3-dimensional models of the patient's anatomy and the tool. For instance, as shown in the example of FIG. 40, MR system 212 may display a visual representation of bone virtual model 3200 relative to a visual representation of tool virtual model 3204. As another example, MR system 212 may display an indication of the relative distance between the virtual 3-dimensional models of the patient's anatomy and the tool. For instance, as shown in the example of FIG. 40, MR system 212 may display text (e.g., a numerical value) of an estimated distance between bone virtual model 3200 and tool virtual model 3204 (e.g., 5 mm). As another example, MR system 212 may display an indication of which points on the virtual 3-dimensional models of the patient's anatomy and the tool are the closest. For instance, as shown in the example of FIG. 40, MR system 212 may display an arrow connecting a point on bone virtual model 3200 that is closest to a point on tool virtual model 3204.

While the techniques been disclosed with respect to a limited number of examples, those skilled in the art, having the benefit of this disclosure, will appreciate numerous modifications and variations there from. For instance, it is contemplated that any reasonable combination of the described examples may be performed. It is intended that the appended claims cover such modifications and variations as fall within the true spirit and scope of the invention.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Operations described in this disclosure may be performed by one or more processors, which may be implemented as fixed-function processing circuits, programmable circuits, or combinations thereof, such as one or more digital signal processors (DSPs), general purpose microprocessors, application specific integrated circuits (ASICs), field programmable gate arrays (FPGAs), or other equivalent integrated or discrete logic circuitry. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute instructions specified by software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. Accordingly, the terms "processor" and "processing circuitry," as used herein may refer to any of the foregoing structures or any other structure suitable for implementation of the techniques described herein.

Various examples have been described. These and other examples are within the scope of the following claims.

What is claimed is:

1. A device comprising:
   a first sensor configured to emit a soundwave toward a bone of a patient and determine a time value between emitting the soundwave and receiving a reflection of the soundwave from the bone;
   a second sensor configured to emit a magnetic field toward an implant component while the implant component is being inserted inside the bone, and detect a voltage value in response to emitting the magnetic field;
   processing circuitry configured to:
     determine a distance to an outer bone wall of the bone based on the time value;
     determine a distance to the implant component inside the bone based on the voltage value; and
     determine a difference between the distance to the outer bone wall of the bone and the distance to the implant component inside the bone; and
   transmitter circuitry configured to generate an output in response to the difference being less than a threshold value, wherein the output indicates to a surgeon that a distance between the implant component and an inner wall of the bone is less than a threshold distance.

2. The device of claim 1, wherein the second sensor comprises a hall effect sensor.

3. The device of claim 1, wherein the first sensor and the second sensor comprise a first sensor group, the device further comprising:
   a plurality of sensor groups including the first sensor group and at least one more sensor group, each sensor group configured to sense a respective first value representative of a respective distance to the outer bone wall and a respective second value representative of a respective distance to the implant component.

4. The device of claim 3, wherein the plurality of sensor groups comprises at least two sensor groups configured to take readings at different points around a circumference of a limb.

5. The device of claim 3, wherein the plurality of sensor groups comprises at least two sensor groups configured to take readings at different axial positions on a limb.

6. The device of claim 1, wherein the device comprises one or more of a strap, an arm band, a cuff, or a wand.

* * * * *